US009394394B2

(12) United States Patent
Thenappan et al.

(10) Patent No.: US 9,394,394 B2
(45) Date of Patent: Jul. 19, 2016

(54) SYNTHESIS OF CHLOROTRIFLUOROETHYLENE-BASED BLOCK COPOLYMERS BY IODINE TRANSFER POLYMERIZATION

(71) Applicant: Honeywell International Inc., Morristown, NJ (US)

(72) Inventors: Alagappan Thenappan, Hackettstown, NJ (US); Bruno Ameduri, Montpellier (FR); Gerald Lopez, Lunel-Viel (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/448,062

(22) Filed: Jul. 31, 2014

(65) Prior Publication Data

US 2015/0094428 A1    Apr. 2, 2015

Related U.S. Application Data

(60) Provisional application No. 61/884,307, filed on Sep. 30, 2013.

(51) Int. Cl.
*C08F 2/38* (2006.01)
*C08F 214/24* (2006.01)
(Continued)

(52) U.S. Cl.
CPC .............. *C08F 214/242* (2013.01); *C08F 2/38* (2013.01); *C08F 214/24* (2013.01); *C08F 293/005* (2013.01); *C08F 2438/00* (2013.01)

(58) Field of Classification Search
CPC ...... C08F 2/38; C08F 293/005; C08F 214/24; C08F 214/08; C08F 214/20
See application file for complete search history.

(56) References Cited

U.S. PATENT DOCUMENTS 4,158,678 A * 6/1979 Tatemoto et al. ............. 522/141
5,139,878 A   8/1992 Kim et al.
(Continued)

FOREIGN PATENT DOCUMENTS

EP           2592108 A1      5/2013
WO    WO 2010113951 A1 * 10/2010
WO        2013090661 A1      6/2013

OTHER PUBLICATIONS

The International Search Reprt mailed Dec. 22, 2014 in International Application No. PCT/US2014/055385.

*Primary Examiner* — Mark Kaucher
(74) *Attorney, Agent, or Firm* — Ingrassia Fisher & Lorenz, P.C.

(57) ABSTRACT

Methods for the synthesis of CTFE-based block copolymers through iodine transfer polymerization are disclosed. In an exemplary embodiment, a method includes reacting a fluoromonomer "M" with a chain transfer agent of the formula X—Y or Y—X—Y, wherein X represents a $C_1$-$C_3$ hydrocarbon, a $C_1$-$C_6$ hydrofluorocarbon, $C_1$-$C_6$ hydrochlorofluorocarbon, or $C_1$-$C_6$ fluorocarbon and Y represents iodine or bromine, in the presence of a radical initiator, to form a macro-initiator of the formula: X-poly(M)-Y or Y-poly(M)-X-poly(M)-Y, wherein poly(M) represents a polymer of the fluoromonomer. The method further includes reacting the macro-initiator with chlorotrifluoroethylene (CTFE) in the presence of a radical initiator to form a diblock or a triblock CTFE-based block copolymer of the formula: X-poly(M)-block-poly(CTFE) or PCTFE-block-poly(M)-X-poly(M)-block-PCTFE.

18 Claims, 42 Drawing Sheets

(51) Int. Cl.
*C08F 214/08* (2006.01)
*C08F 214/20* (2006.01)
*C08F 293/00* (2006.01)

(56) References Cited

U.S. PATENT DOCUMENTS

| | | | |
|---|---|---|---|
| 5,282,854 A * | 2/1994 | Yagi et al. | 623/6.56 |
| 6,107,423 A | 8/2000 | Wheland et al. | |
| 6,153,697 A | 11/2000 | Montague | |
| 6,263,920 B1 | 7/2001 | Hsich et al. | |
| 6,306,503 B1 | 10/2001 | Tsai | |
| 6,423,798 B2 | 7/2002 | Wheland et al. | |
| 6,432,542 B1 | 8/2002 | Tsai | |
| 6,451,925 B2 | 9/2002 | Jing | |
| 7,211,308 B2 | 5/2007 | Rhee et al | |
| 2002/0032291 A1 | 3/2002 | Farnham et al. | |
| 2004/0197567 A1 | 10/2004 | Tsai | |
| 2007/0128393 A1 | 6/2007 | Moulton et al. | |
| 2007/0244262 A1 | 10/2007 | Zhang et al. | |
| 2012/0029152 A1 * | 2/2012 | Fukuoka et al. | 525/193 |
| 2012/0219776 A1 | 8/2012 | Vignola et al. | |

* cited by examiner

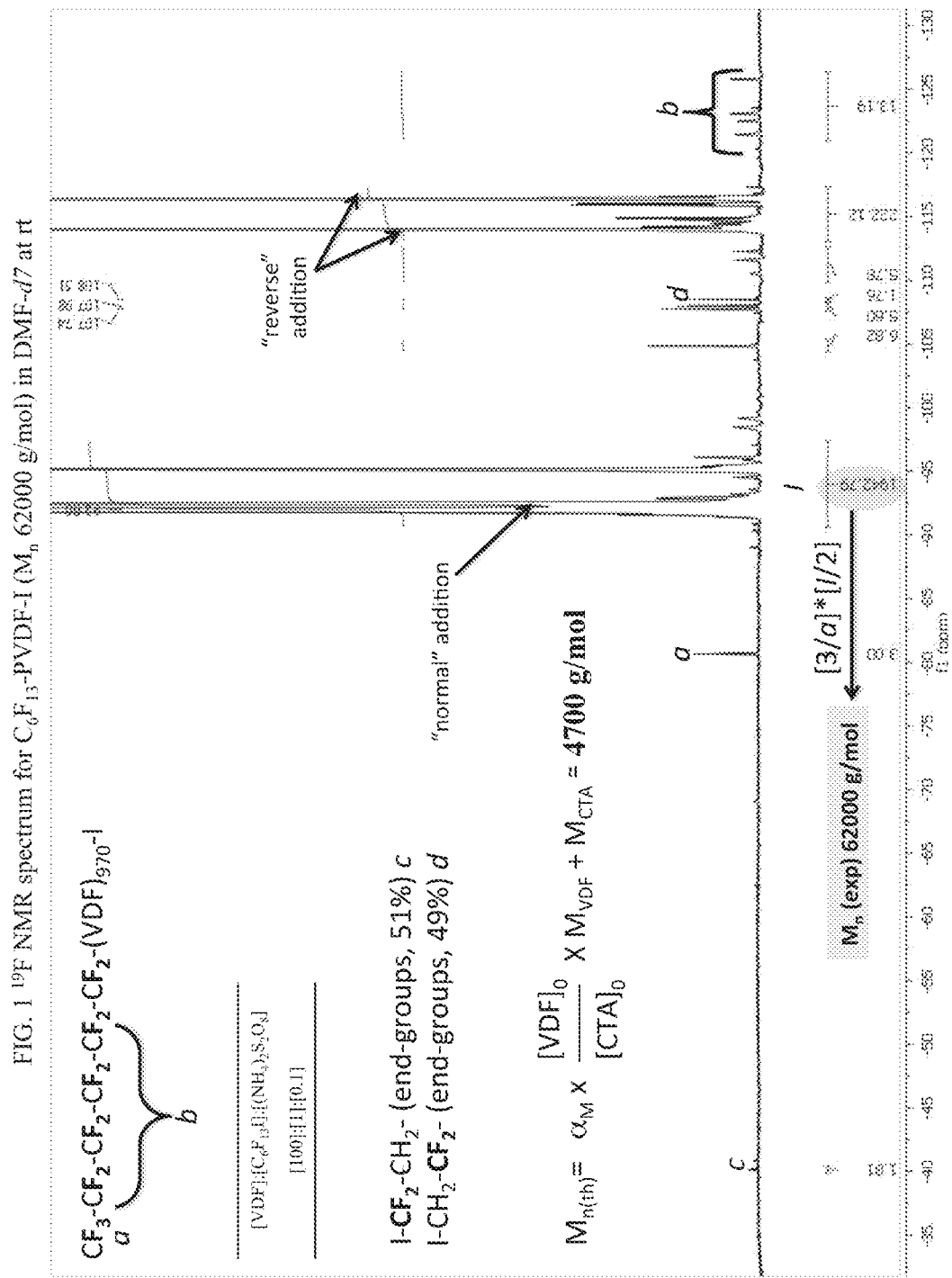
FIG. 1 $^{19}$F NMR spectrum for $C_6F_{13}$-PVDF-I ($M_n$ 62000 g/mol) in DMF-$d7$ at rt

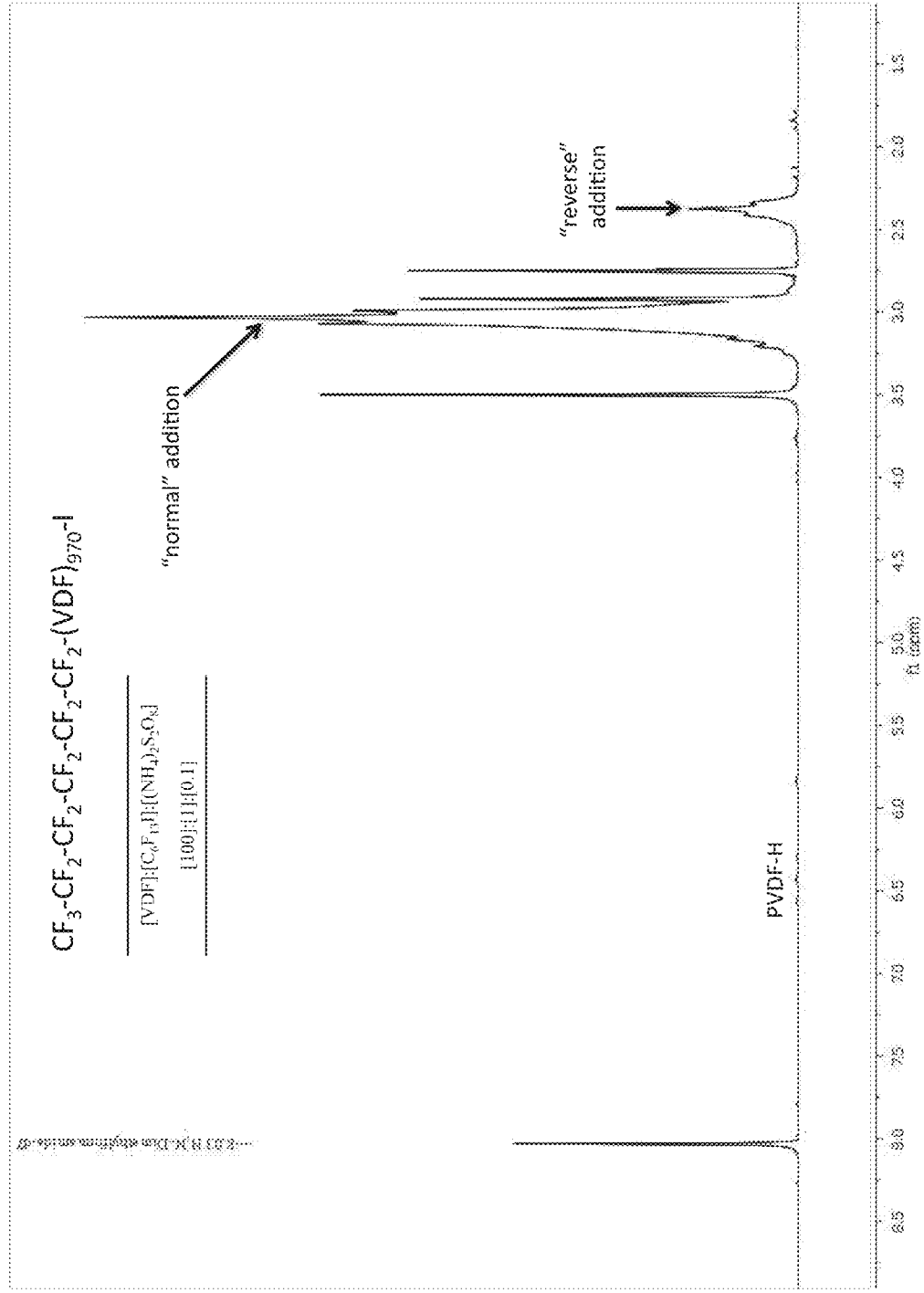
FIG. 2 $^1$H NMR spectrum for $C_6F_{13}$-PVDF-I ($M_n$ 62000 g/mol) in DMF-$d7$ at rt

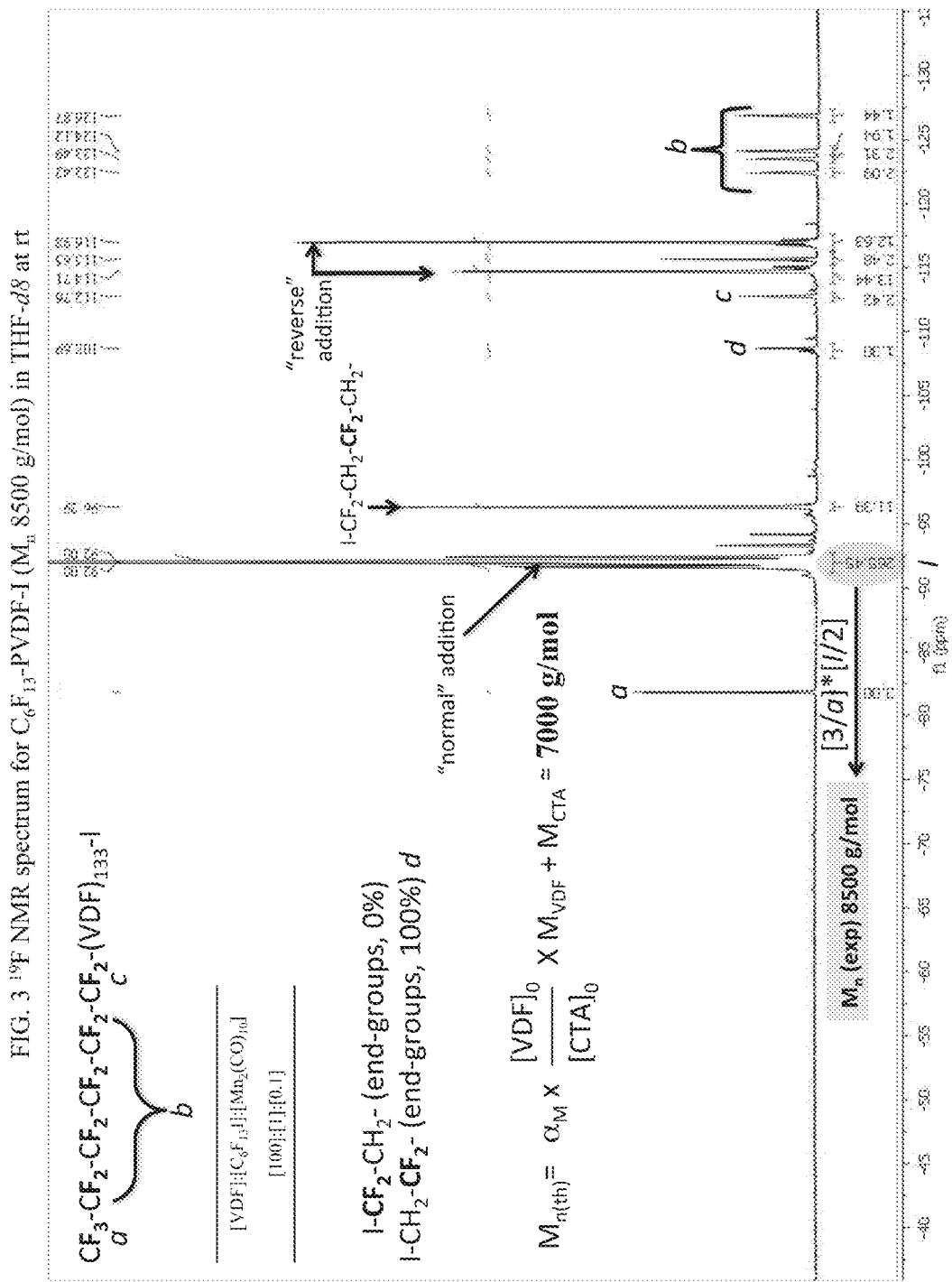
FIG. 3 $^{19}$F NMR spectrum for $C_6F_{13}$-PVDF-I ($M_n$ 8500 g/mol) in THF-$d8$ at rt

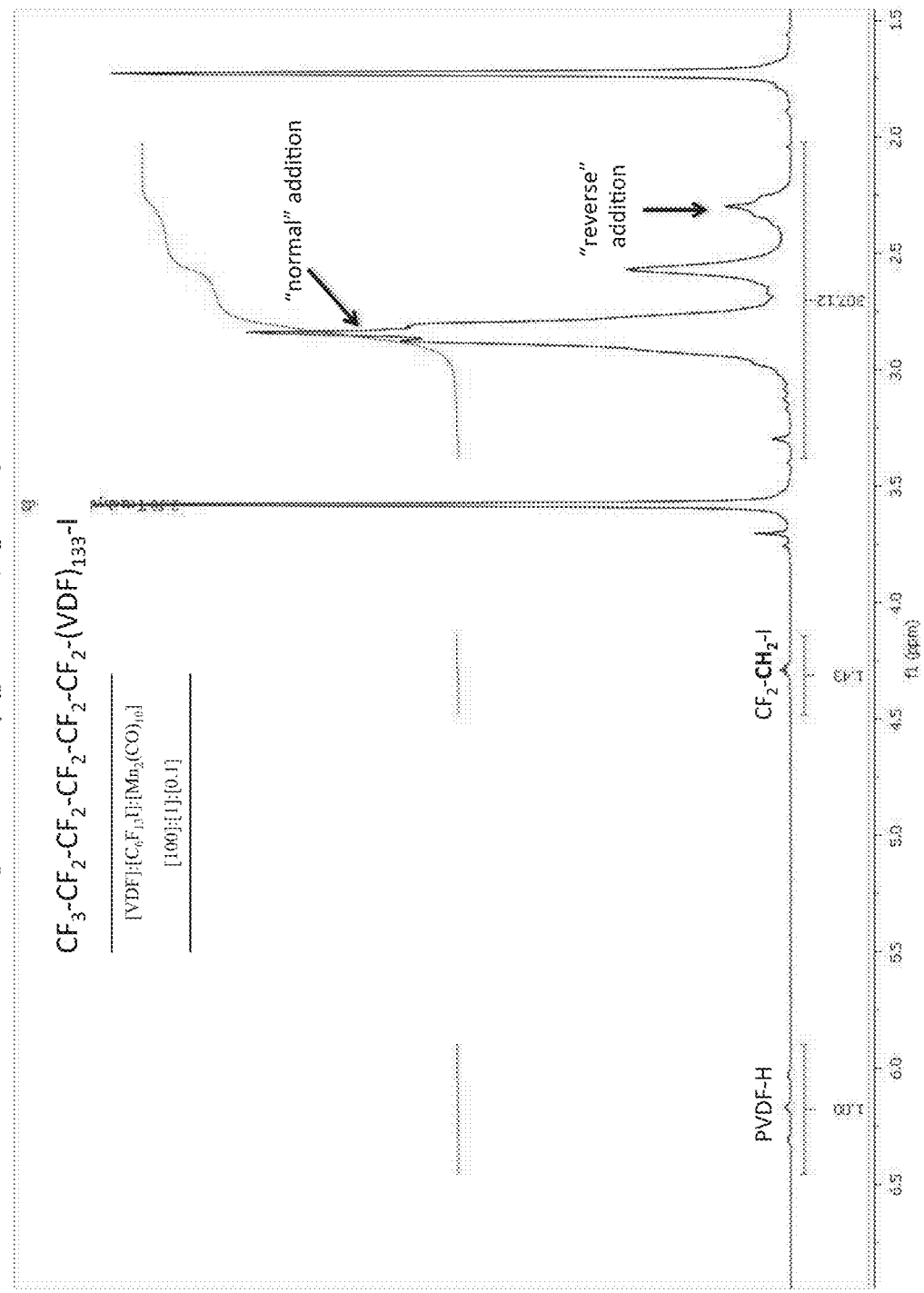
FIG. 4 $^1$H NMR spectrum for $C_6F_{13}$-PVDF-I ($M_n$ 8500 g/mol) in THF-$d8$ at rt

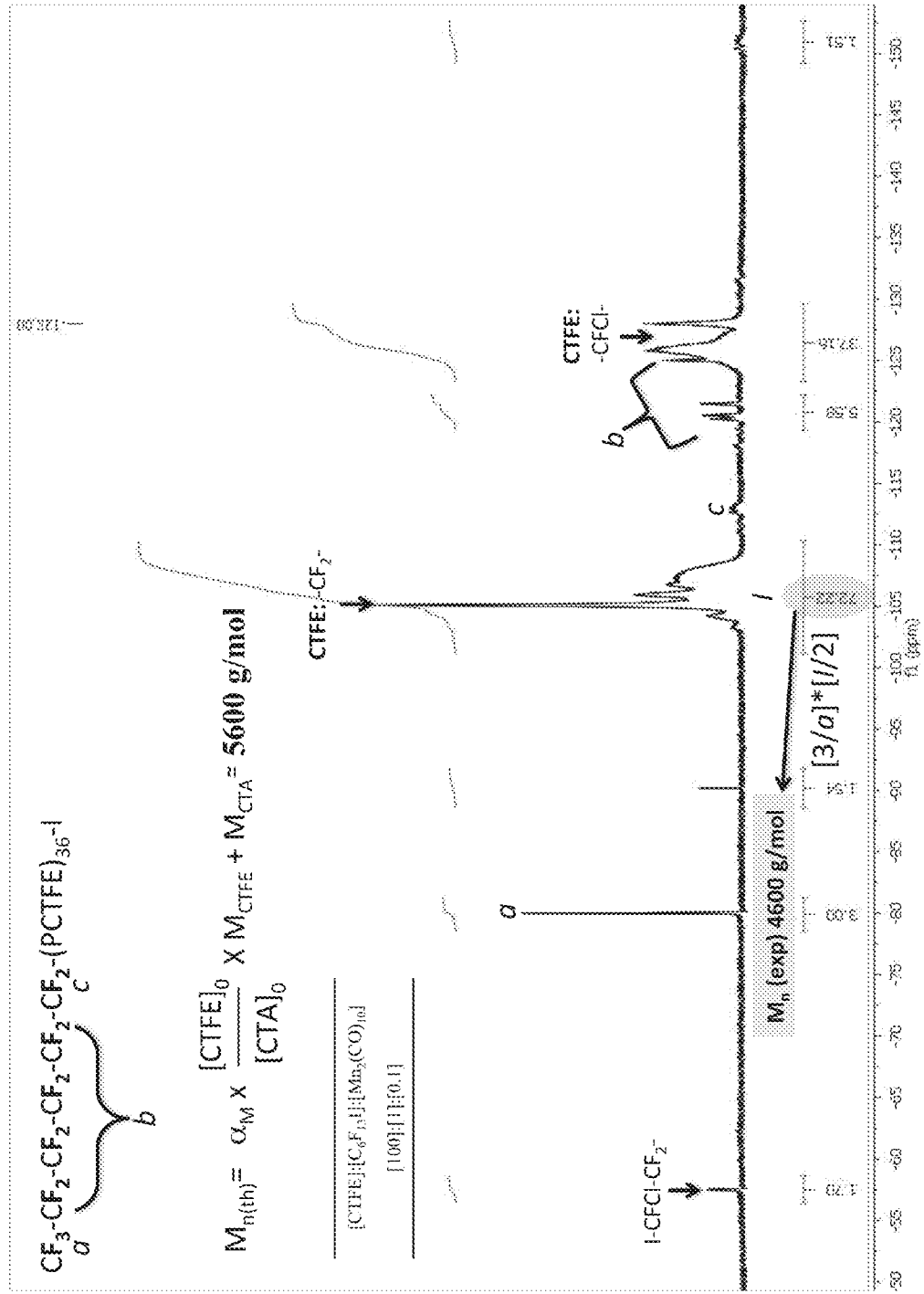

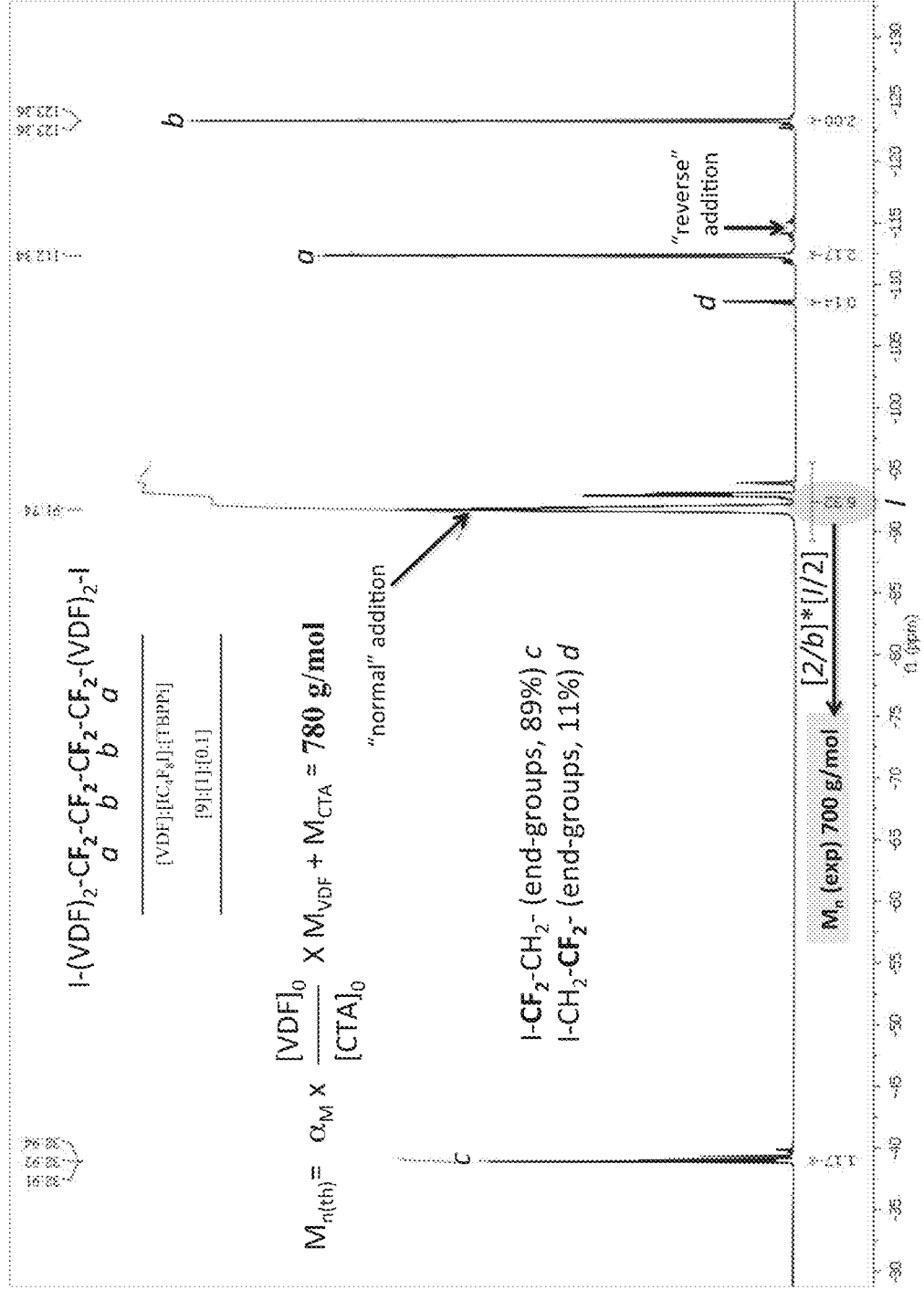
FIG. 6 $^{19}F$ NMR spectrum for I-PVDF-$C_4F_8$-PVDF-I ($M_n$ 700 g/mol) in acetone-$d6$ at rt

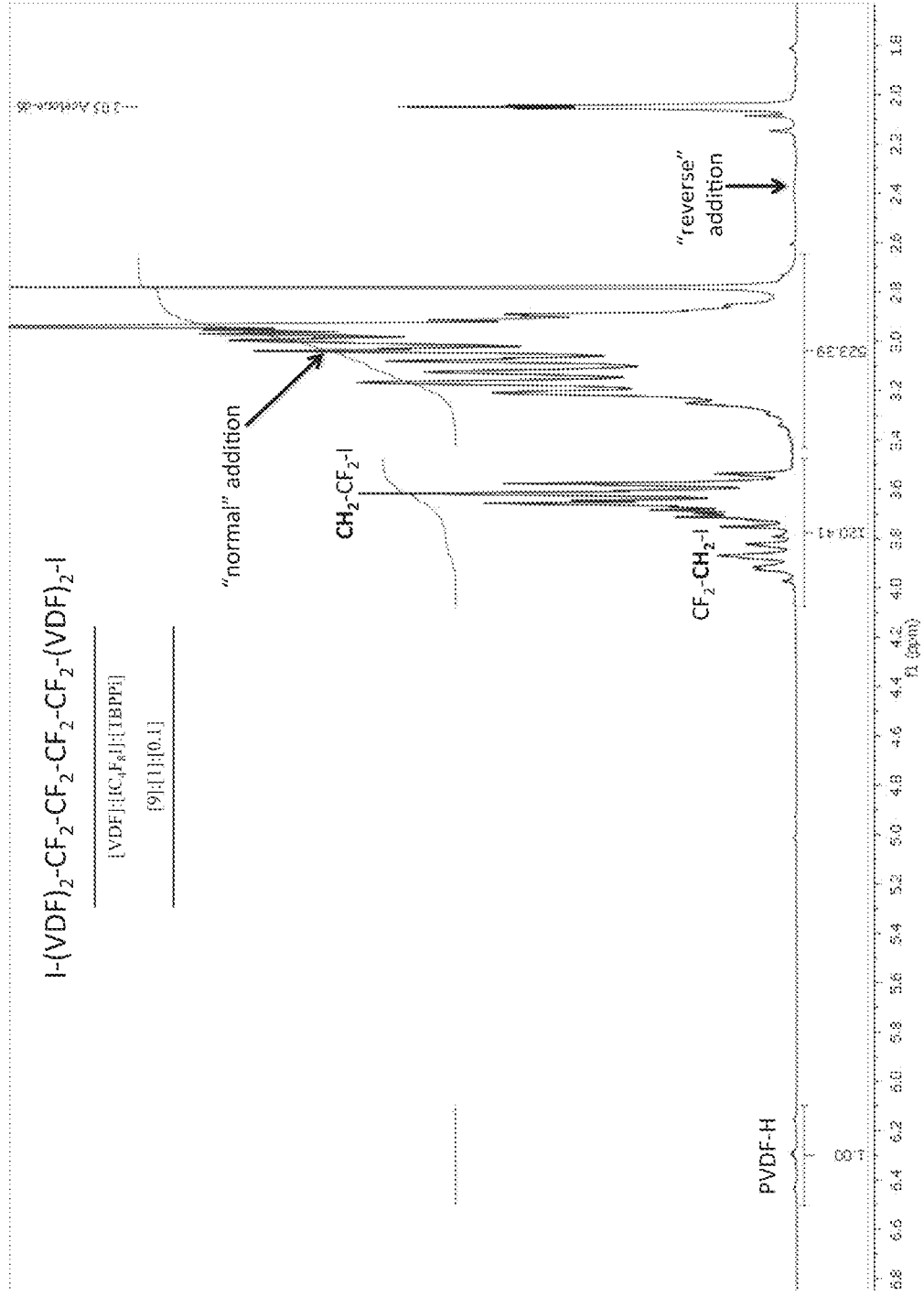

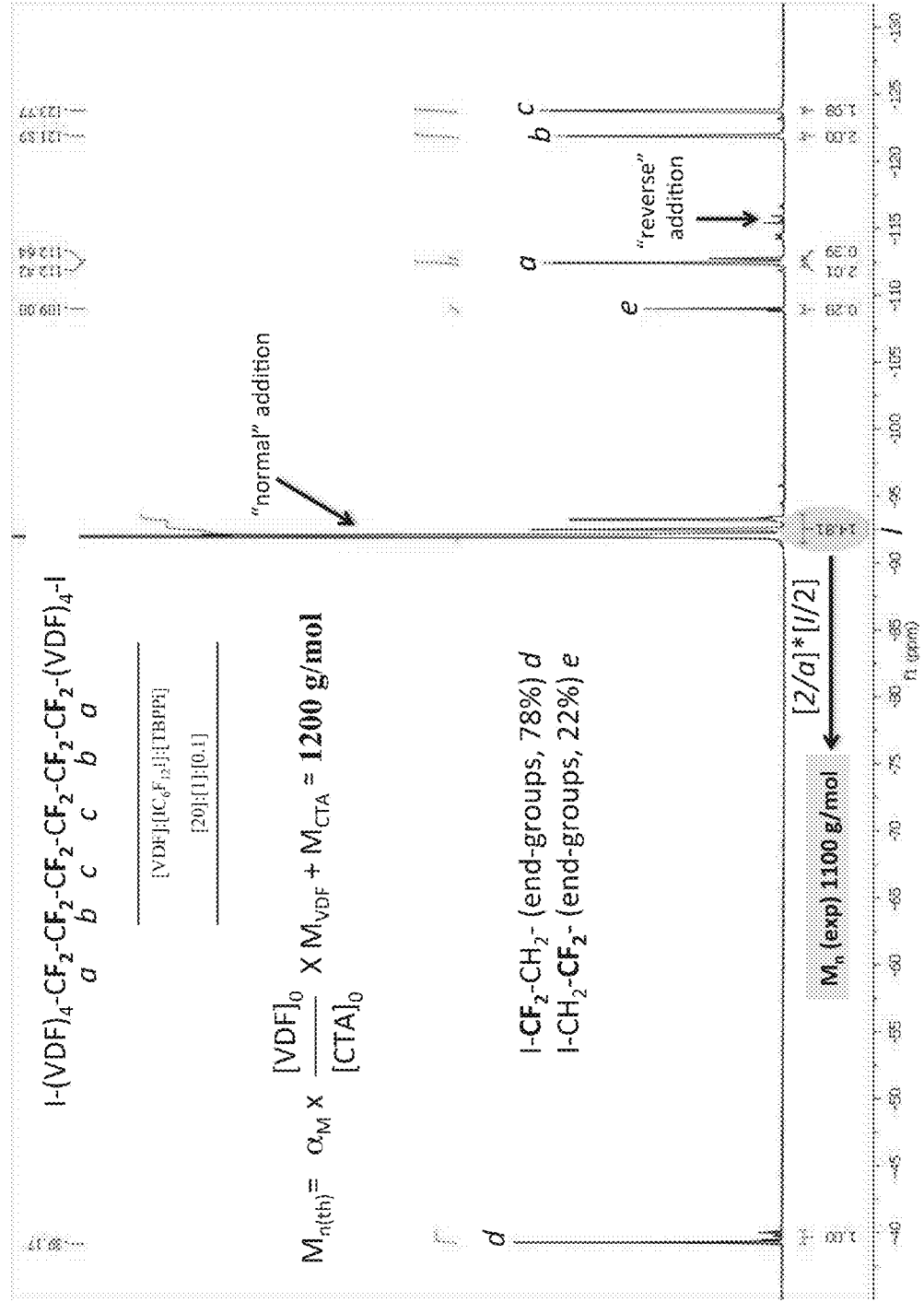
FIG. 8 $^{19}$F NMR spectrum for I-PVDF-C$_6$F$_{12}$-PVDF-I (M$_n$ 1100 g/mol) in acetone-$d6$ at rt

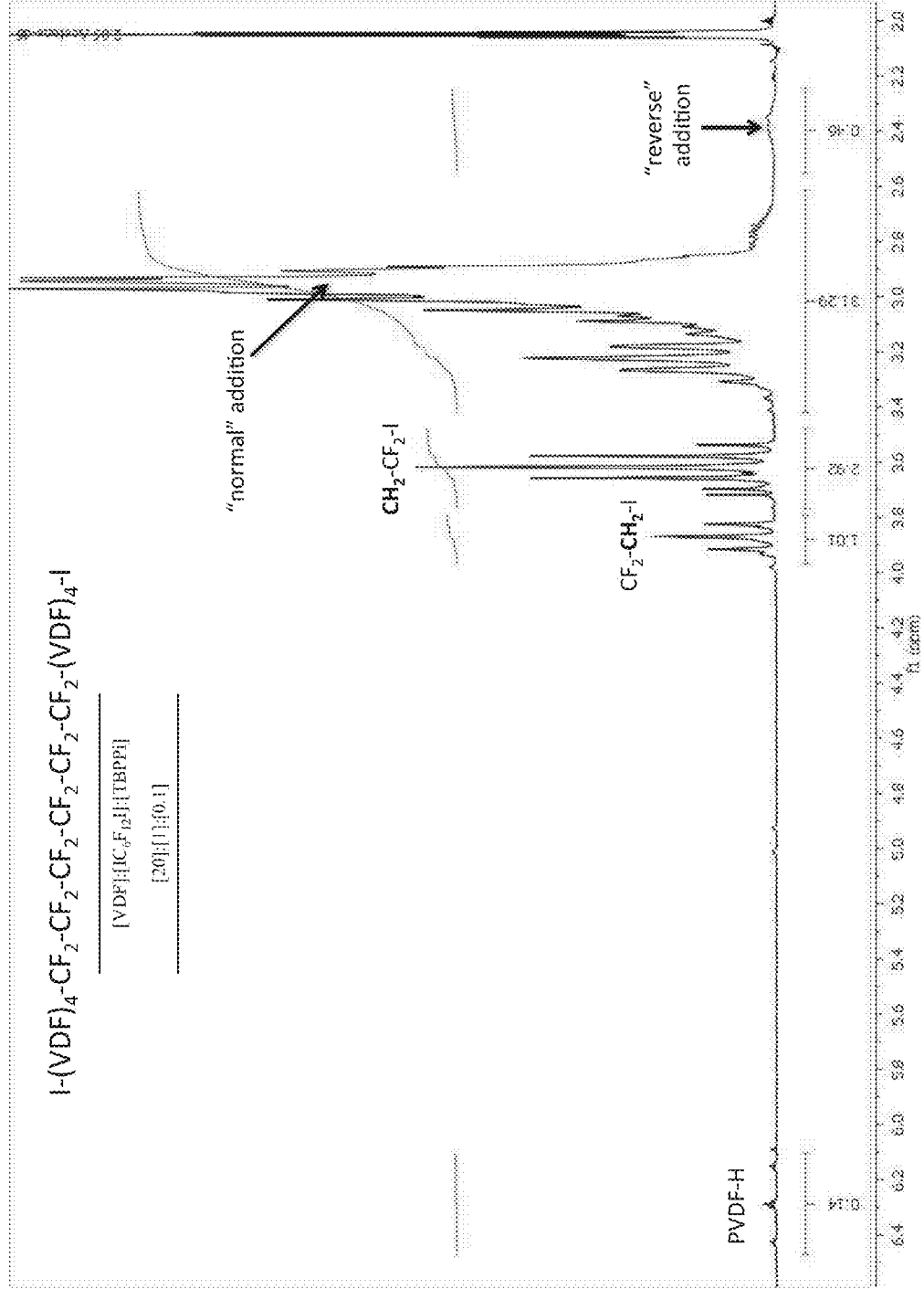
FIG. 9 $^1$H NMR spectrum for I-PVDF-C$_6$F$_{12}$-PVDF-I (M$_n$ 1100 g/mol) in acetone-$d6$ at rt

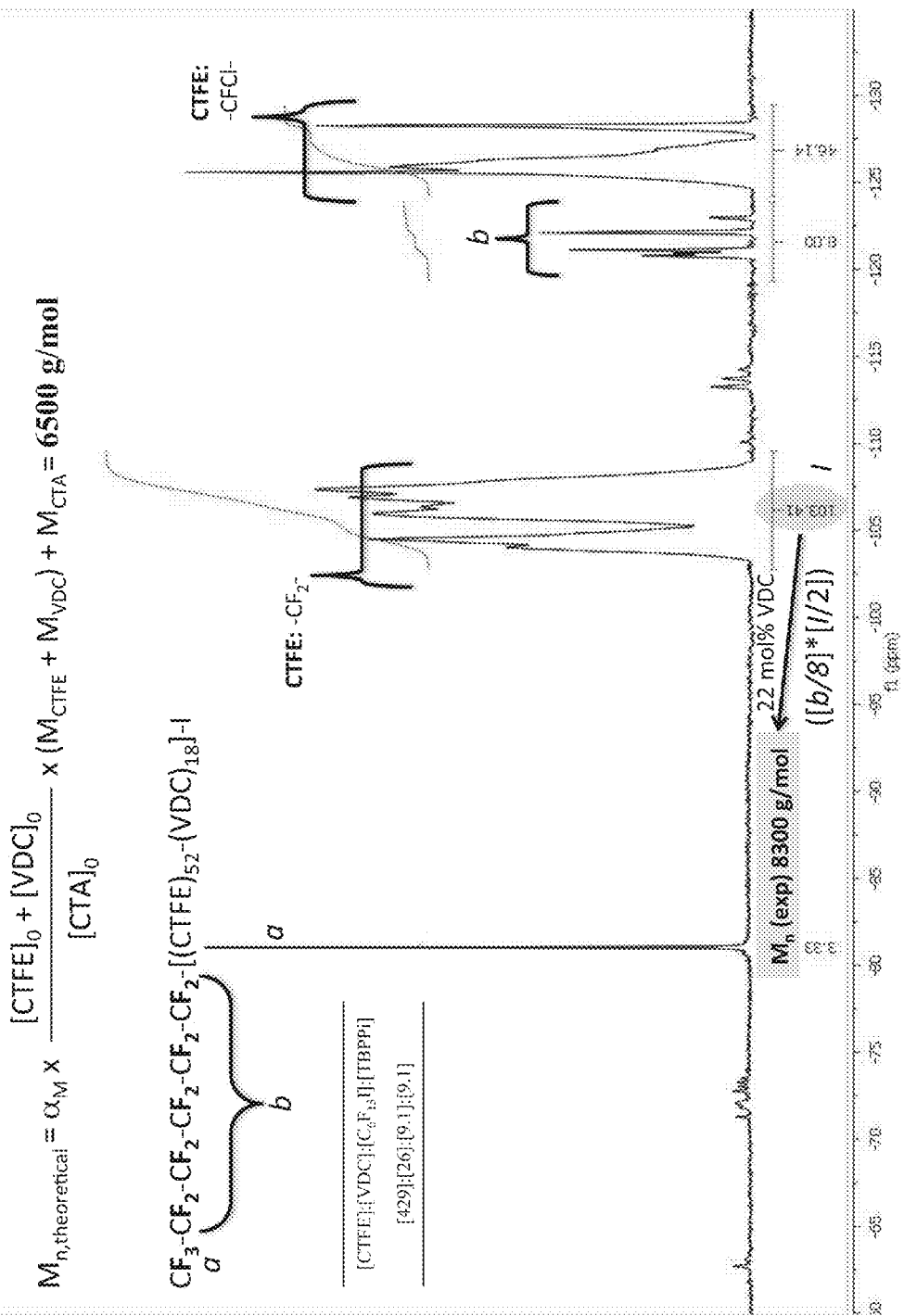

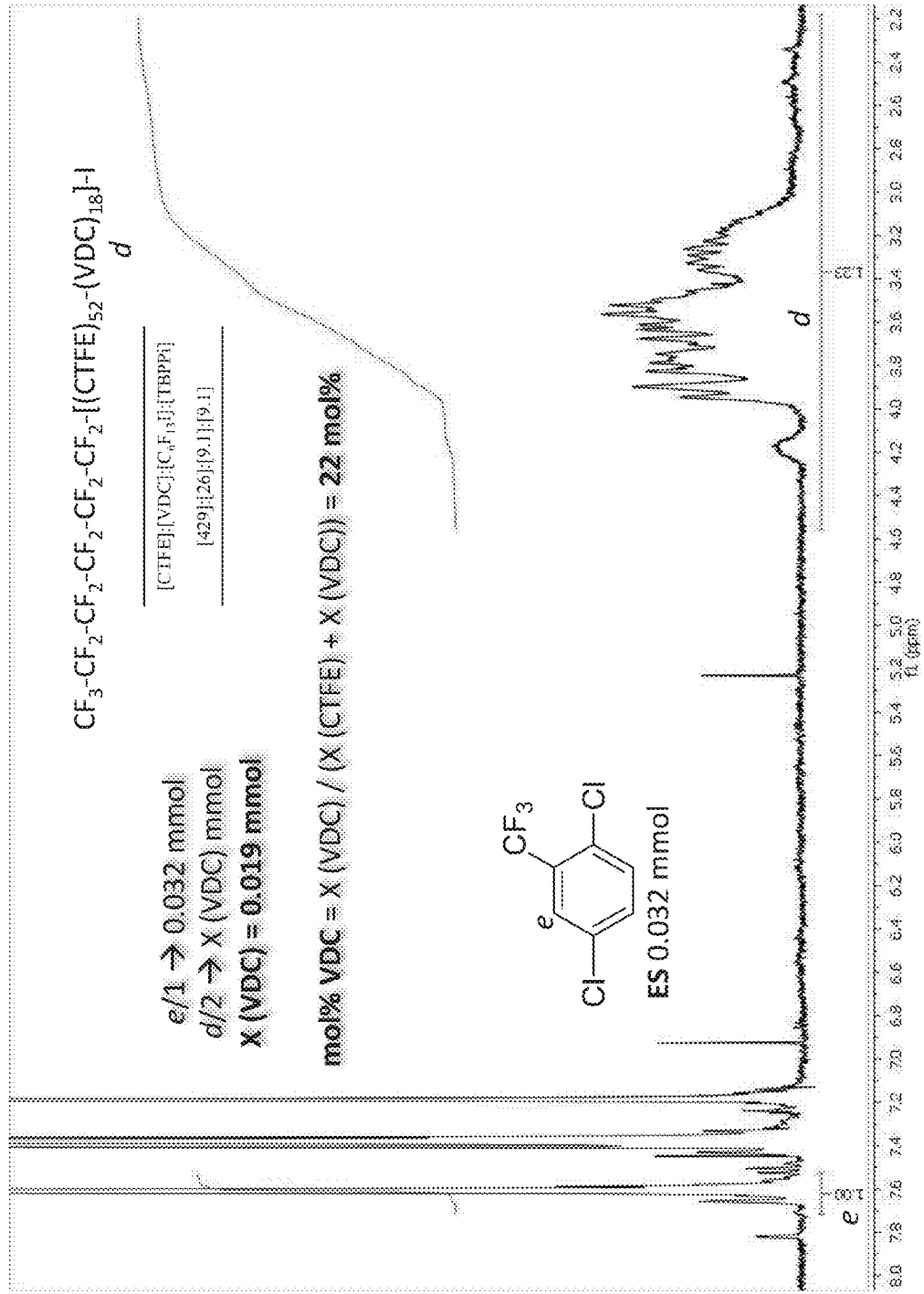
FIG. 11 $^1$H NMR spectrum for $C_6F_{13}$-(CTFE-co-VDC)-I ($M_n$ 8300 g/mol) in $CDCl_3$ at rt

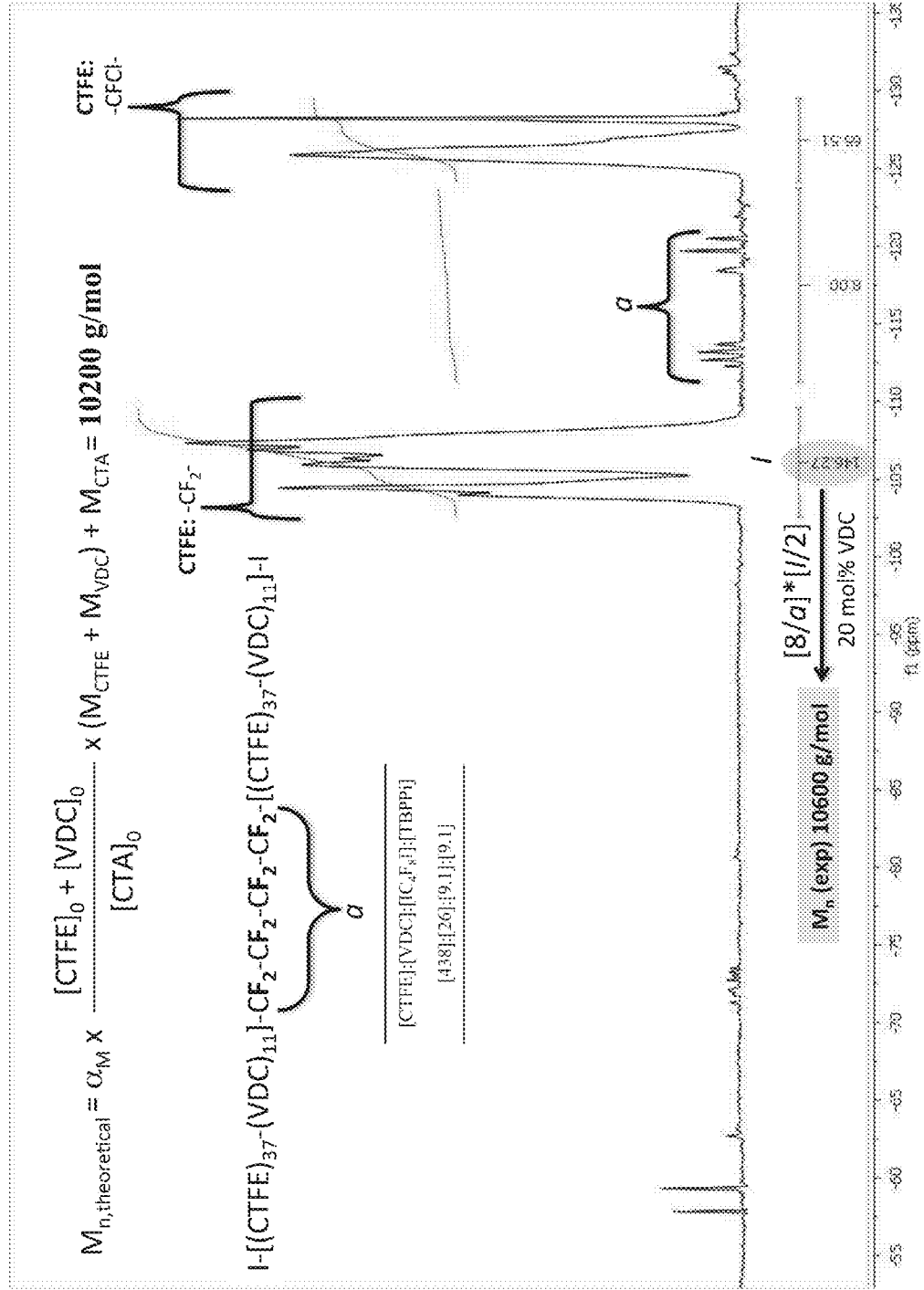
FIG. 12 $^{19}$F NMR spectrum for I-(CTFE-co-VDC)-C$_4$F$_8$-(CTFE-co-VDC)-I ($M_n$ 10600 g/mol) in toluene-$d8$ at 90 °C

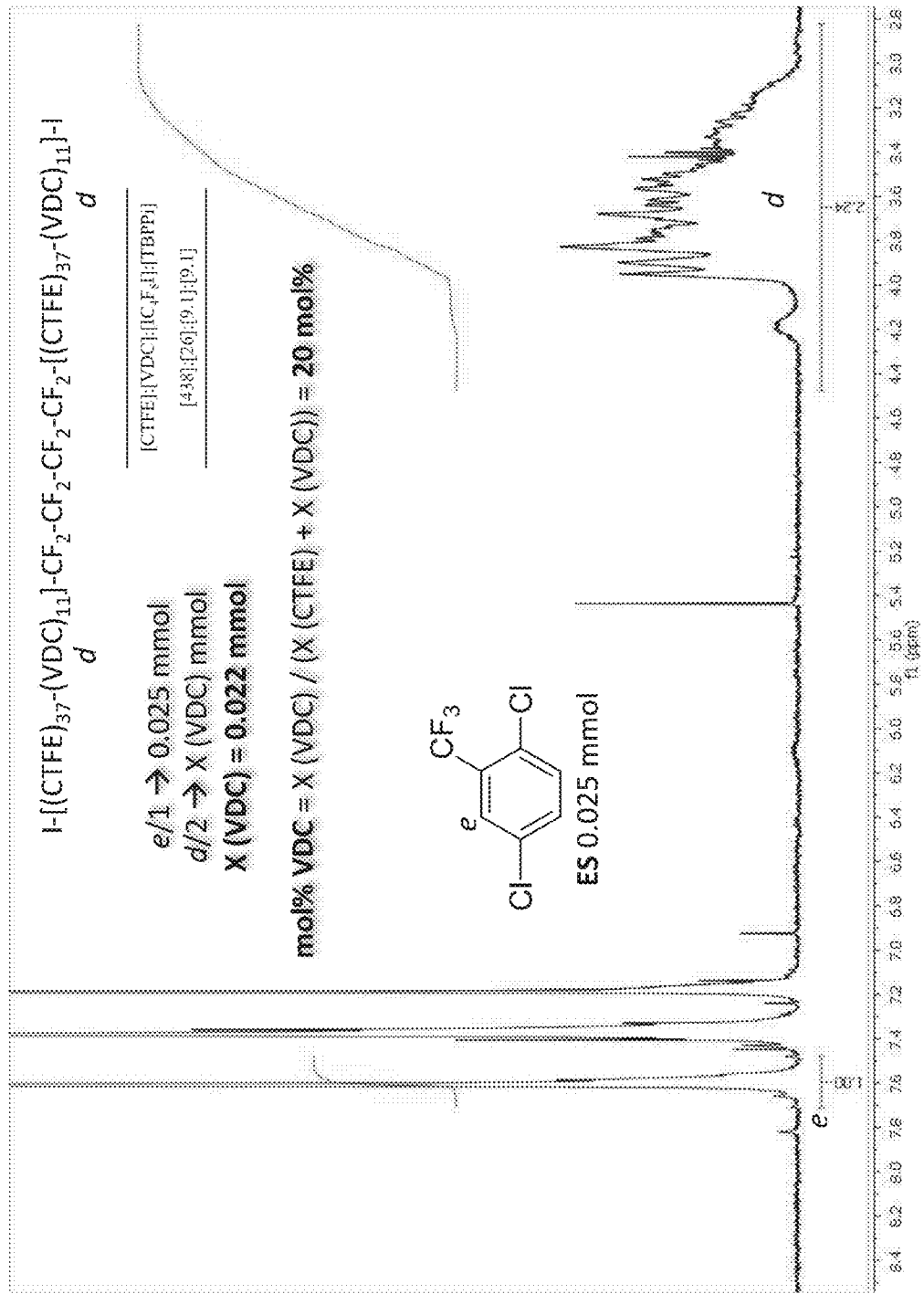
FIG. 13 $^1$H NMR spectrum for I-(CTFE-co-VDC)-C$_4$F$_8$-(CTFE-co-VDC)-I (M$_n$ 10600 g/mol) in CDCl$_3$ at rt

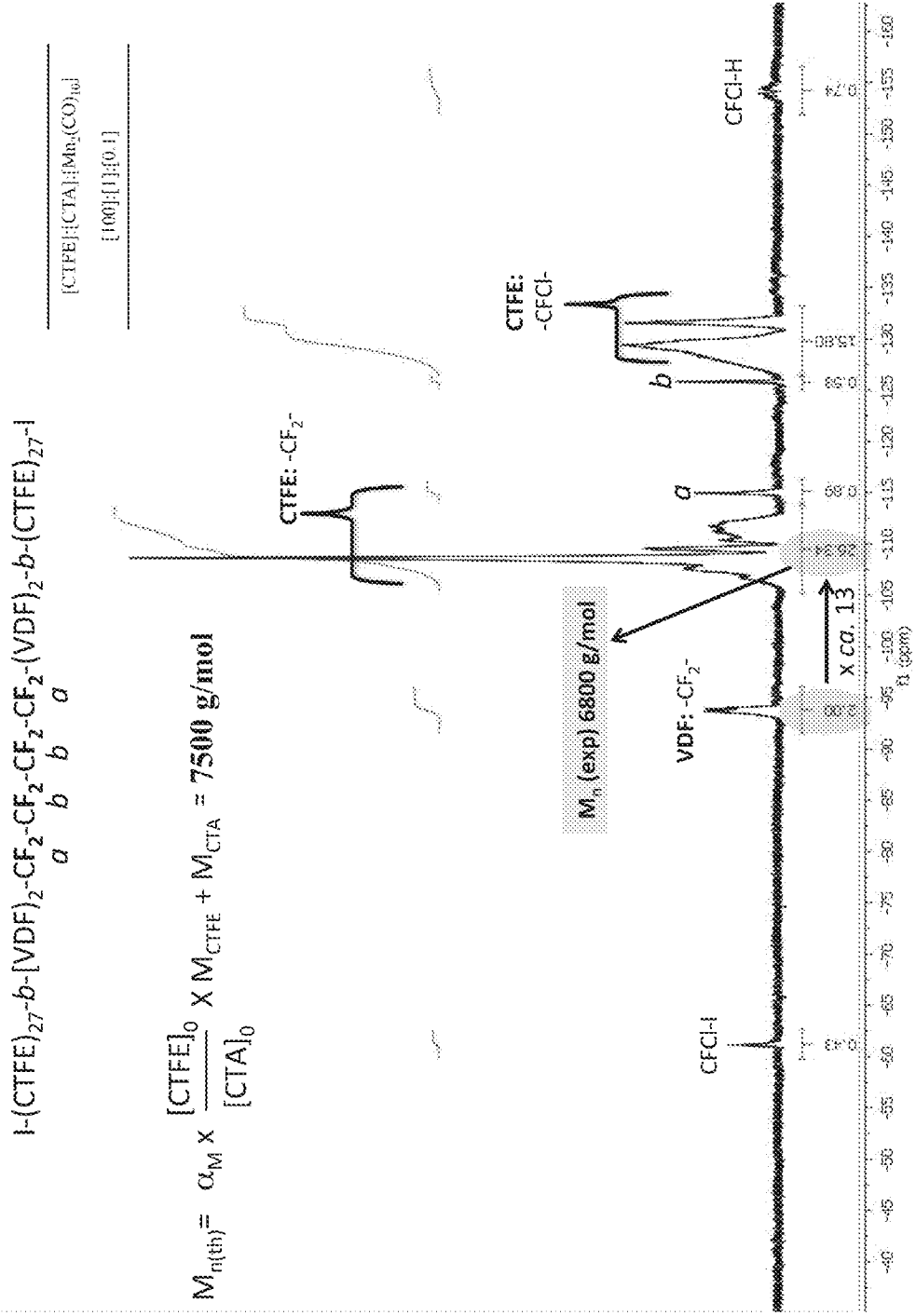

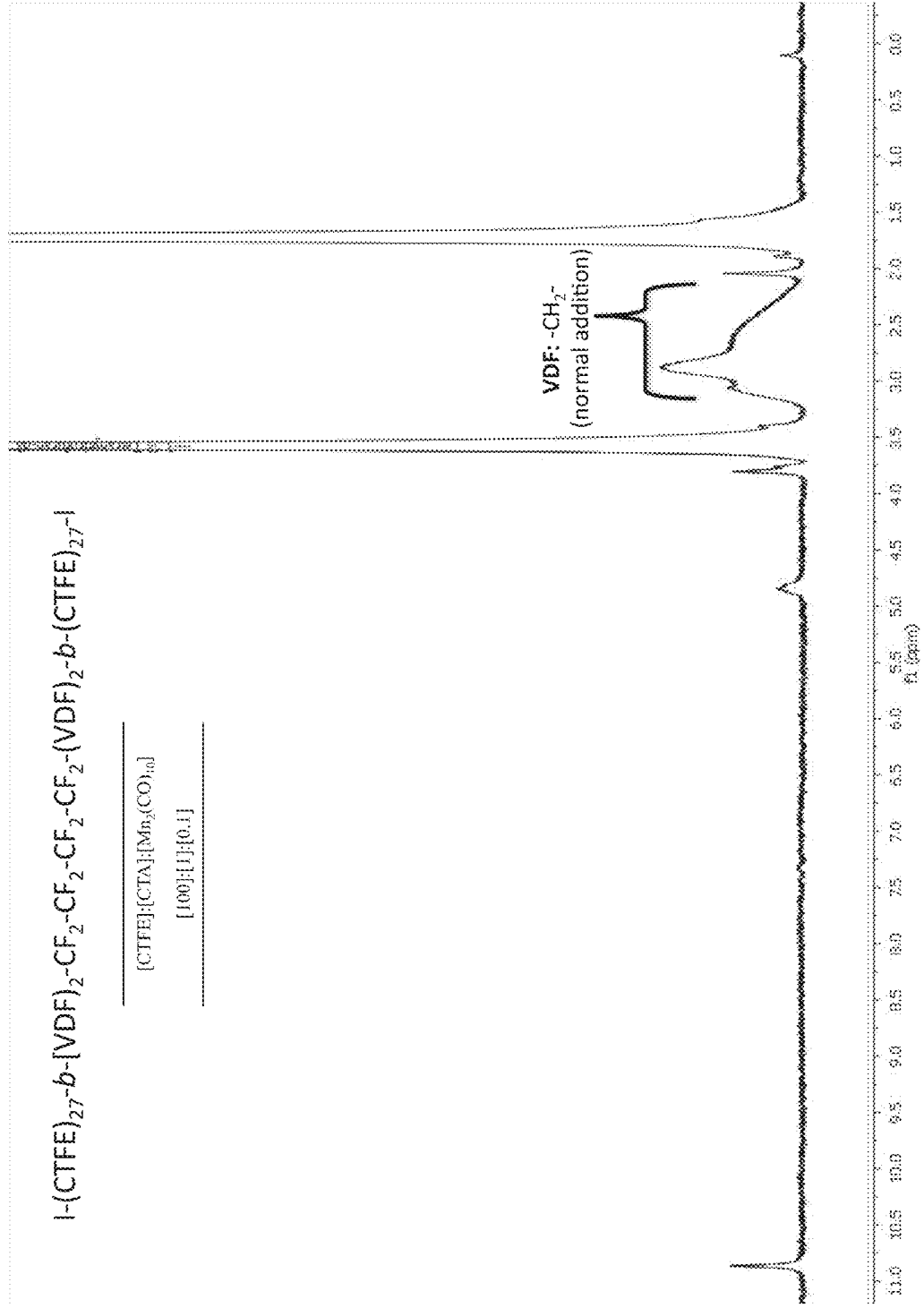
FIG. 15 1H NMR spectrum for PCTFE-b-PVDF-b-PCTFE ($M_n$ 6800 g/mol) in THF-d8 at rt

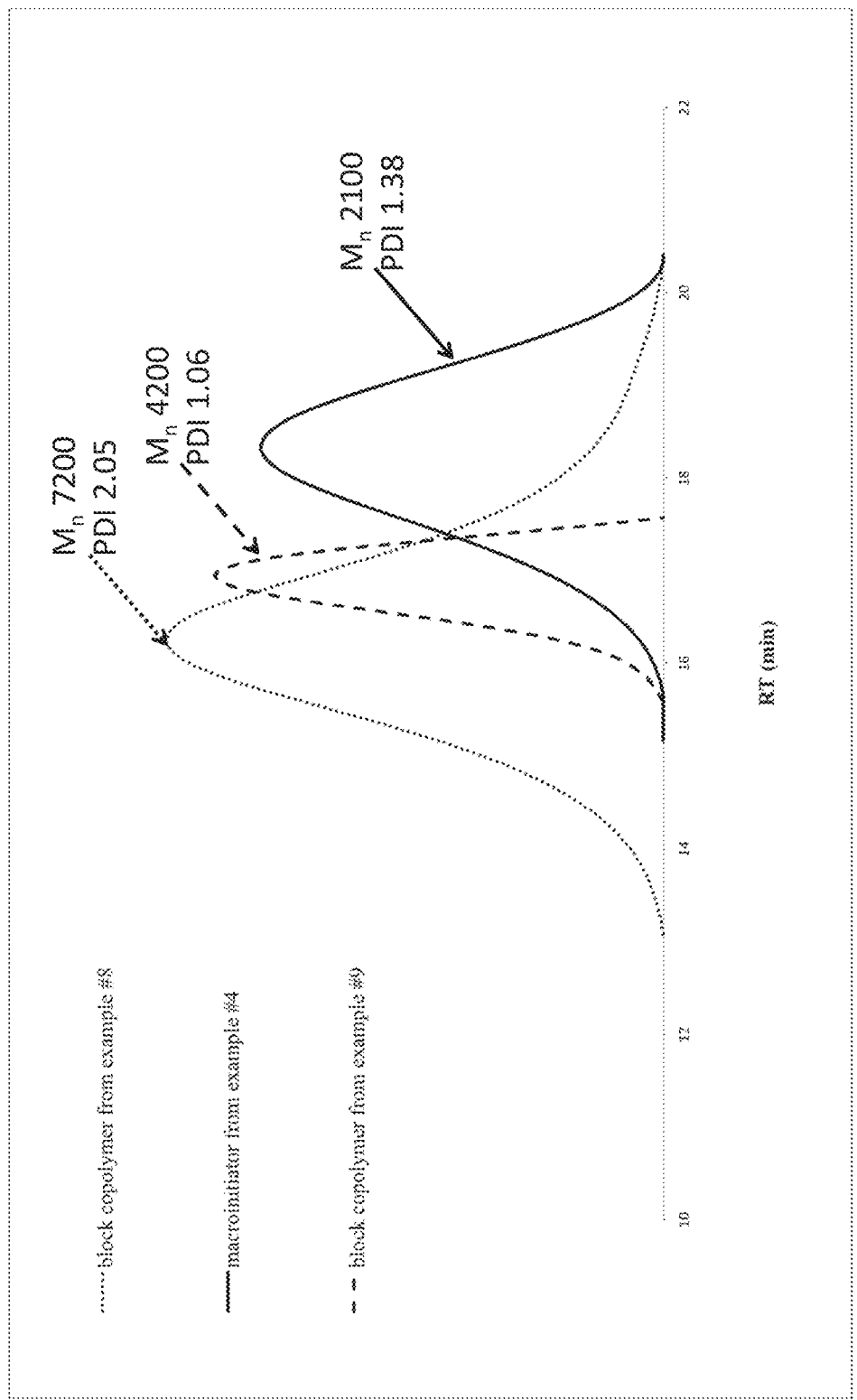
FIG. 16 SEC chromatograms for macroinitiator #4, block copolymer #8, and block copolymer #9 in DMF (with PMMA standards)

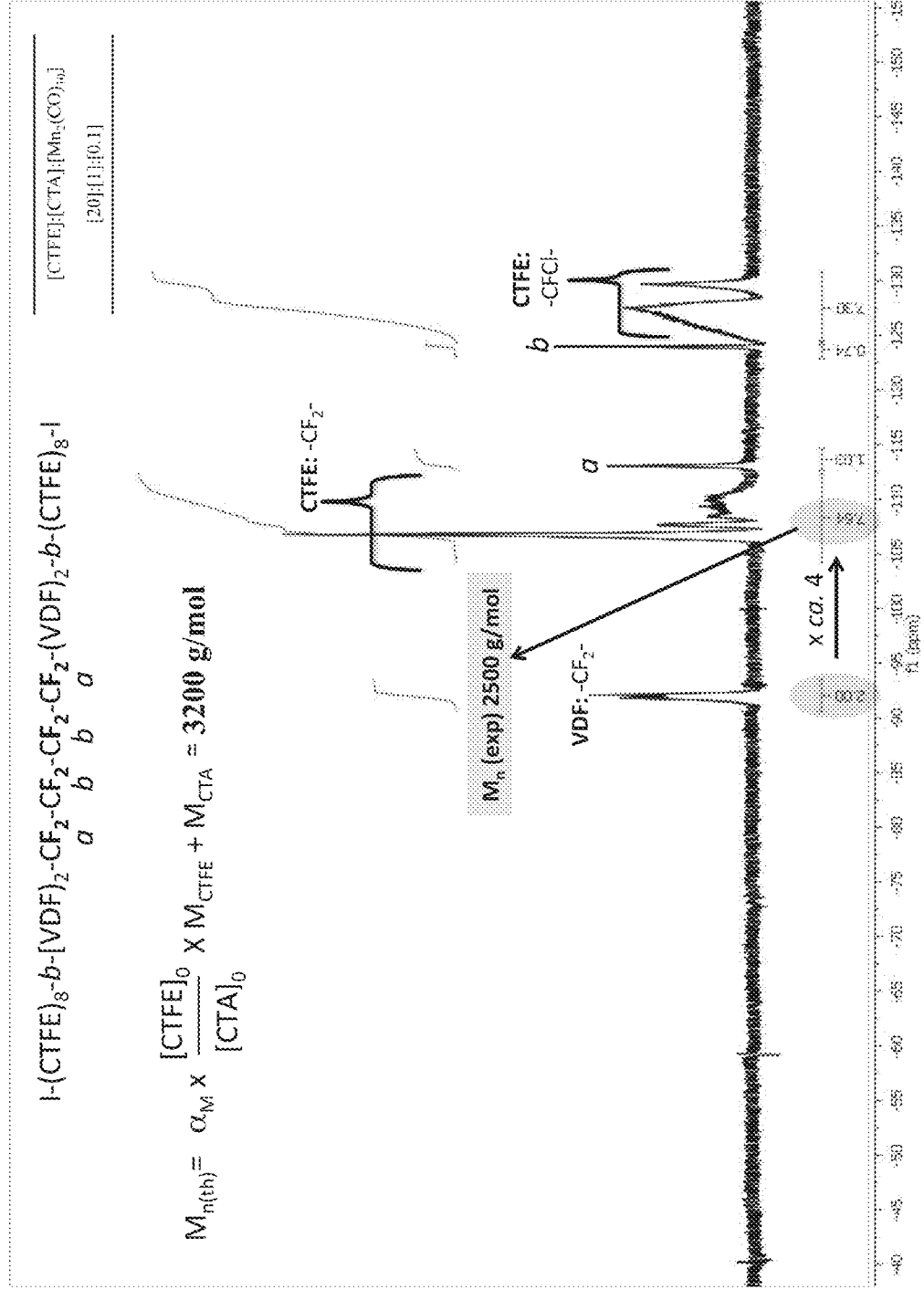

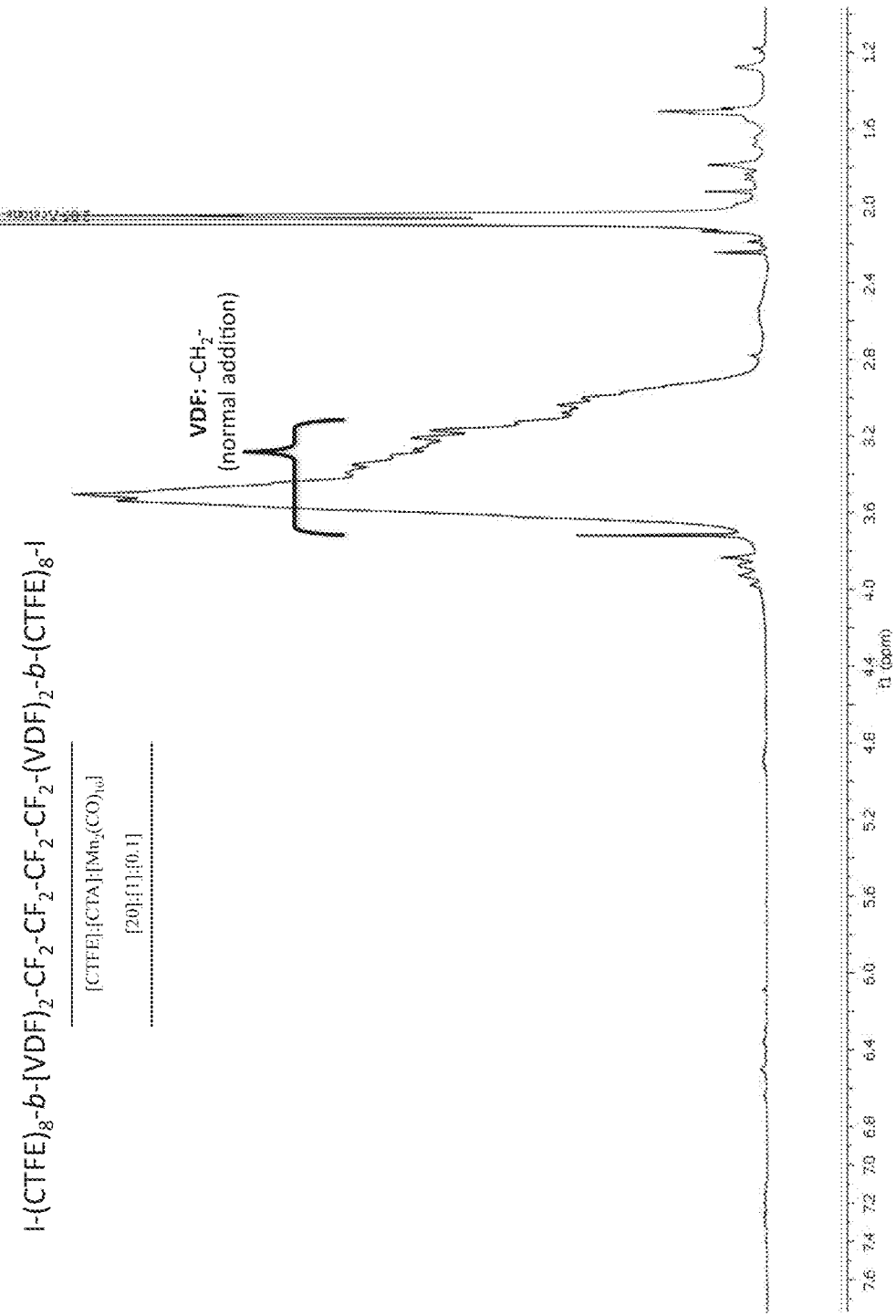

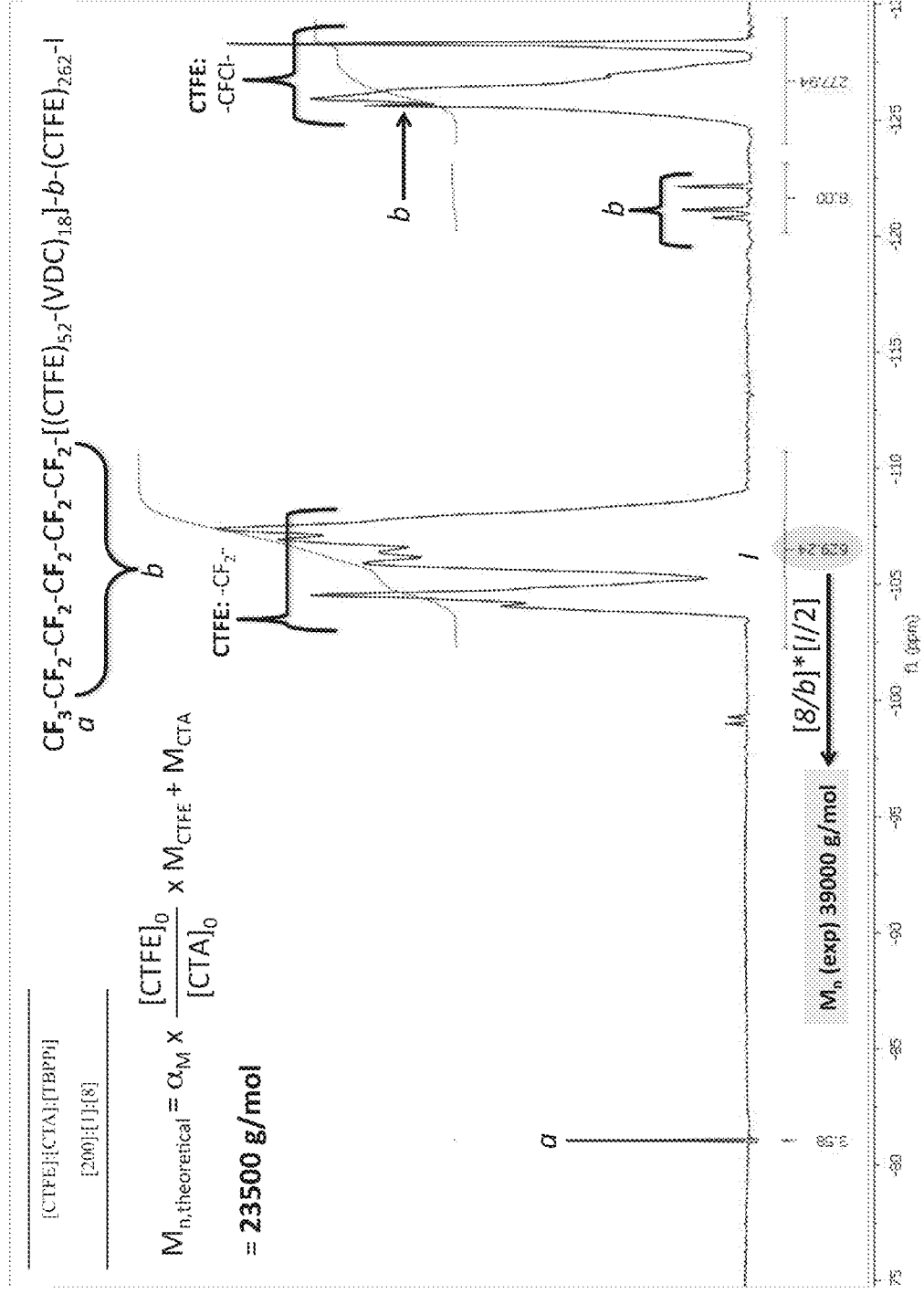
FIG. 19 $^{19}$F NMR spectrum for $C_6F_{13}$-(CTFE-co-VDC)-b-PCTFE ($M_n$ 39000 g/mol) in toluene-d8 at 90 °C

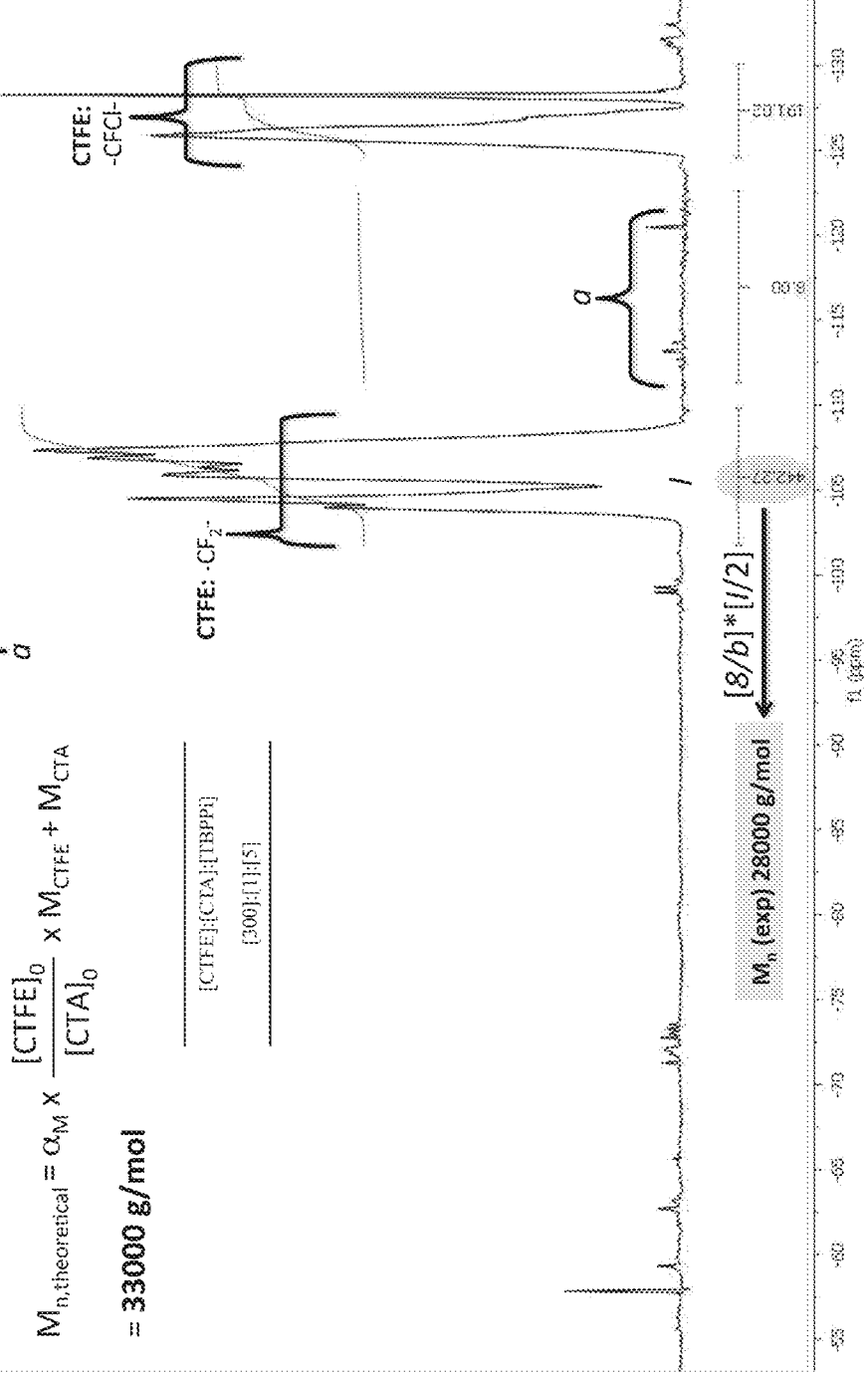
FIG. 20a $^{19}$F NMR spectrum for PCTFE-b-(CTFE-co-VDC)-b-PCTFE ($M_n$ 28000 g/mol) in toluene-d8 at 90 °C

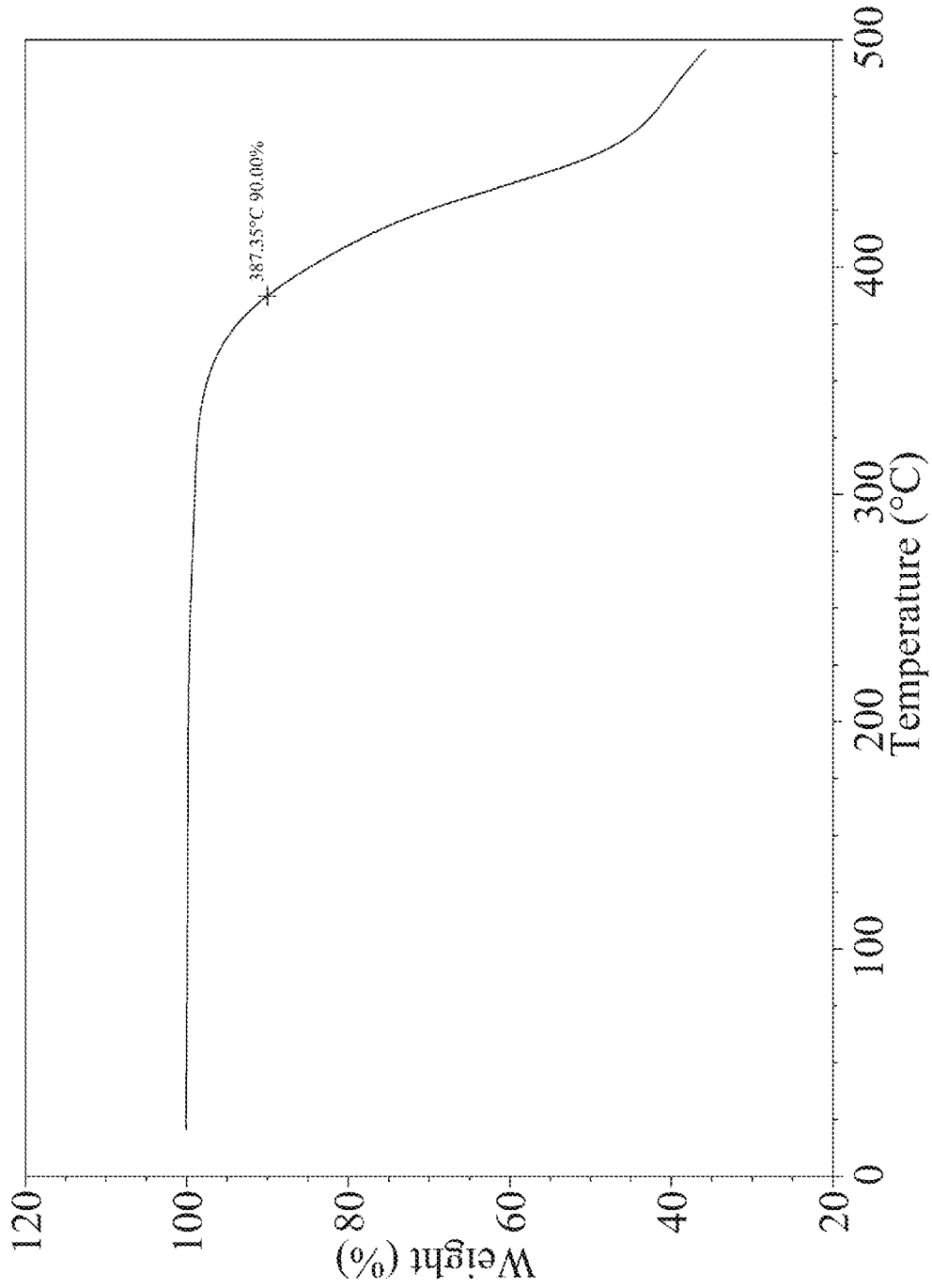
FIG. 20b TGA thermogram (under air) for $C_6F_{13}$-PVDF-I ($M_n$ 62000 g/mol)

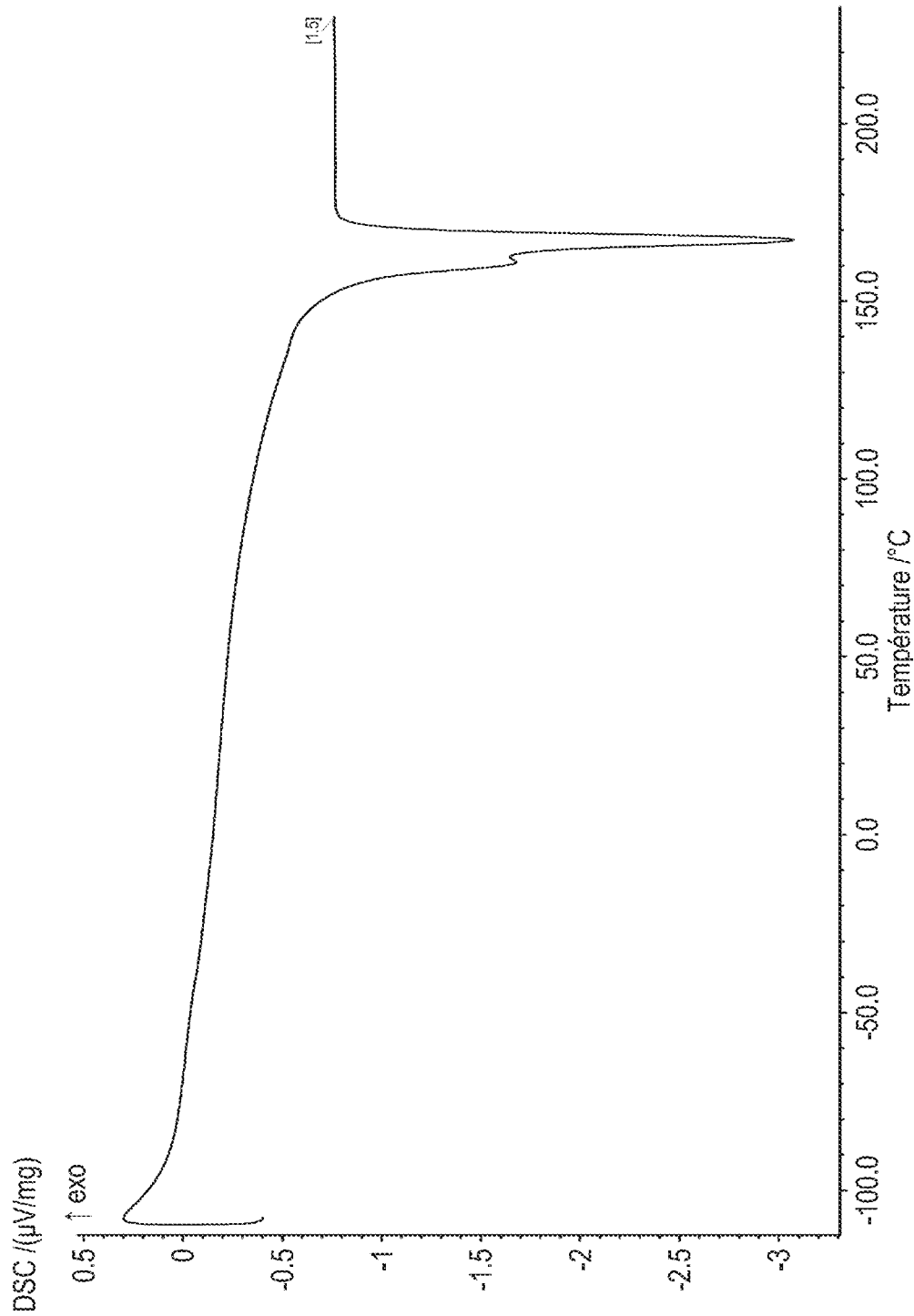
FIG. 21 DSC thermogram for $C_6F_{13}$-PVDF-I ($M_n$ 62000 g/mol)

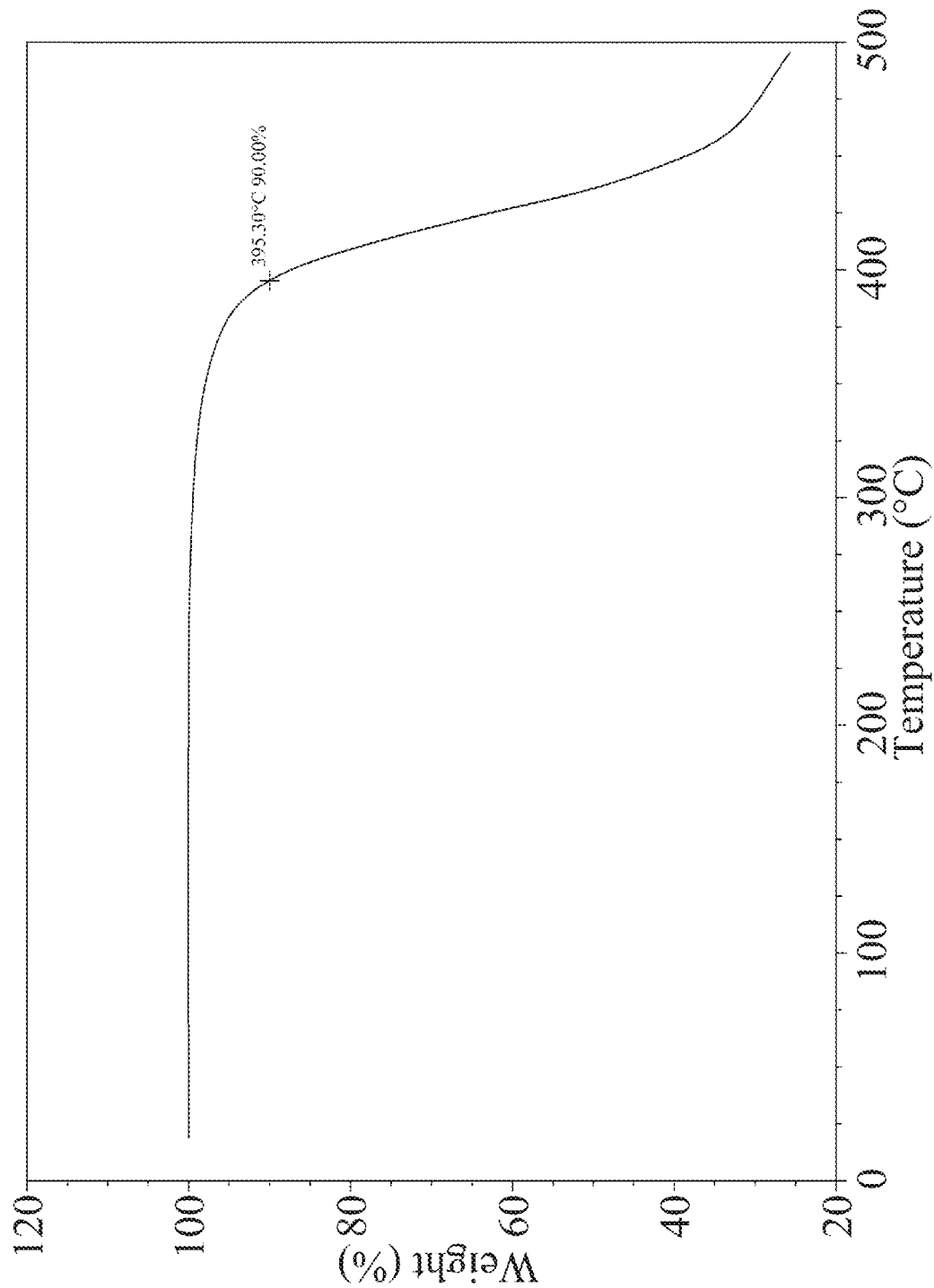
FIG. 22 TGA thermogram (under air) for $C_6F_{13}$-PVDF-I ($M_n$ 8500 g/mol)

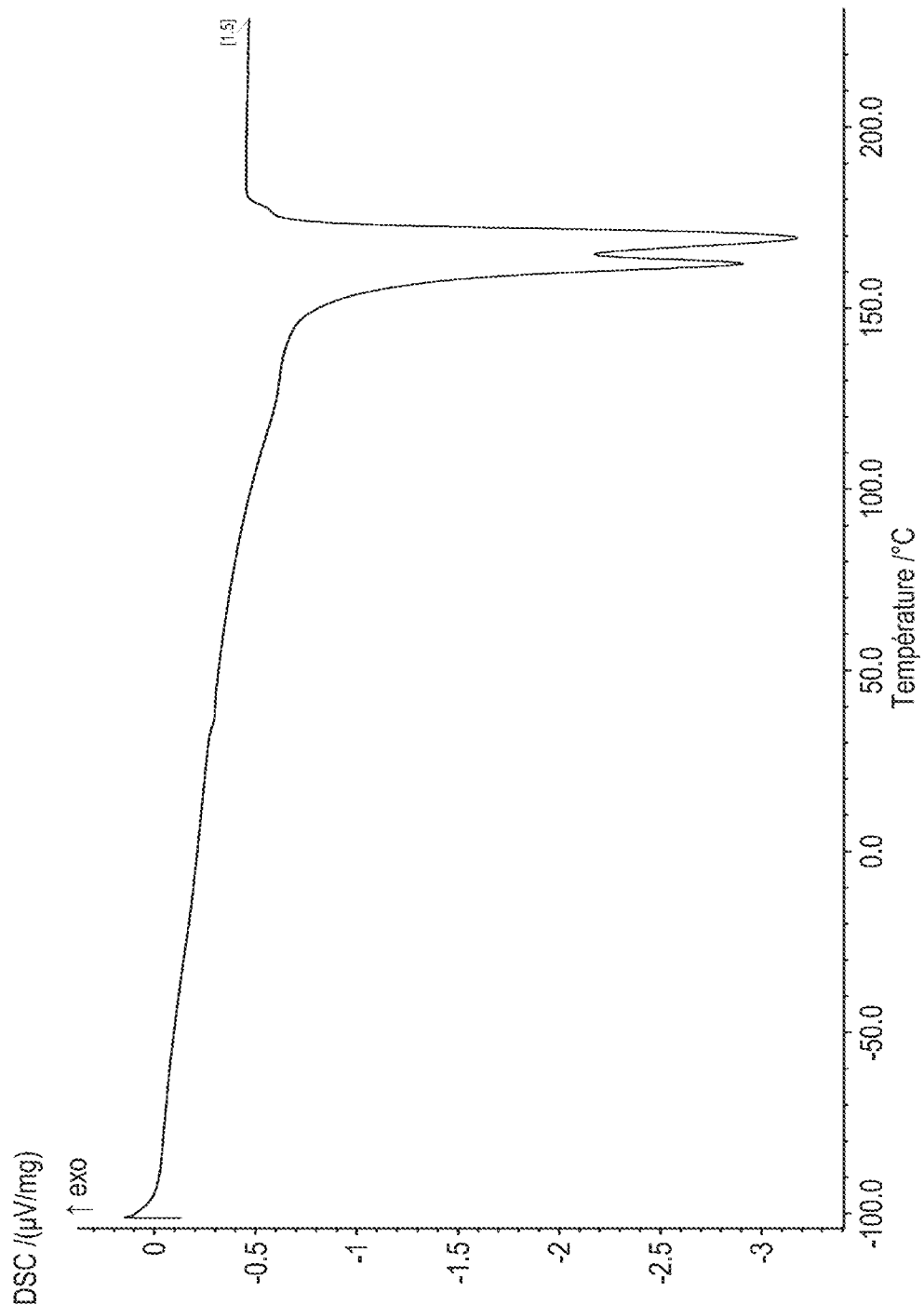
FIG. 23 DSC thermogram for $C_6F_{13}$-PVDF-I ($M_n$ 8500 g/mol)

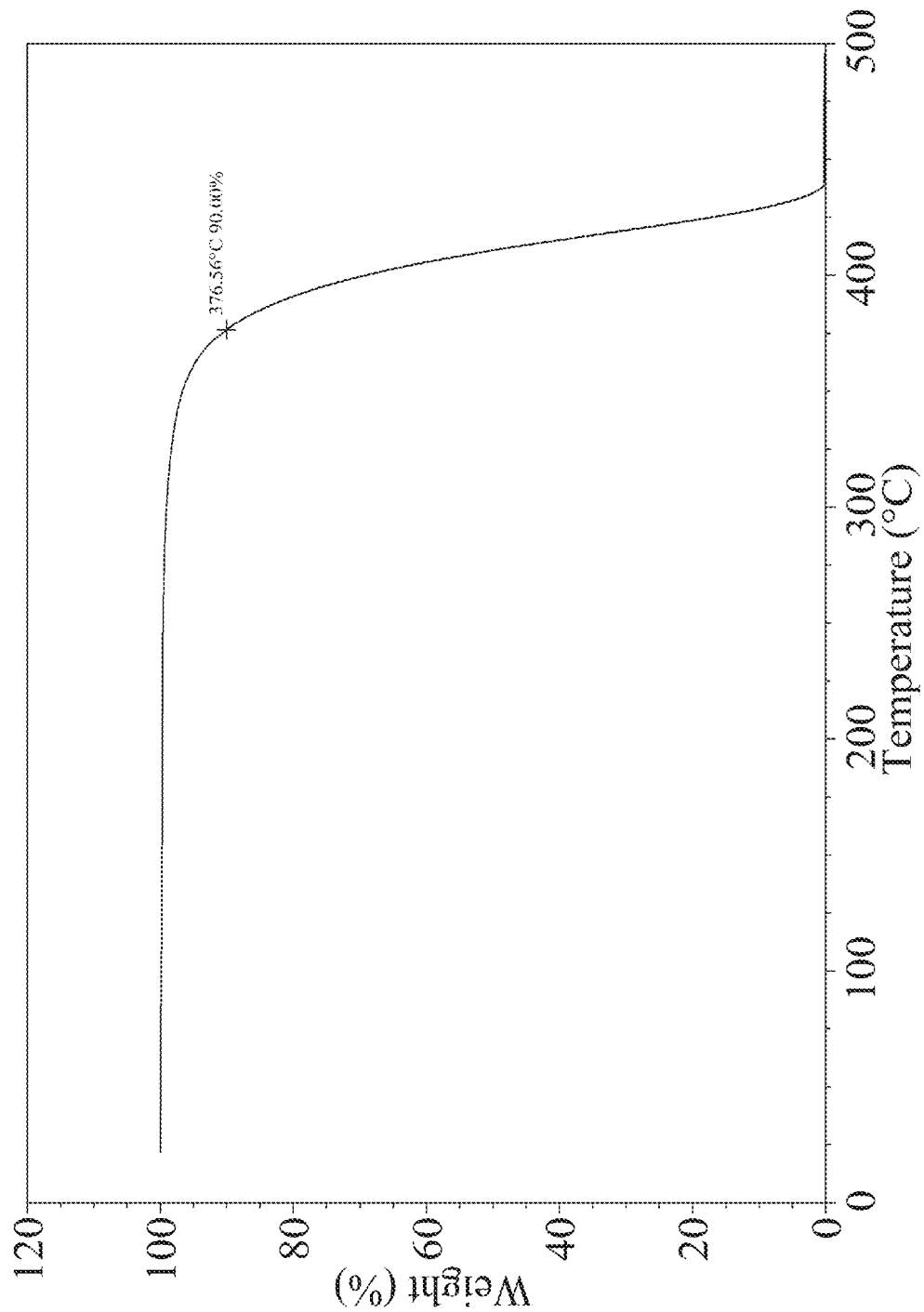
FIG. 24 TGA thermogram (under air) for $C_6F_{13}$-PCTFE-I ($M_n$ 4600 g/mol)

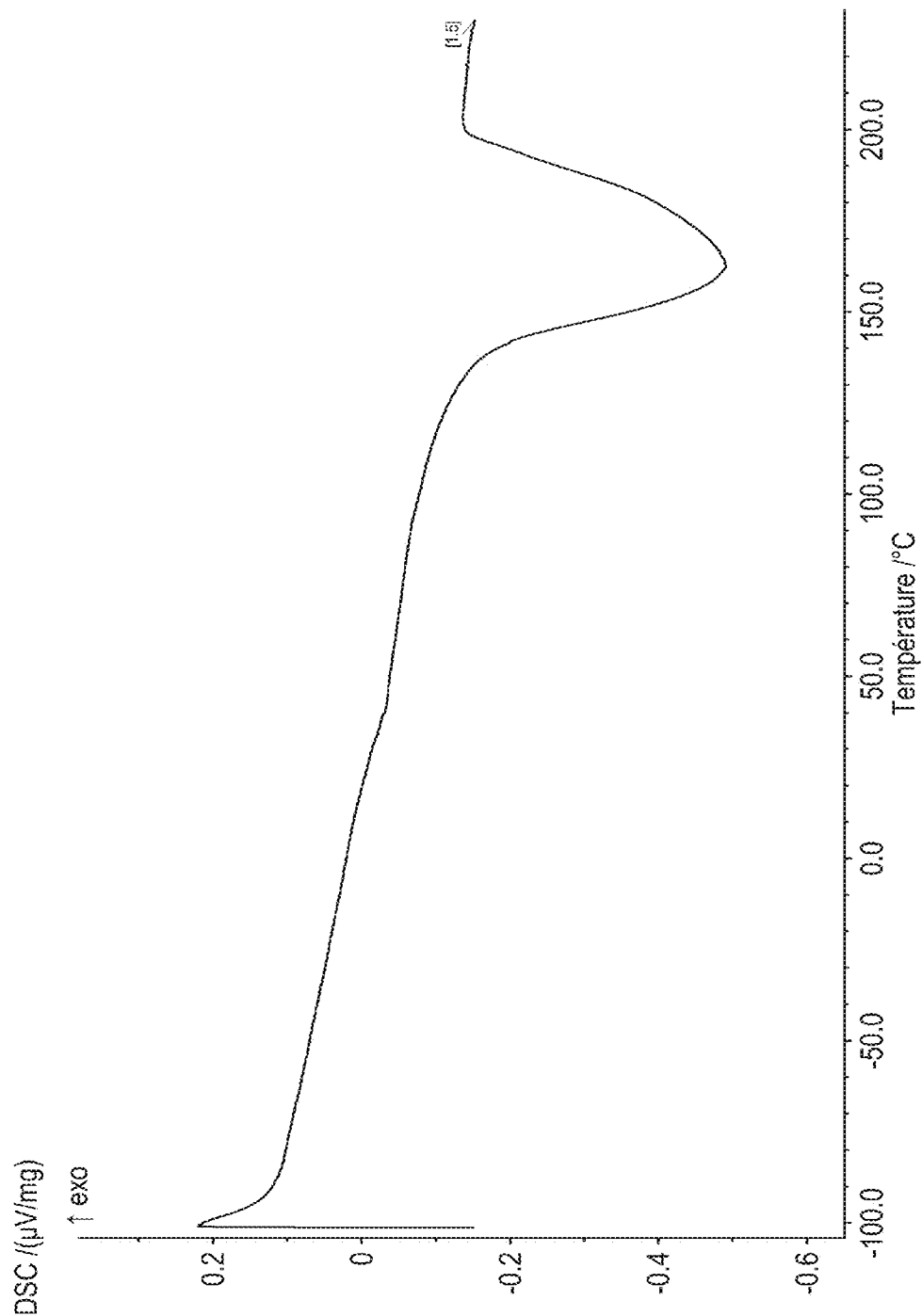
FIG. 25 DSC thermogram for $C_6F_{13}$-PCTFE-I ($M_n$ 4600 g/mol)

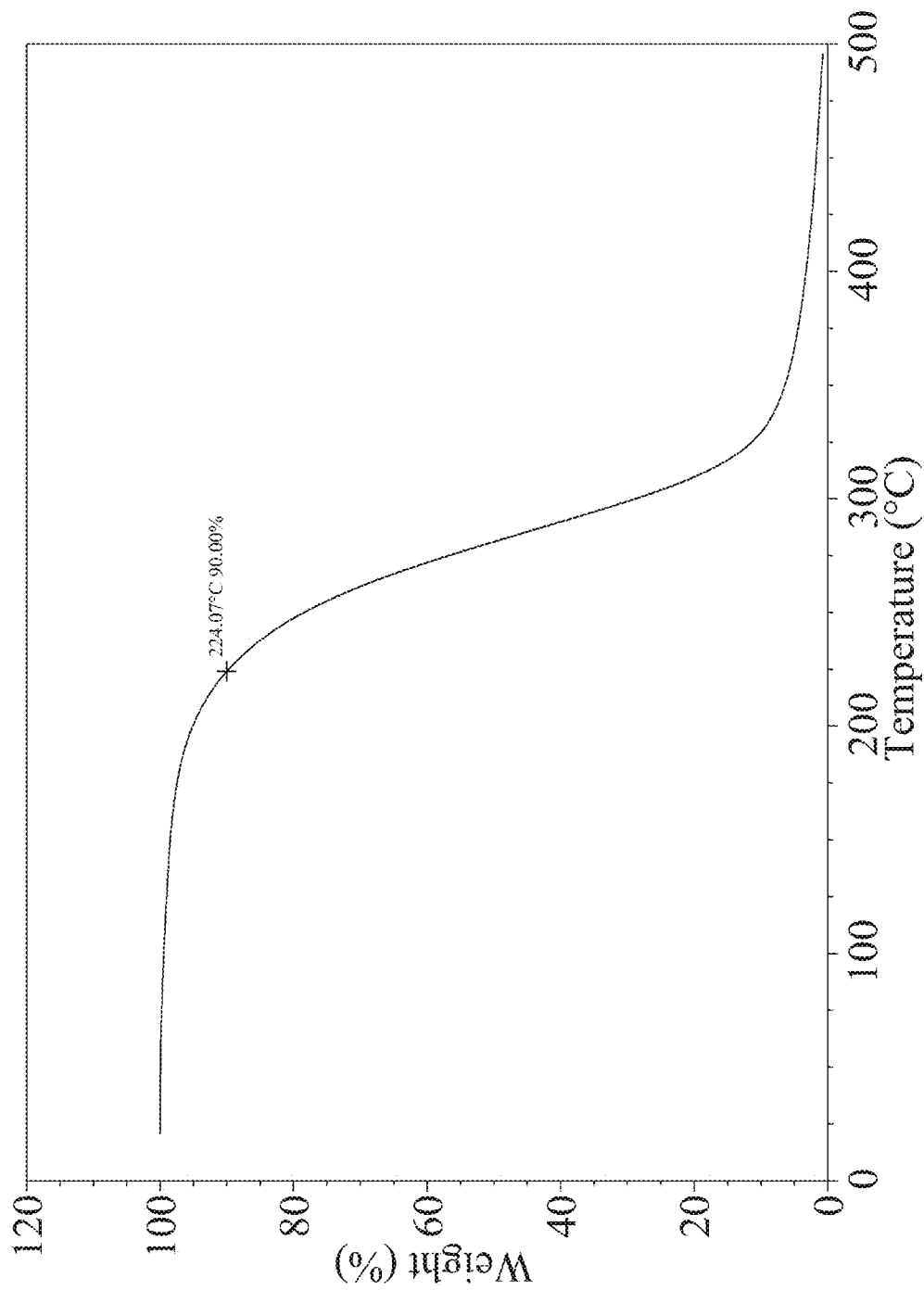
FIG. 26 TGA thermogram (under air) for I-PVDF-$C_4F_8$-PVDF-I ($M_n$ 700 g/mol)

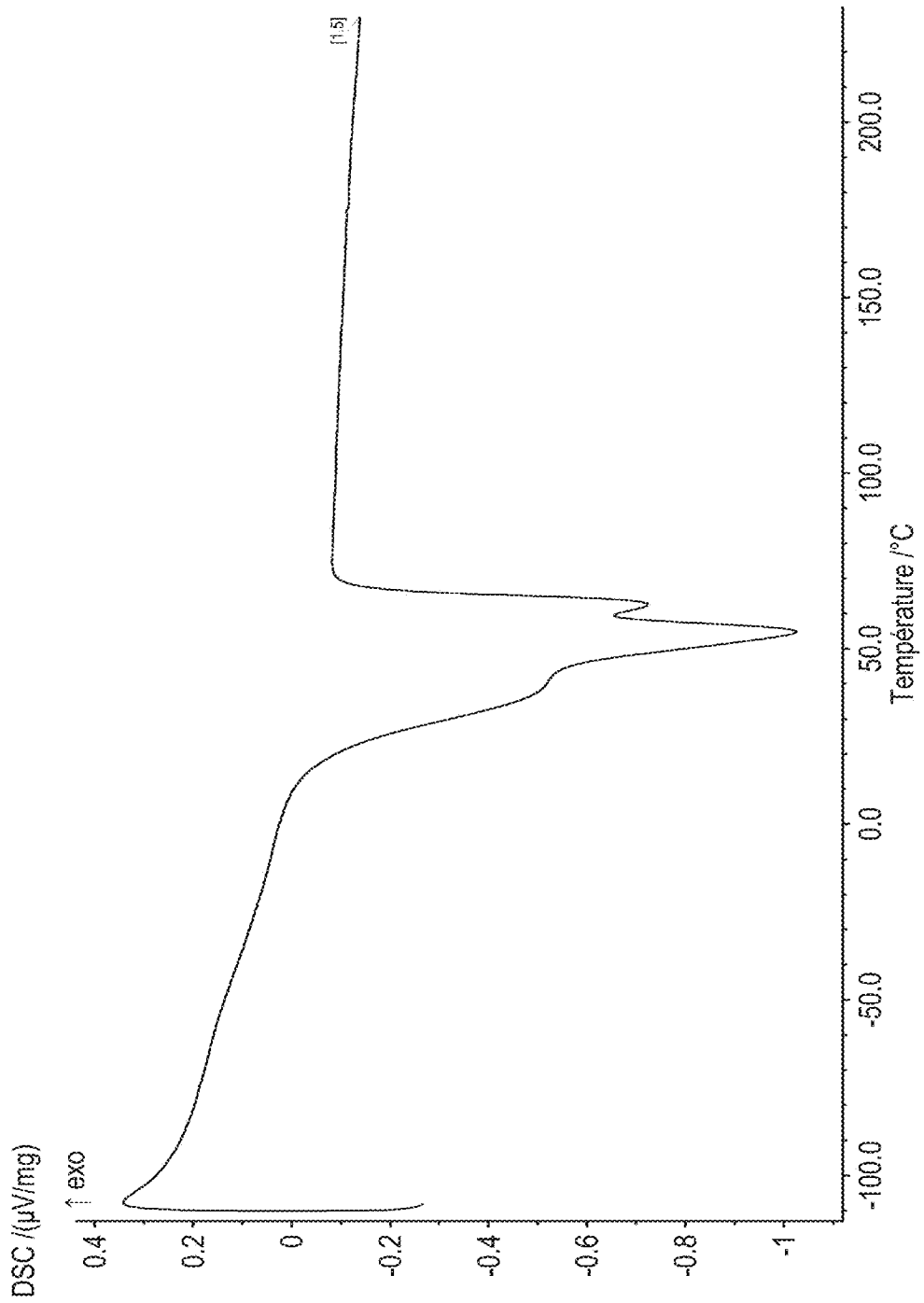
FIG. 27 DSC thermogram for I-PVDF-C$_4$F$_8$-PVDF-I (M$_n$ 700 g/mol)

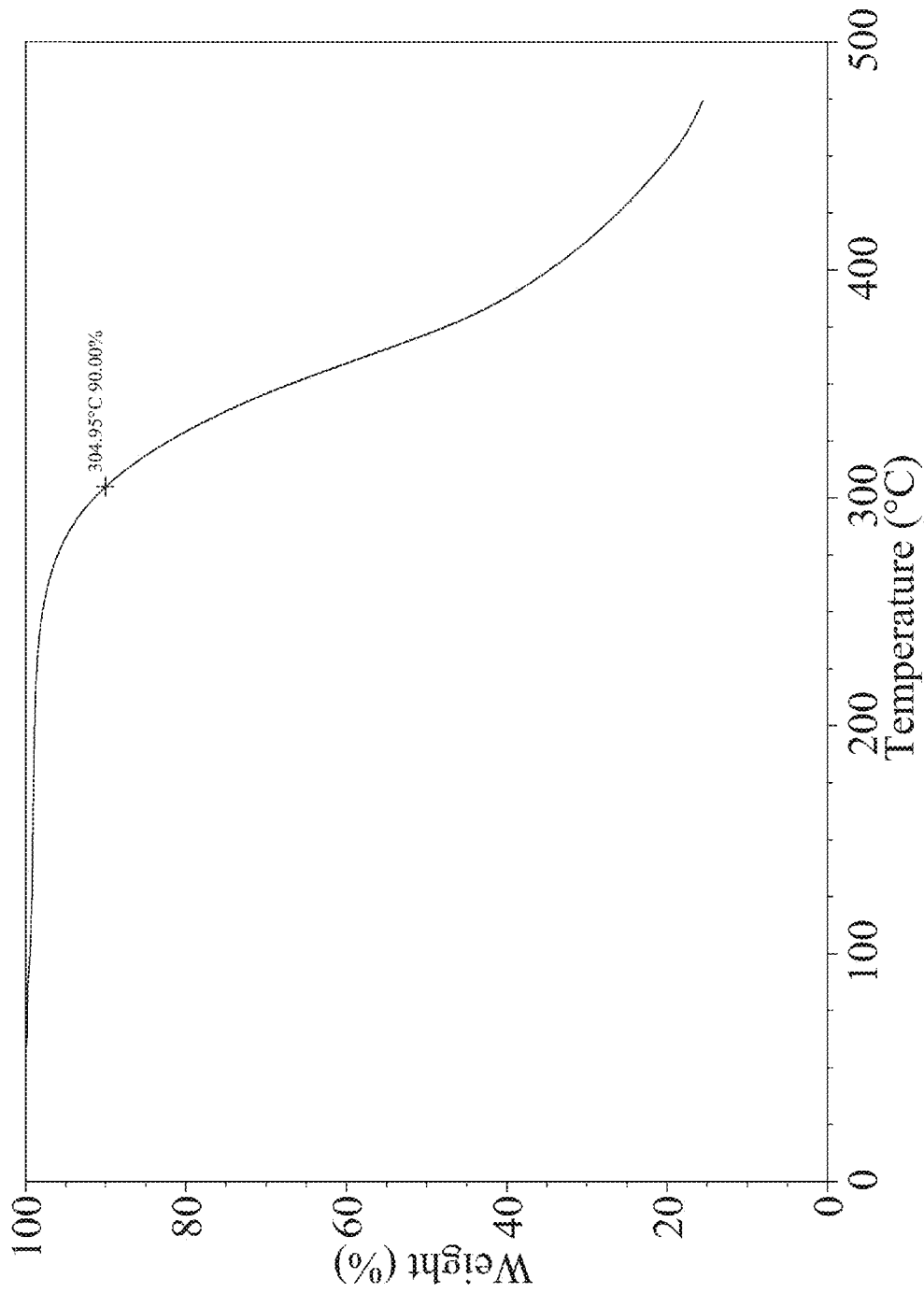
FIG. 28 TGA thermogram (under air) for I-PVDF-C$_6$F$_{12}$-PVDF-I (M$_n$ 1100 g/mol)

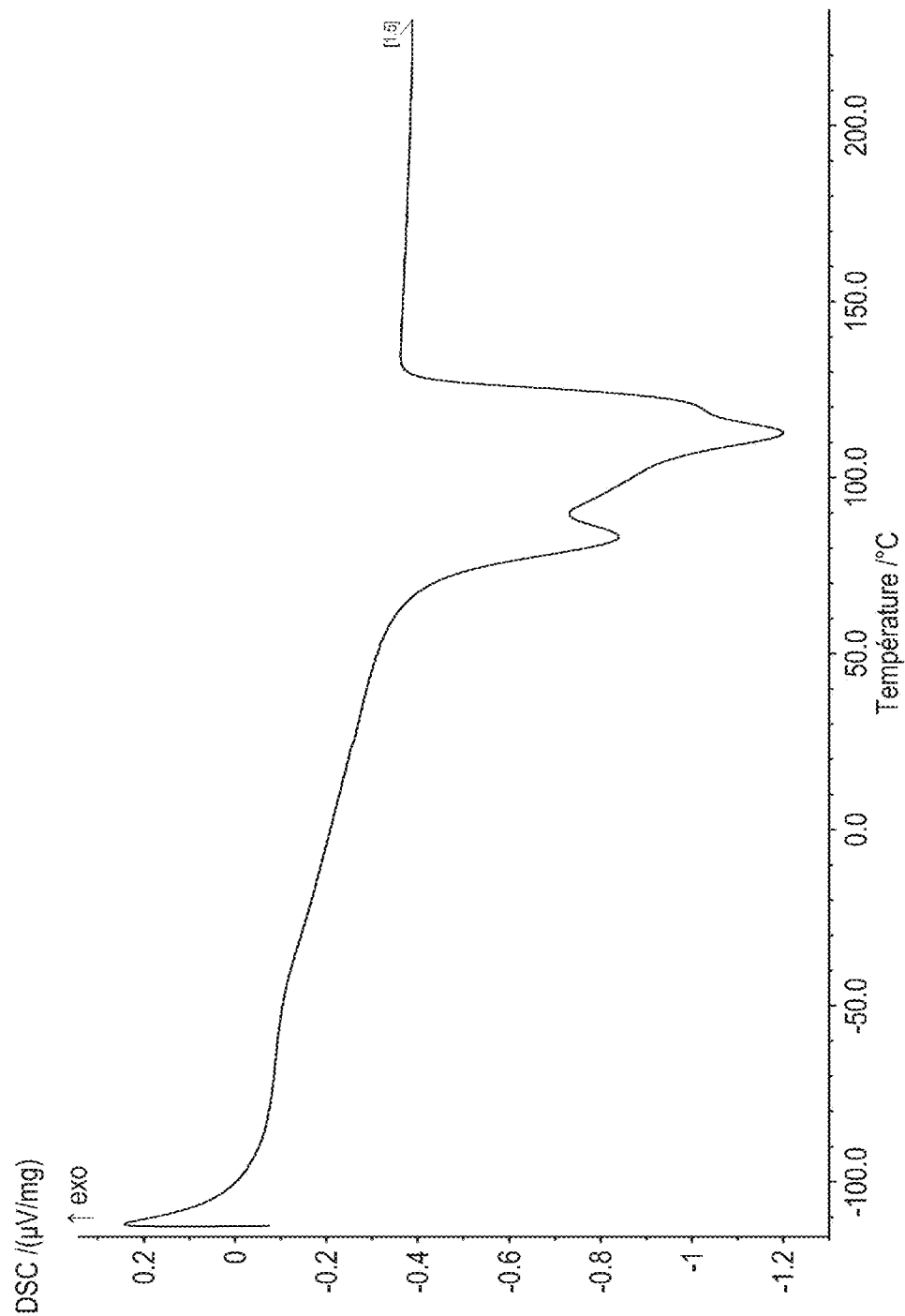
FIG. 29 DSC thermogram for I-PVDF-C₆F₁₂-PVDF-I (Mn 1100 g/mol)

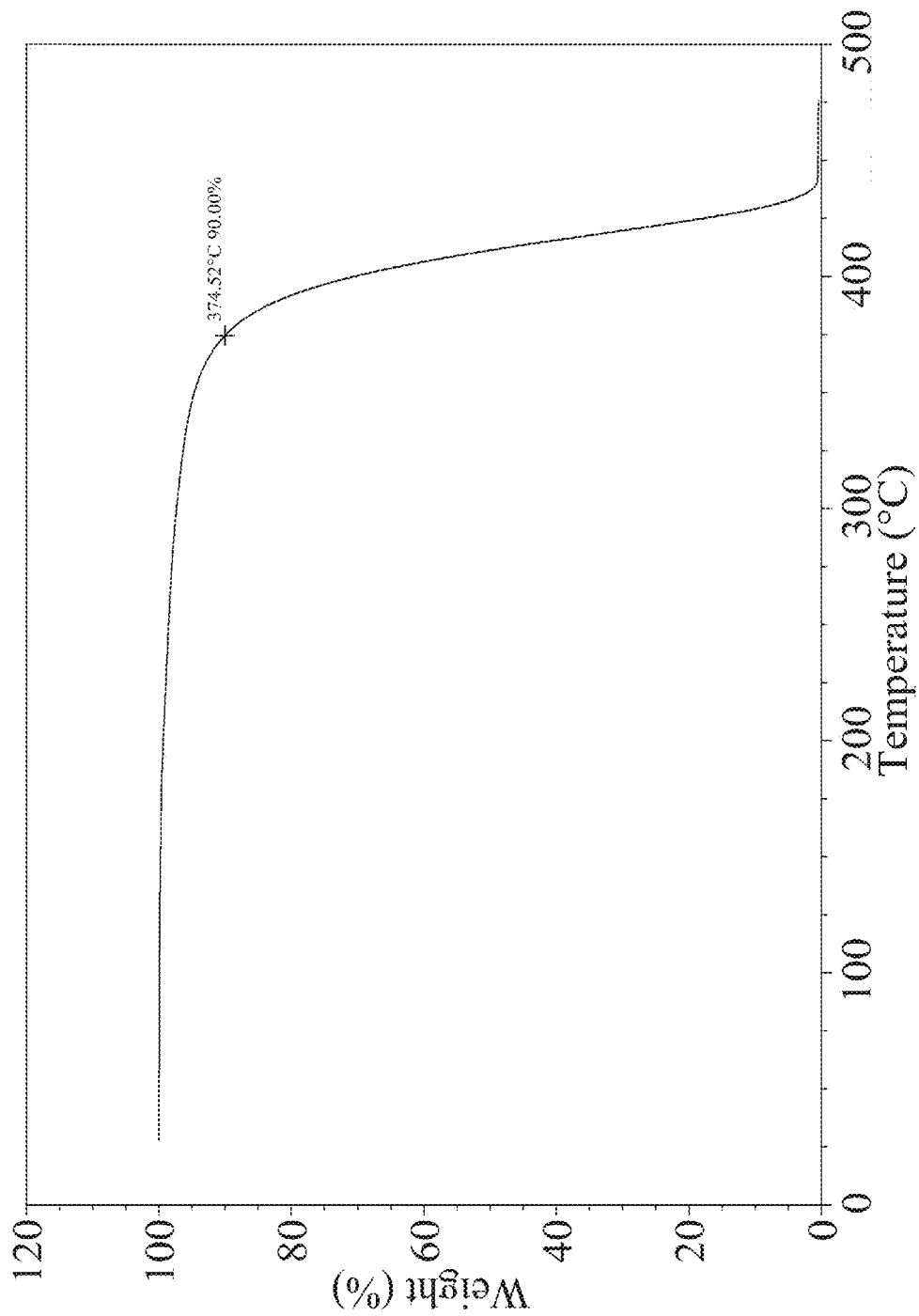
FIG. 30 TGA thermogram (under air) for $C_6F_{13}$-(CTFE-co-VDC)-1 ($M_n$ 8300 g/mol)

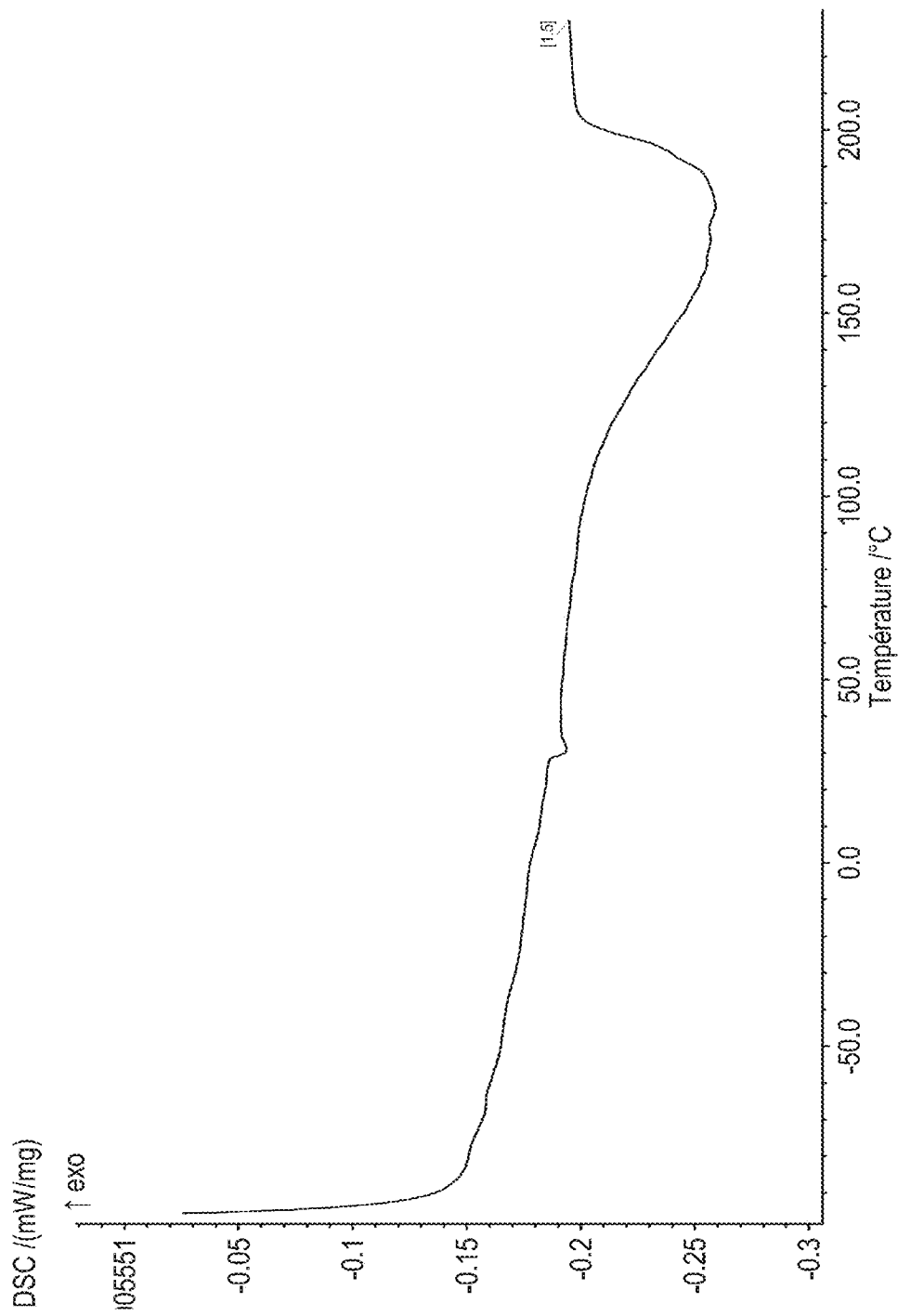
FIG. 31 DSC thermogram for C$_6$F$_{13}$-(CTFE-co-VDC)-I (M$_n$ 8300 g/mol)

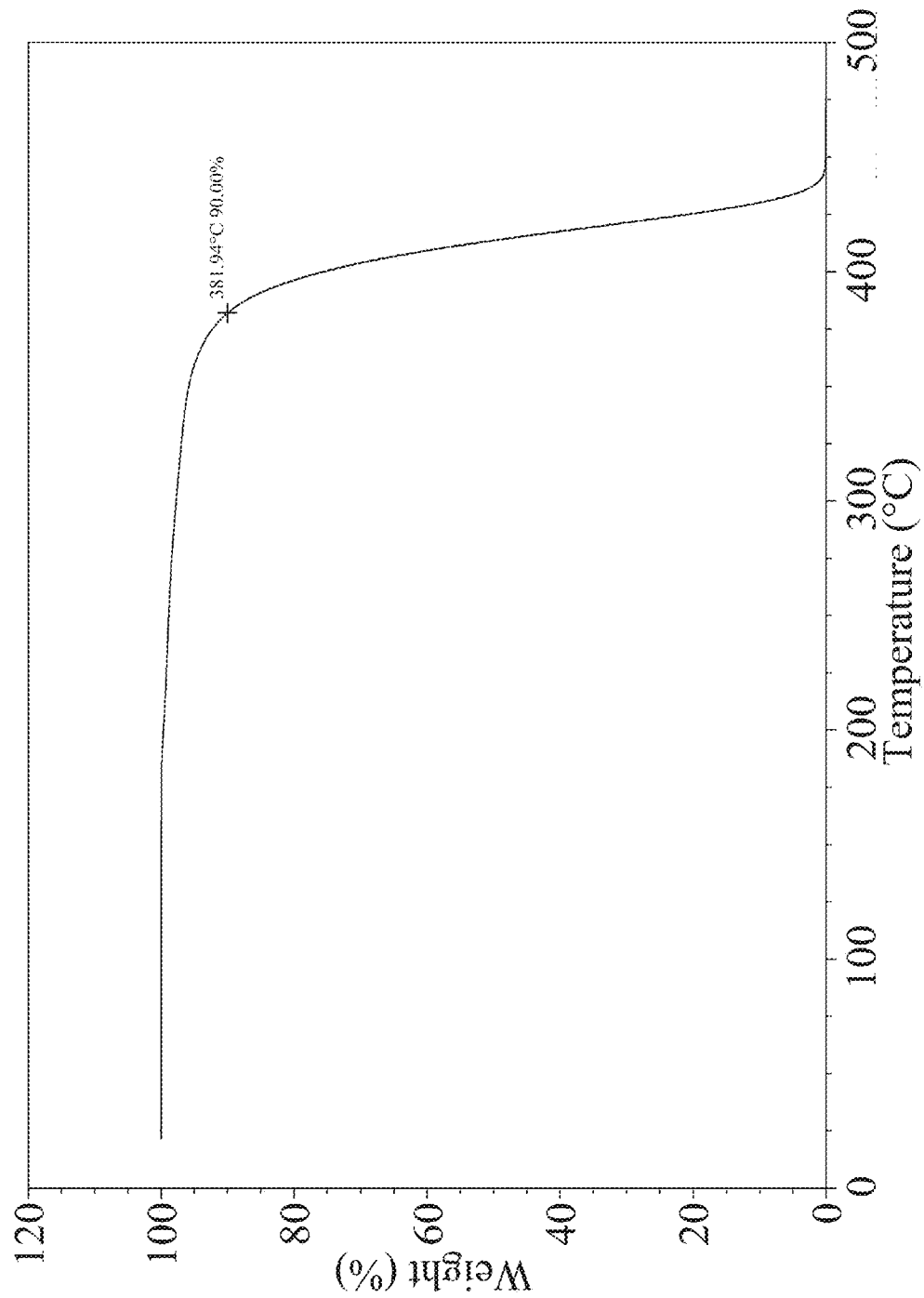
FIG. 32 TGA thermogram (under air) for I-(CTFE-co-VDC)-C₄F₈-(CTFE-co-VDC)-I ($M_n$ 10600 g/mol)

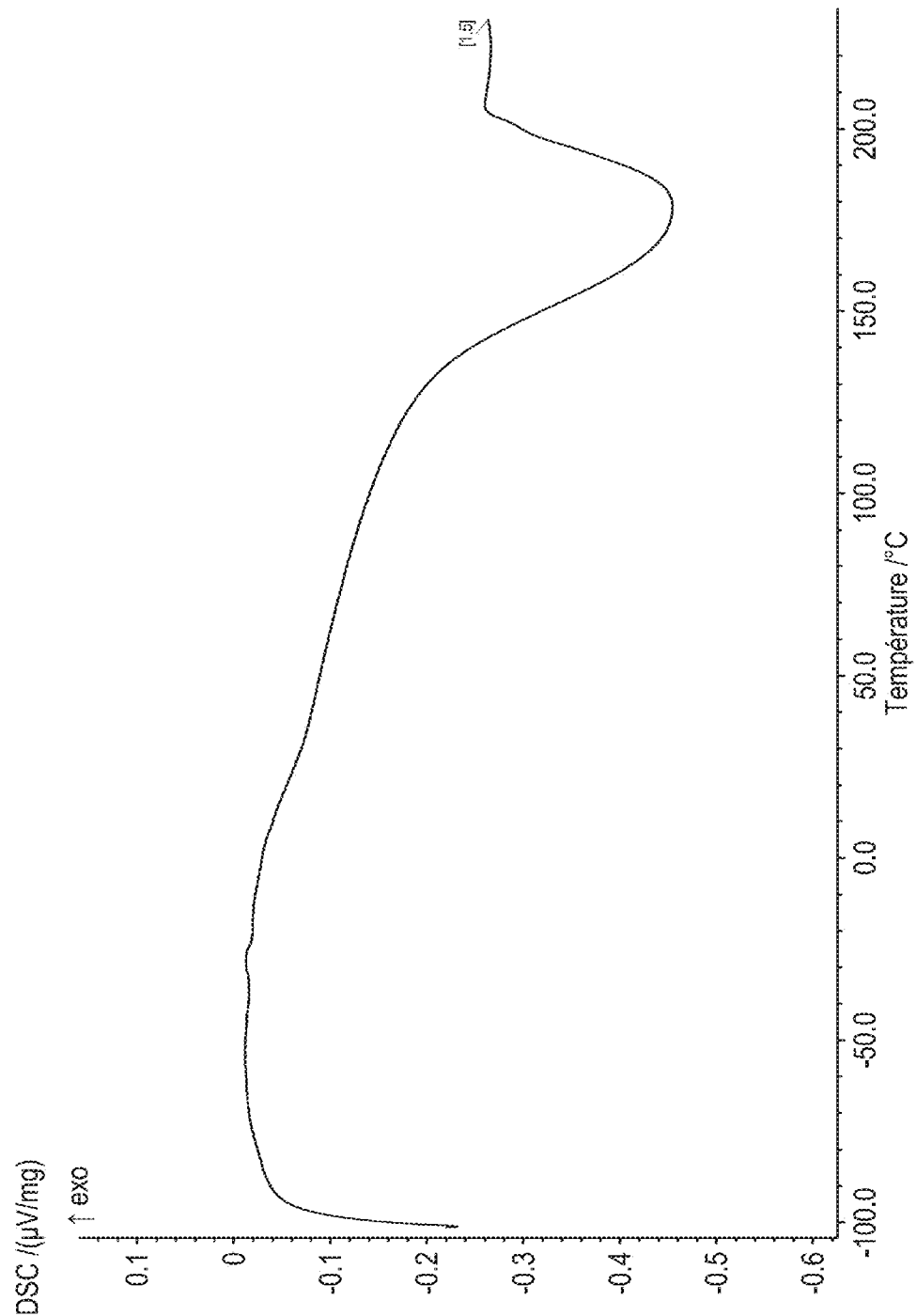
FIG. 33 DSC thermogram for I-(CTFE-co-VDC)-C₄F₈-(CTFE-co-VDC)-I ($M_n$ 10600 g/mol)

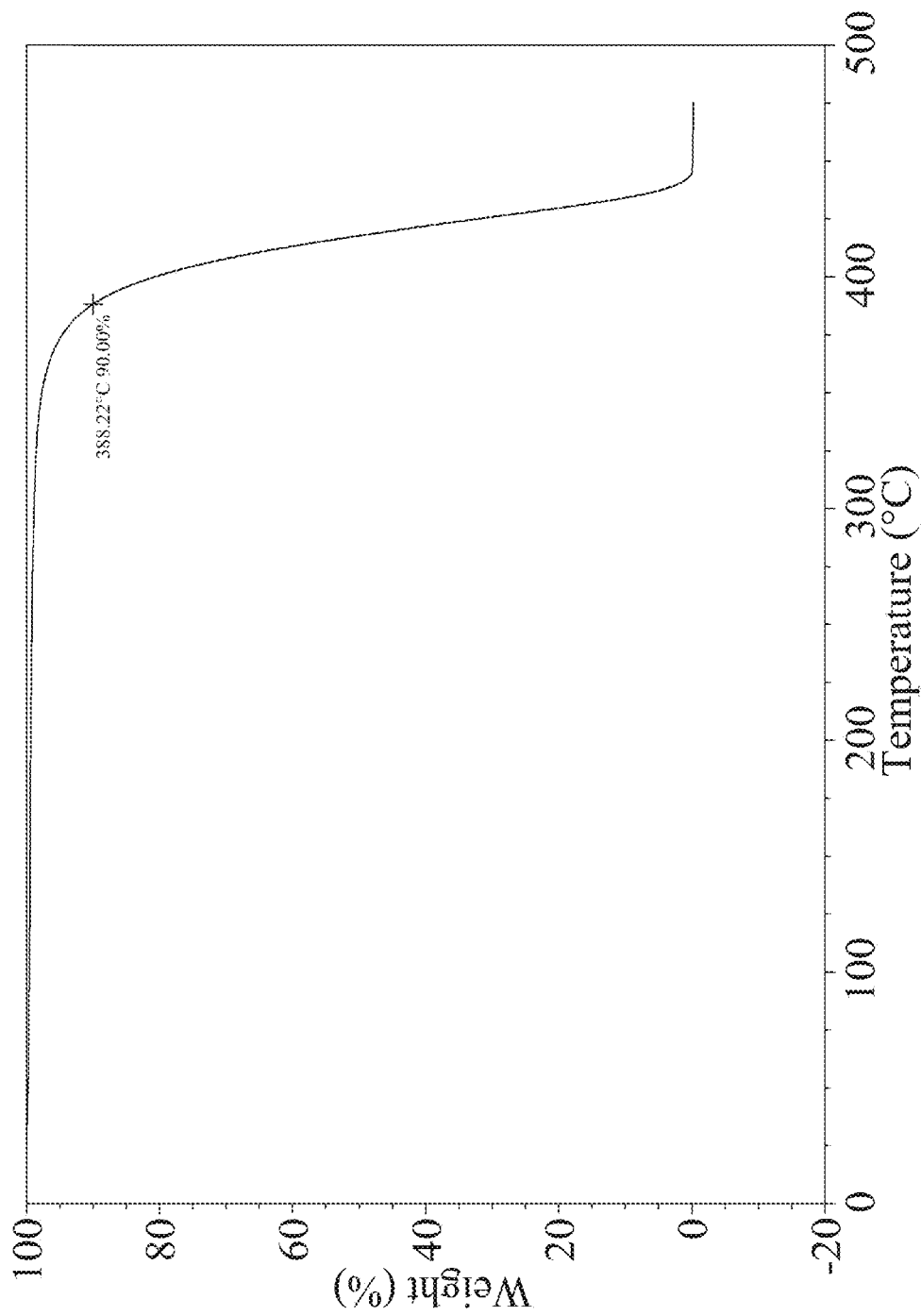
FIG. 34 TGA thermogram (under air) for PCTFE-b-PVDF-b-PCTFE ($M_n$ 6800 g/mol)

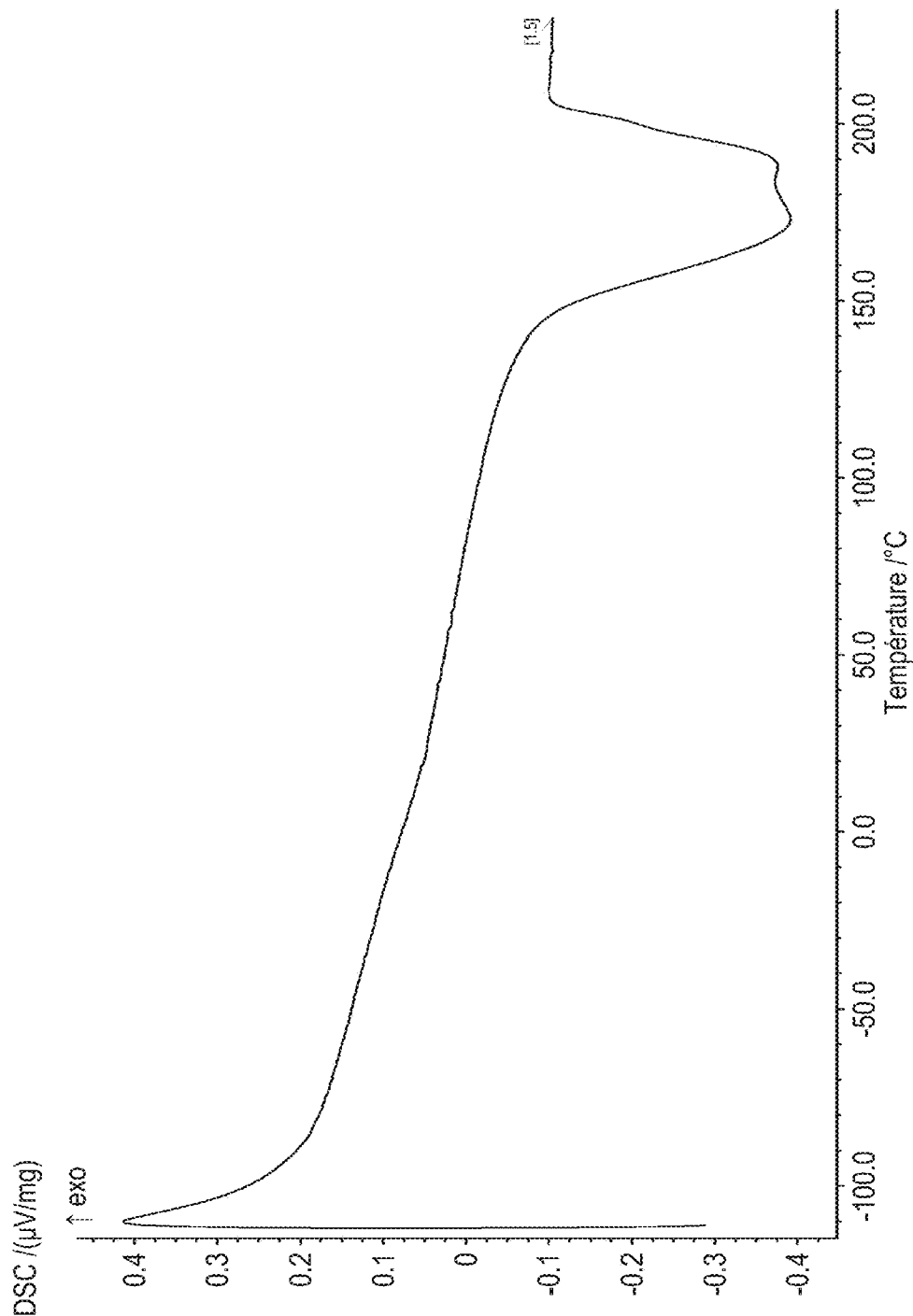
FIG. 35 DSC thermogram for PCTFE-b-PVDF-b-PCTFE ($M_n$ 6800 g/mol)

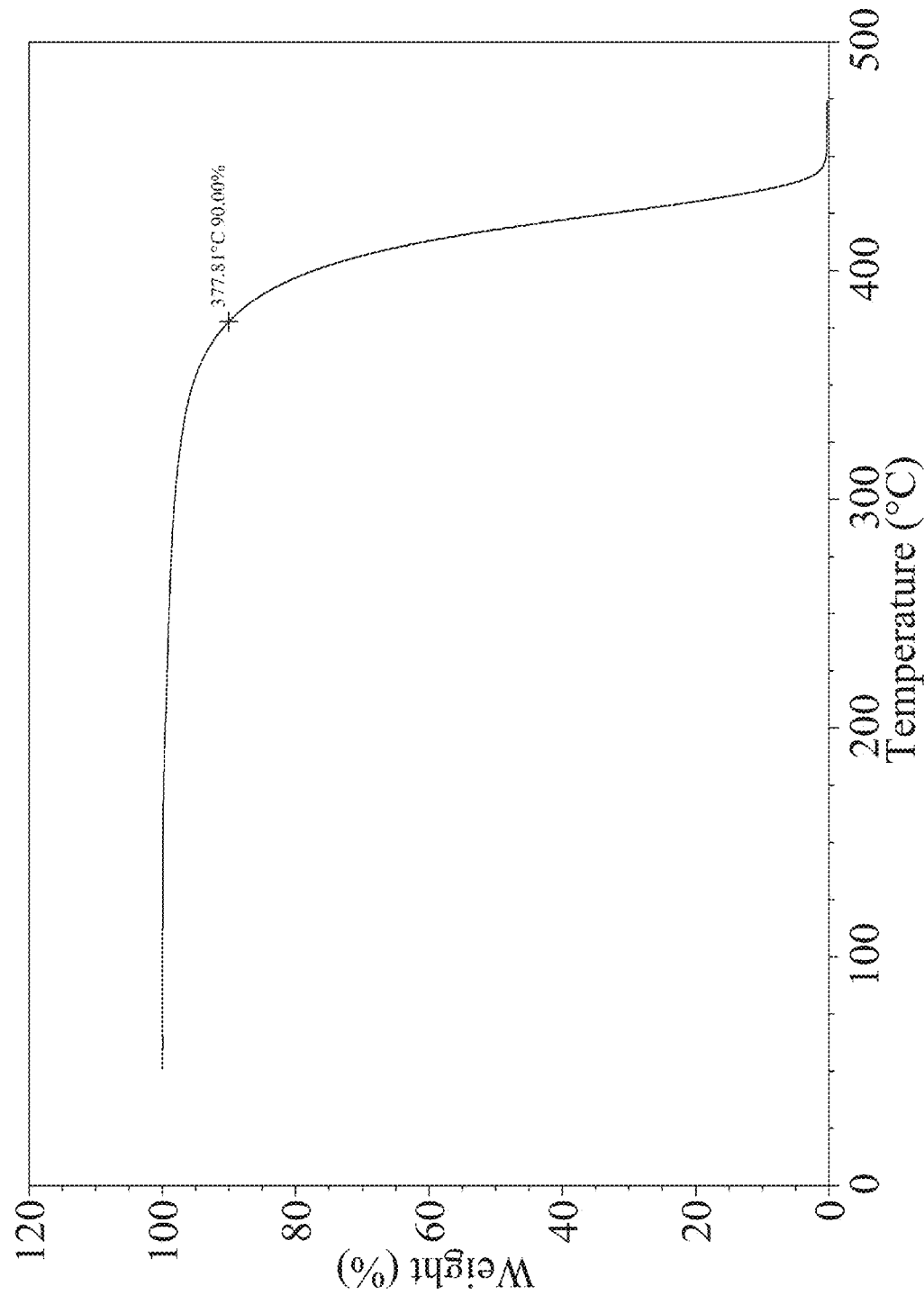
FIG. 36 TGA thermogram (under air) for PCTFE-b-PVDF-b-PCTFE ($M_n$ 2500 g/mol)

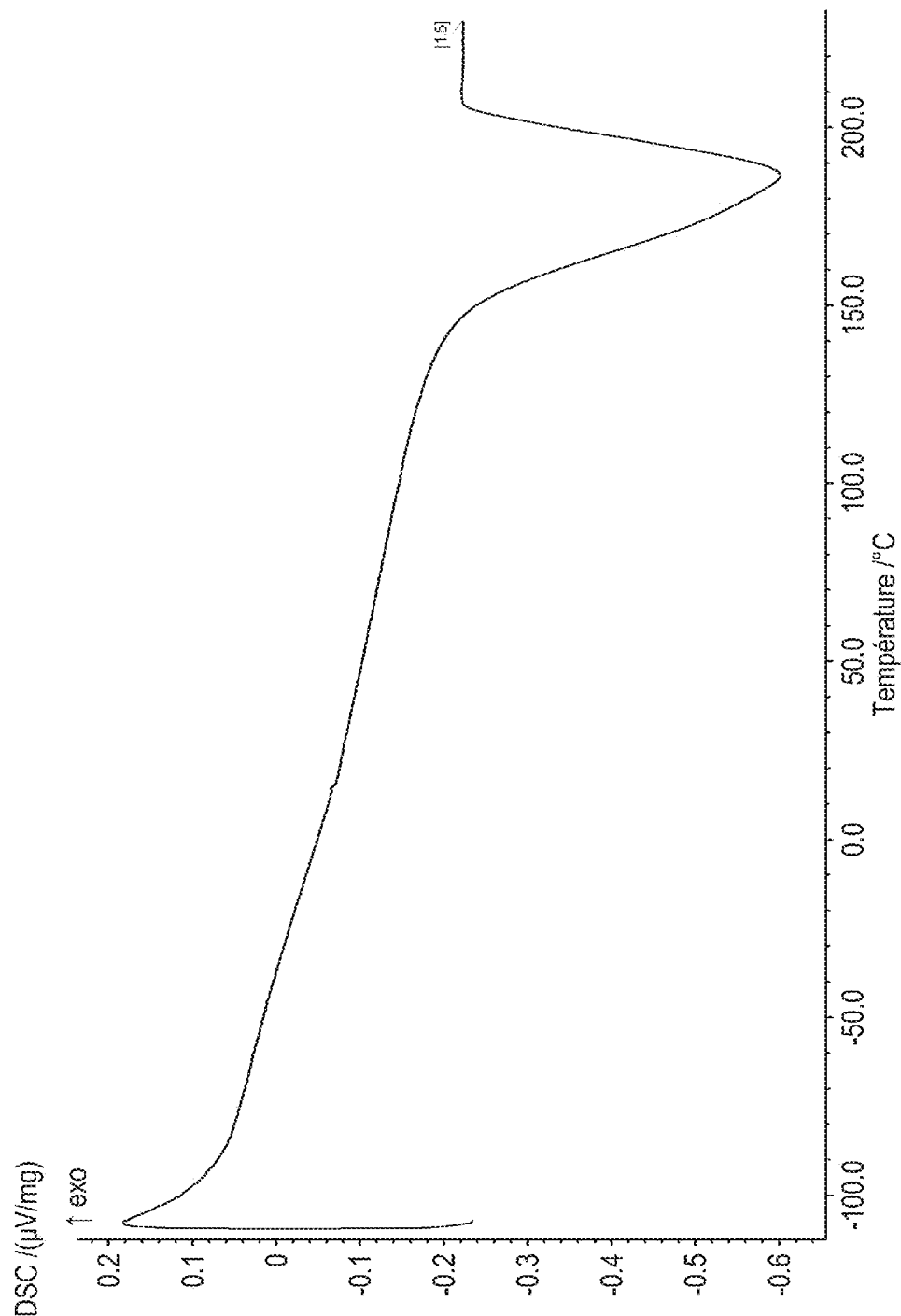
FIG. 37 DSC thermogram for PCTFE-b-PVDF-b-PCTFE ($M_n$ 2500 g/mol)

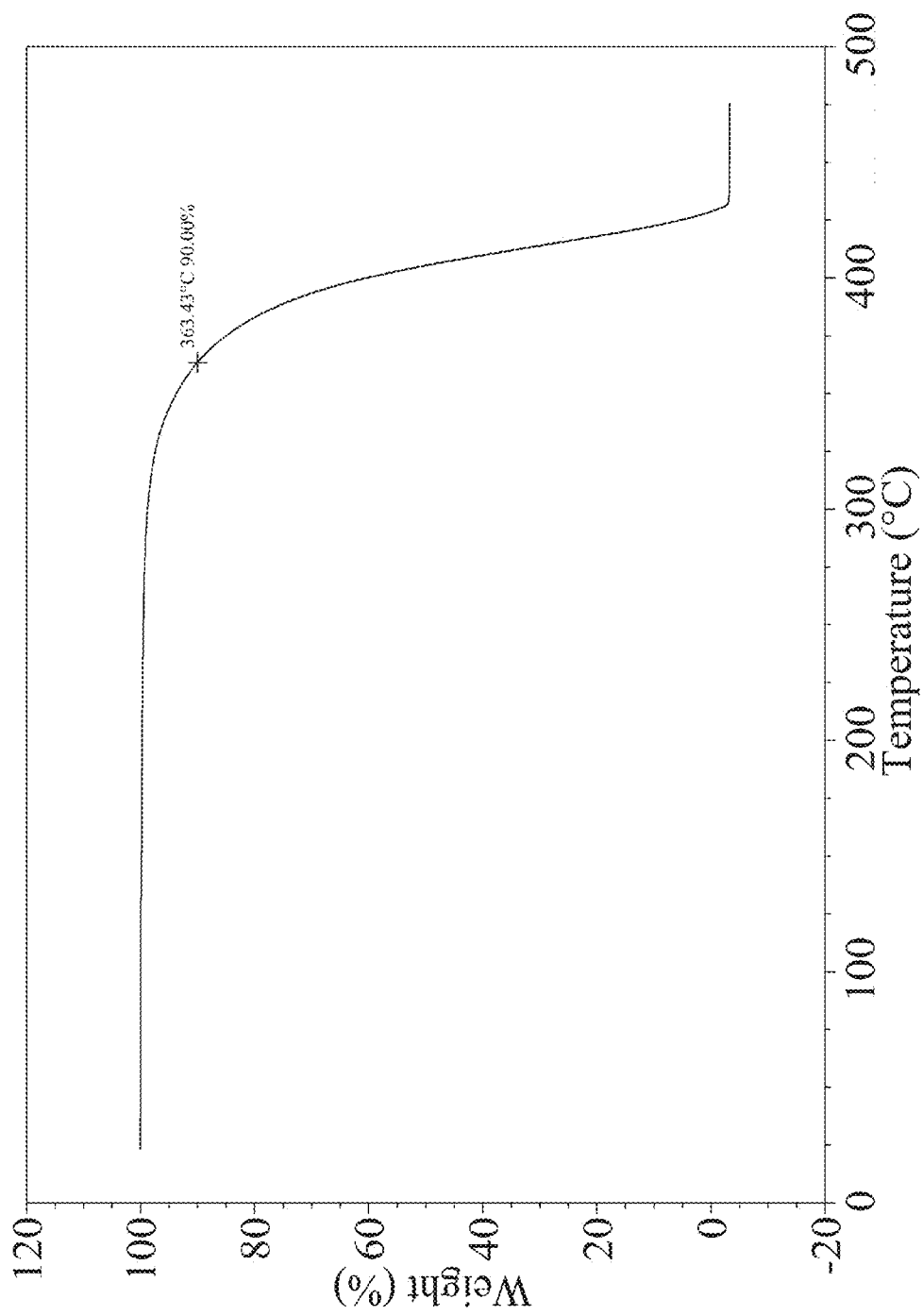
FIG. 38 TGA thermogram (under air) for $C_6F_{13}$-(CTFE-co-VDC)-b-PCTFE ($M_n$ 39000 g/mol)

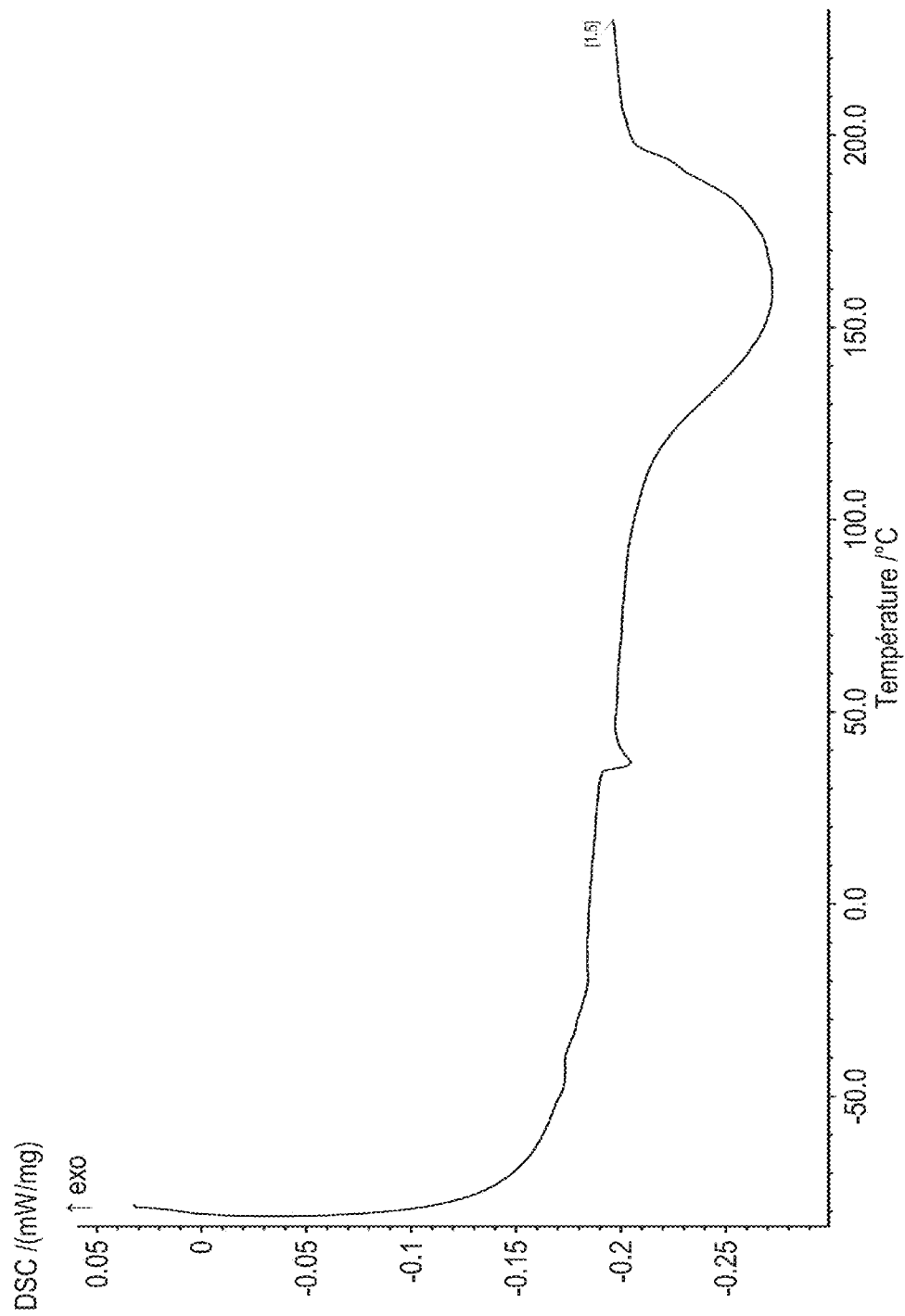
FIG. 39 DSC thermogram for C$_6$F$_{13}$-(CTFE-co-VDC)-b-PCTFE (M$_n$ 39000 g/mol)

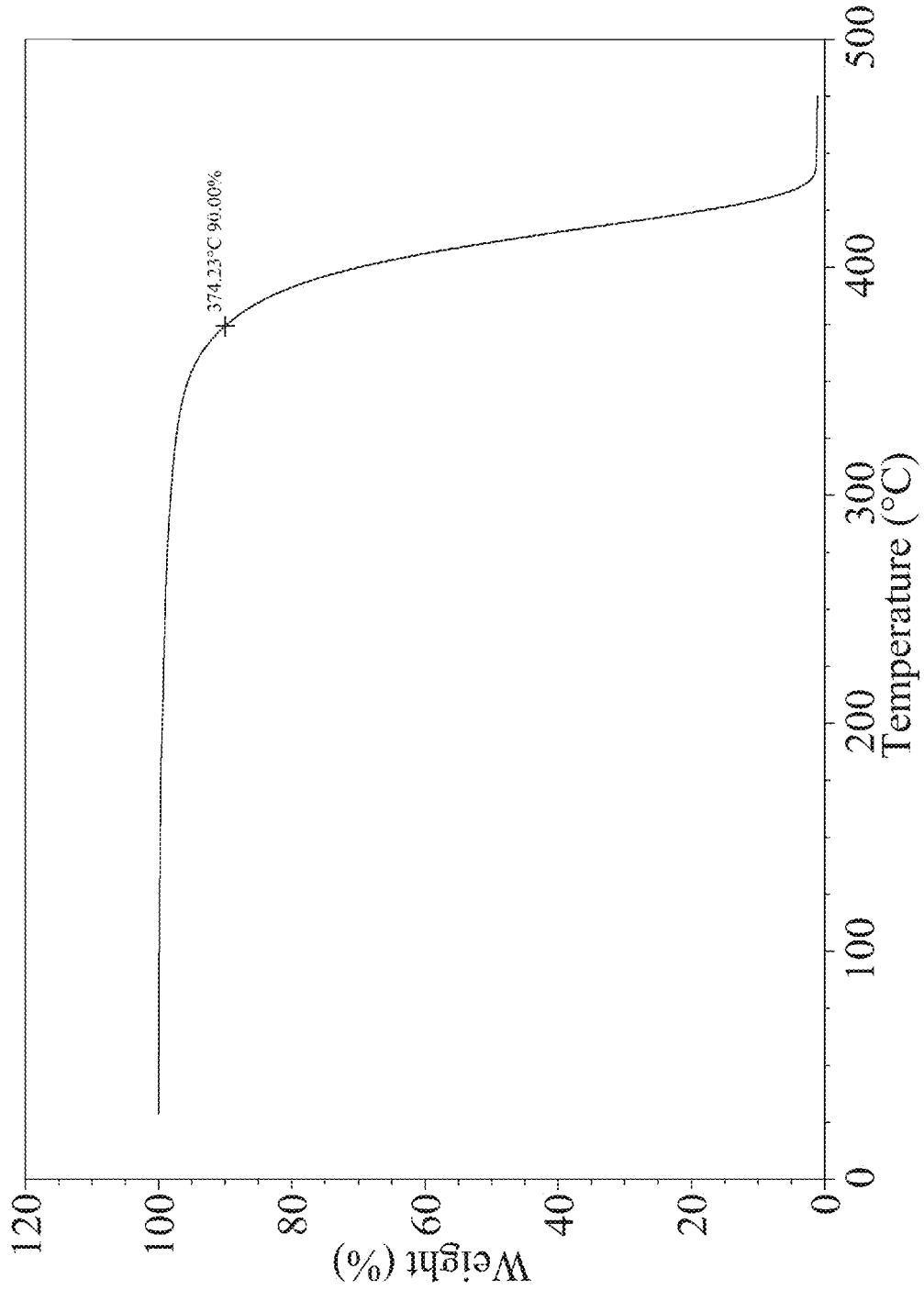
FIG. 40 TGA thermogram (under air) for PCTFE-b-(CTFE-co-VDC)-C₄F₈-(CTFE-co-VDC)-b-PCTFE (M_n 28000 g/mol)

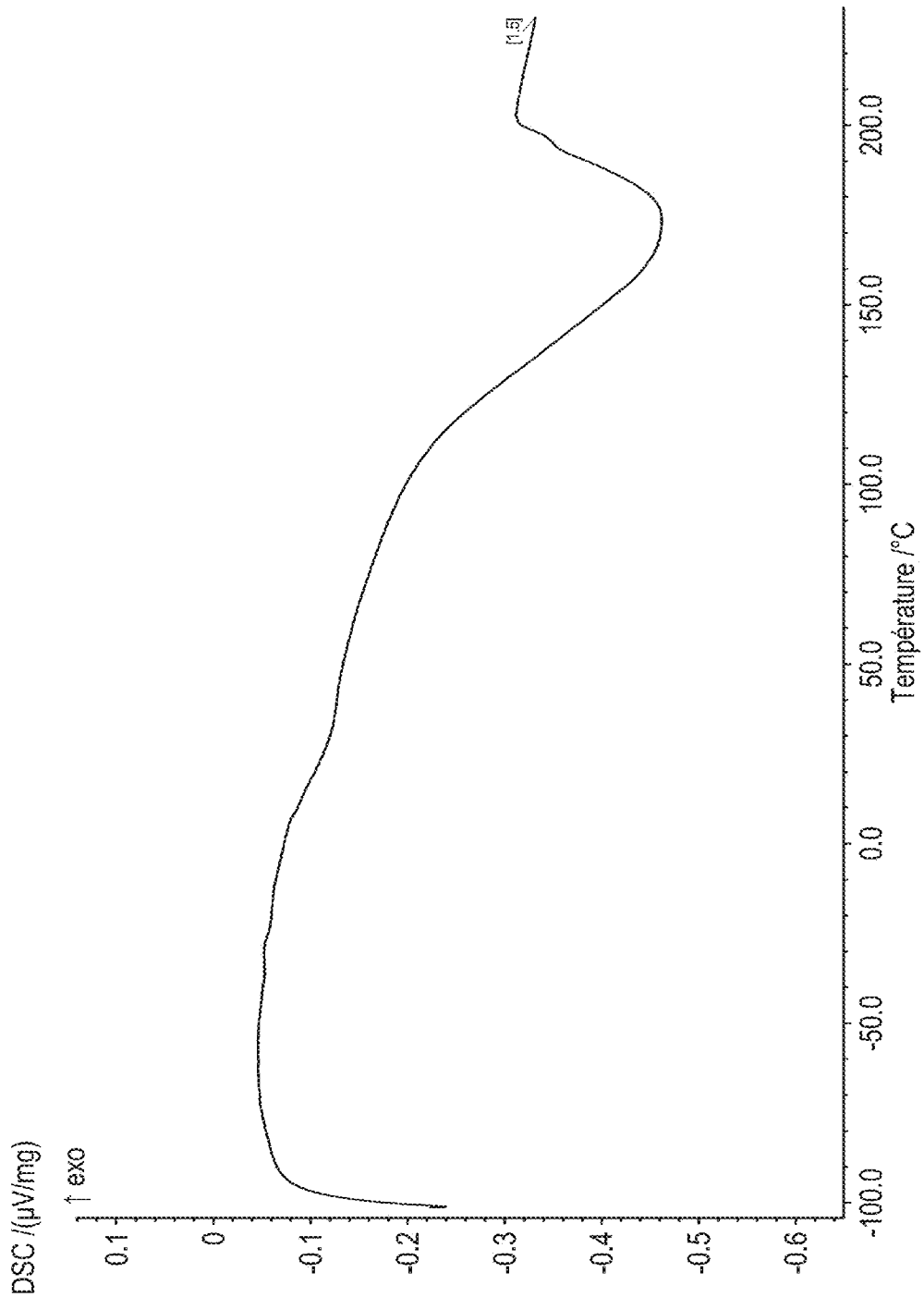

SYNTHESIS OF CHLOROTRIFLUOROETHYLENE-BASED BLOCK COPOLYMERS BY IODINE TRANSFER POLYMERIZATION

CROSS-REFERENCE TO RELATED APPLICATIONS

This application claims the benefit of priority to U.S. provisional patent application Ser. No. 61/884,307, which was filed on Sep. 30, 2013, the contents of which are incorporated by reference herein in their entirety.

TECHNICAL FIELD

The present disclosure is generally directed to the synthesis of chlorotrifluoroethylene (CTFE)-based block copolymers. More particularly, embodiments of the present disclosure are directed to the synthesis of CTFE-based block copolymers by iodine transfer polymerization (ITP).

BACKGROUND

Fluorinated homopolymers exhibit unique properties that are not observed with other organic polymers. Fluorinated homopolymers possess high thermal stability, chemical inertness, low flammability, low coefficient of friction, low surface energy, low dielectric constant, weather resistance, and gas barrier properties. These properties enable their use in aerospace, automotive, construction, medical, pharmaceutical, and semiconductor industries, for example as packaging films. However, fluorinated homopolymers have some drawbacks. They are often highly crystalline with high melting points, poorly soluble in common organic solvents, and not easily cured or cross-linked. Further, fluorinated homopolymers do not adhere strongly to most surfaces and are known for their non-stick characteristics. As such, processing fluorinated homopolymers is difficult because they lack solubility in common organic solvents that are typically used to apply polymers to various substrates, their high melting points result in application temperatures that may harm the substrate to which they are applied, and they lack adhesion to common substrates.

In contrast, fluorinated copolymers, which are derived from fluoroolefins and functional monomers, are known in the art and have been found to combine the above-noted beneficial properties of fluorinated homopolymers, but without the drawbacks due to the properties of the functional monomers. Such materials can be used as barrier materials, surfactants, polymer electrolytes for Lithium ion batteries, paints and coatings, cores and claddings for optical fibers, chemical sensors, solid polymeric superacid catalysts and ion-exchange and gas separation membranes. There are three principal methods to make fluorinated copolymers with functional monomer groups: (a) polymerization of functionalized fluoromonomers, (b) copolymerization of fluoroolefins with functionalized monomers, and (c) modification of common fluoropolymers by graft and block copolymerization with functional monomers. Chemical modification of common fluoropolymers is also possible in some instances. Because of their limited solubility and chemical inertness, however, there is a very limited range of reagents that can affect fluoropolymers, and only a very limited number of functional groups that can be incorporated with fluoropolymers in this manner. Further, homopolymerization of functionalized fluoromonomers is very limited due to the difficulty in synthesis and high cost of functional fluoromonomers.

The monomers that comprise copolymers can be distributed in one of five general ways, randomly, as regularly alternating series, graft, gradient or as blocks of identical monomers. The type of distribution can be controlled with the choice of polymerization catalyst, the reactivity ratios of both comonomers, chain transfer agent, and reaction conditions.

Block copolymers comprise different polymer blocks linked together by a covalent bond. Diblock copolymers have two polymer blocks connected together whereas triblock copolymers comprise a central polymer block of one type, the ends of which are attached to polymer chains of another type. The components of the block copolymer may be either compatible or incompatible, depending on their chemical structure. The importance of block copolymers comes from their unique chemical structure that brings new physical and thermodynamical properties related to their solid-state and solution morphologies. Several block copolymers have produced a wide range of materials with tailorable properties depending on the nature and length of blocks.

Block copolymers containing vinylidene fluoride blocks have been reported in the literature. In contrast, block copolymers having CTFE blocks are difficult to synthesize and characterize and require tedious isolation procedures due to the insolubility of CTFE blocks in the polymer. In light of these difficulties, a controlled radical polymerization process has been developed to prepare a macro-initiator that is subsequently reacted with CTFE to form di- and triblock copolymers.

Thus, many fluorinated copolymers have been produced by radical copolymerization. Polychlorotrifluoroethylene (PCTFE), for example, is prepared by free-radical polymerization of chlorotrifluoroethylene (CTFE) in an aqueous emulsion or suspension using organic or water-soluble initiators. The emulsion polymerization method requires a surfactant to form a stable emulsion between the monomer and polymer. Most surfactants are fluorinated compounds with a polar head group, and removal of the surfactant is an important part of the synthesis process. Complete removal of the surfactant is very difficult depending on the extent of adsorption to the polymer particles. Further, recent studies indicate that these surfactants are bioaccumulable, toxic, and do not readily biodegrade in the environment.

PCTFE is also often produced using suspension polymerization, which employs redox initiators such as metal persulfates and bisulfites with iron or copper salts as catalysts. The PCTFE polymer produced by this method exhibits poor thermal stability (tendency to change chemically) during film extrusion at temperatures in the range of about 275-325° C. The poor stability is attributed to ionic end groups, which can undergo hydrolysis during synthesis to form unsaturated olefins and carboxylic acid. That hydrolysis is followed by a decarboxylation that further generates some unzipping (or depolyerization) which decomposes PCTFE. Thus, thermally-pressed PCTFE samples prepared by the suspension polymerization method often undesirably show bubbles and discoloration, which is thought to be due to oligomers formed at the end of the polymerization when the reaction is pushed to high conversion.

Regardless of the method employed, PCTFE also has a strong tendency to crystallize, and thus molecular weights must be kept sufficiently high to maintain the desired degree of crystallinity for optimum physical and mechanical properties. In order to develop the physical properties necessary for most end use applications, the polymerization must be controlled. This can be achieved by proper processing conditions with chain transfer agents (CTA). Perfluoroalkyl iodides and α,ω-diiodoperfluoroalkanes have been employed as chain transfer agents in iodine transfer polymerizations. These iodides are expensive, toxic, and often insoluble in water.

In order to overcome the deficiencies exhibited in the prior art, it would be desirable to provide improved methods for the production of fluorinated copolymers. Further, there remains a need in the art for cost effective packaging films having the moisture barrier properties that meet present and future performance demands. Still further, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods for the synthesis of CTFE-based block copolymers through iodine transfer polymerization are disclosed. In an exemplary embodiment, a method includes reacting a fluoromonomer "M" with a chain transfer agent of the formula X—Y or Y—X—Y, wherein X represents a $C_1$-$C_3$ hydrocarbon, a $C_1$-$C_6$ hydrofluorocarbon, $C_1$-$C_6$ hydrochlorofluorocarbon, or $C_1$-$C_6$ fluorocarbon and Y represents iodine or bromine, in the presence of a radical initiator, to form a macro-initiator of the formula: X-poly(M)-Y or Y-poly(M)-X-poly(M)-Y, wherein poly(M) represents a polymer of the fluoromonomer. The method further includes reacting the macro-initiator with chlorotrifluoroethylene (CTFE) in the presence of a radical initiator to form a diblock or a triblock CTFE-based block copolymer of the formula: X-poly(M)-block-poly(CTFE) or PCTFE-block-poly(M)-X-poly(M)-block-PCTFE.

In some embodiments, the fluoromonomer "M" is selected from the group consisting of vinylidene fluoride (VDF), chlorotrifluoroethylene (CTFE), trifluoroethylene, tetrafluoroethylene (TFE), vinyl fluoride (VF), hexafluoropropylene (HFP), fluoroether monomers such as perfluoro(alkyl vinyl ether) (PAVE), or perfluoro(alkoxy alkyl vinyl ether) (PAAVE), vinylidene chloride (VDC), and combinations of CTFE and vinylidene chloride, CTFE and ethylene, and CTFE and vinylidene fluoride (VDF). In some embodiments, the chain transfer agent is selected from the group consisting of $CF_3(CF_2)_n$—Y and Y—$(CF_2)_n$—Y wherein n equals 0, 1, 2, 3, 4, 5, or 6, and Y as above. Specific examples of the chain transfer agents include $C_6F_{13}$—I, I—$C_4F_8$—I, I—$C_6F_{12}$—I, and I—$C_8F_{16}$—I.

In particular embodiments, the macro-initiator formed may be one or more of: $C_6F_{13}$-poly(CTFE-co-VDC)-I, $C_6F_{13}$-poly(VDF)-I, I-poly(CTFE-co-VDC)-$C_6F_{12}$-poly(CTFE-co-VDC)-I, I-poly(CTFE-co-VDC)-$C_4F_8$-poly(CTFE-co-VDC)-I, and I-poly(VDF)-$C_4F_8$-poly(VDF)-I. Further, in particular embodiments, the CTFE-based block copolymer formed may be one or more of: $C_6F_{13}$-poly(CTFE-co-VDC)-block-PCTFE and $C_6F_{13}$-poly(VDF)-block-PCTFE diblock copolymers, and PCTFE-block-poly(CTFE-co-VDC)-$C_6F_{12}$-poly(CTFE-co-VDC)-block-PCTFE, PCTFE-block-poly(CTFE-co-VDC)-$C_4F_8$-poly(CTFE-co-VDC)-block-PCTFE, and PCTFE-block-poly(VDF)-$C_4F_8$-poly(VDF)-block-PCTFE triblock copolymers.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The present invention will hereinafter be described in conjunction with the following drawing figures, wherein like numerals denote like elements, and wherein:

FIGS. 1-20*a* illustrate various spectra obtained of exemplary CTFE-based block copolymers produced in accordance with some embodiments of the present disclosure; and FIGS. 20*b*-41 illustrate various thermogravimetric analyses (TGA) and differential scanning calorimetry (DSC) of exemplary CTFE-based block copolymers produced in accordance with some embodiments of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure provides new, cost-effective block copolymers and copolymeric films that are produced by copolymerizing chlorotrifluoroethylene (CTFE) with various monomers using iodine transfer polymerization (ITP). The disclosed CTFE-based block copolymers are suitable for use in a wide variety of applications including, but not limited to, thermoplastic elastomers, barrier films for pharmaceutical and medical packaging, linings for chemical processing equipment, gas separation membranes, wire insulation, cable jackets, hoses, tubing, seals, gaskets, and O-rings, and the like.

In a first step of the CTFE-based block copolymer synthesis described herein, a monomer is reacted with a halogenated chain transfer agent in the presence of a radical initiator. This first polymerization reaction is used to produce a "macro-initiator," as will be discussed in greater detail below.

The term "monomer" or "fluoromonomer" as used herein means a polymerizable alkene that contains at least one fluorine atom, fluoroalkyl group, or fluoroalkoxy group attached to a carbon atom that is part of the double bond of the alkene that undergoes polymerization. The term polymer means a polymer derived by the polymerization of a monomer. Examples of monomers that can be used in the copolymerization process of the present disclosure include, for example, chlorotrifluoroethylene (CTFE), vinylidene fluoride (VDF), vinylidene chloride (VDC), 1,1-dichlorodifluoroethylene, tetrafluoroethylene (TFE), trifluoroethylene, vinyl fluoride, hexafluoropropylene (HFP), hexafluoroisobutylene, perfluorobutylethylene (PFBE), pentafluoropropene, 3,3,3-trifluoro-1-propene, 2,3,3,3-tetrafluoropropene, 1,3,3,3-tetrafluoropropene, fluorinated vinyl ethers (such as perfluoromethyl vinyl ether (PMVE) or perfluoropropyl vinyl ether (PPVE)), fluorinated allyl ethers, fluorinated dioxoles, and combinations thereof. In a particular embodiment, the monomer is CTFE. A mixture of two of more monomers may be employed in some embodiments. The mixtures are CTFE and VDC and CTFE and VDF.

The term "initiator" and the expressions "radical initiator" and "free radical initiator" refer to a chemical that is capable of providing a source of free radicals, either induced spontaneously, or by exposure to heat or light. Examples of suitable initiators include peroxides, peresters, peroxypivalates, peroxydicarbonates, transition metal carbonyls, and azo compounds. "Initiators" also include redox systems useful in providing a source of free radicals. The term "radical" and the expression "free radical" refer to a chemical species that contains at least one unpaired electron. The radical initiator is added to the reaction mixture in an amount sufficient to initiate and maintain the copolymerization reaction at a desired reaction rate. The order of addition may vary according to the desired process characteristics.

The radical initiator may include a persulfate salt, such as sodium persulfate, potassium persulfate, or ammonium persulfate. The amount of persulfate salt added to the reaction mixture (based upon the total weight of the monomer added to the reaction mixture) may be for example from about 0.002 to about 1.0 weight percent. Alternatively, the radical initiator may include an organic peroxide such as an alkyl, dialkyl, or diacyl peroxide, and peroxy esters or mixtures thereof. Exemplary dialkyl peroxides are di-tert-butylperoxide (DTBP), dibenzoyl peroxide, or 2,5-dimethyl-2,5-di(tert-butylperoxy)hexane which may be added to the reaction mixture in an amount from about 0.01 to about 5 weight percent on total monomer, and is added in an amount from about 0.05 to about 2.5 weight percent on total monomer. Exemplary peroxydicarbonate initiators are di-n-propyl peroxydicarbonate, bis(tert-butyl cyclohexyl) peroxydicarbonate and diisopropyl peroxydicarbonate, which may be added to the reaction mixture in an amount from about 0.5 to about 2.5 weight percent on total monomer. Peroxy ester initiators include tert-amyl peroxypivalate, tertbutyl peroxypivalate (TBPPi), and succinic acid peroxide. Transition metal carbonyls include dimanganese decacarbonyl. Further alternatively, the radical initiator may include an azo initiator, such as 2,2'-azobis(2-methylpropionamidine)dihydrochloride.

Still further alternatively, the radical initiator may include a redox system. The term "redox system" refers to a system including an oxidizing agent, a reducing agent and optionally, a promoter as an electron transfer medium. Oxidizing agents include, for example, persulfate salts, peroxides, such as hydrogen peroxide, hydroperoxides such as tert-butyl hydroperoxide and cumene hydroperoxide, and oxidizing metal salts such as, for example, ferric sulfate. Reducing agents include, for example, sodium formaldehyde sulfoxylate, sodium and potassium sulfite, ascorbic acid, bisulfite, metabisulfite, and reduced metal salts. The promoter is a component of the redox system which, in different oxidation states, is capable of reacting with both the oxidant and the reducing agent, thereby accelerating the overall reaction. Promoters include, for example, transition metal salts such as ferrous sulfate. In redox systems, the oxidizing agent and the reducing agent may be utilized in an amount from about 0.01 to about 0.5 weight percent of total monomer. The optional promoter may be utilized in an amount from about 0.005 to about 0.025 weight percent on total monomer.

Preferred initiators are those which incorporate, at least in part, alkyl peroxypivalates such as t-butyl peroxypivalate and t-amyl peroxypivalate. More preferred are dialkyl peroxides, particularly t-butyl peroxide, dibenzoyl peroxide, and t-alkyl peroxypivalates, particularly t-butyl and t-amyl peroxypivalates. The most preferred reagents are the free radical initiators 2,5-dimethyl-2,5-di(tert-butylperoxy)hexane, an example of which is TRIGONOX® 101, commercially available from AkzoNobel Polymer Chemicals LLC of Chicago, Ill., and tert-butyl peroxypivalate.

Solvents useful in the free-radical initiated first polymerization reaction include any solvent capable of dissolving the reactants and the initiator. Suitable solvents non-exclusively include conventional organic solvents such as esters of formula R—COOR' where R and R' are independently $C_{1-5}$ alkyl groups, or ester OR" where R" is an alkyl containing 1 to 5 carbon atoms, and where R may also be hydrogen. Of these organic solvents, it is preferred that R=H or $CH_3$ and R'=$CH_3$, $C_2H_5$, i-$C_3H_7$ or t-$C_4H_9$, and non-cyclic carbonates. Also useful are fluorinated solvents which non-exclusively include $ClCF_2CFCl_2$ (TCTFE, known as CFC-113), $C_6F_{14}$, n-$C_4F_{10}$, and 1,1,1,3,3-pentafluorobutane. Particularly preferred fluorinated solvents include the family of fluorinated solvents commercially available from 3M Company of St. Paul, Minn. under its FLUORINERT® trademark, such as perfluoro-2-n-butyl-tetrahydrofuran (available from 3M Company under its designation FC 75), alone or in combination with 1,1,2-trichloro-trifluoroethane (TCTFE) as a co-solvent. Other useful solvents non-exclusively include conventional solvents such as 1,2-dichloroethane, isopropanol, tertiary butanol, acetonitrile, dimethyl carbonate, 2,2,2-trifluoroethanol, hexafluoroisopropanol, and butyronitrile. The preferred solvents are methyl acetate, acetonitrile, perfluoro-n-hexane, perfluoro-2-n-butyl-tetrahydrofuran, 1,1,1,3,3-pentafluorobutane, and a mixture of 1,1-dichloro-2,2,3,3-pentafluoropropane and 1,3-dichloro-1,1,2,2,3-pentafluoropropane. The quantity of solvent used in the reaction would be determinable by one skilled in the art. Preferably, the solvent is used in an amount of from about 30% to about 60% by weight based on the combined weight of the reactants, the reagent, and the solvent.

In some embodiments, a co-solvent may also be used in combination with the solvent. Useful co-solvents non-exclusively include acetonitrile, butyronitrile, alkyl ketones such as methyl ethyl ketone, cyclohexanone, and water. For example, in an emulsion or suspension copolymerization process, water is generally used as the reaction medium, typically deionized, nitrogen-purged water. In this regard, a solvent as identified above may be present in water as a co-solvent. When a co-solvent is present, the solvent preferably includes from about 30% to about 70% by weight of the combined solvent and co-solvent. However, it should be noted that fluorinated monomers are only partially soluble in water, so when water is present as a co-solvent, a surfactant is typically needed, e.g. as an emulsifier. In this regard, useful surfactants include anionic, cationic and non-ionic surfactants. When present, the surfactant preferably includes from greater than about 0% to about 10% by weight of the solvent system, i.e. the weight of the solvent alone or of a combination of a solvent and a co-solvent, more preferably from greater than about 0% to about 5% by weight, and most preferably from about 1% to about 3% by weight of the solvent system. Preferred surfactants are anionic surfactants, particularly perfluorinated anionic surfactants. Examples of suitable perfluorinated anionic surfactants include ammonium perfluoro octanoate, perfluorinated alkyl/aryl ammonium (metal) carboxylates and perfluorinated alkyl/aryl lithium (metal) sulfonates wherein the alkyl group has from about 1 to about 20 carbon atoms, and amphiphilic copolymers based on poly (ethylene oxide). Suitable surfactants also include fluorinated ionic or nonionic surfactants, hydrocarbon-based surfactants such as the alkylbenzenesulfonates or mixtures of any of the foregoing.

Surfactants can also be used to provide further stability to the polymer emulsion. Exemplary surfactants are non-fluorinated hydrocarbon surfactants, siloxane surfactants or a combination thereof. For example the monomer(s) can be used in combination with sodium dodecyl sulfate, sodium dodecyl benzene sulfonate (SDDBS), sodium octyl sulfonate, sodium lauryl sulfate, ammonium lauryl sulfate, and sodium lauryl sulfate, among others.

As used herein, the term "halogenated chain transfer agent" refers to a chain transfer agent of the following formula: X—Y or Y—X—Y wherein X represents a $C_1$-$C_3$ hydrocarbon, a $C_1$-$C_6$ hydrofluorocarbon, $C_1$-$C_6$ hydrochlorofluorocarbon, or $C_1$-$C_6$ fluorocarbon, and Y represents iodine or bromine. Halogenated chain-transfer agents are added to the polymerization process to regulate the molecular weight of the product. They may be added to a polymerization reaction in a single portion at the beginning of the reaction, or incrementally or continuously throughout the reaction. The amount and mode of the addition of a halogenated chain-transfer agent depends on the activity of the particular chain-transfer agent employed, and on the desired molecular weight of the polymer product. The amount of halogenated chain-transfer agent added to the polymerization reaction is from about 0.05 to about 5 weight percent, for example from about 0.1 to about 2 weight percent based on the total weight of comonomer added to the reaction mixture. Exemplary halogenated chain transfer agents include, but are not limited to $C_6F_{13}I$, $IC_4F_8I$, and $IC_6F_{12}I$, and combinations thereof.

The first polymerization reaction mixture may optionally contain a buffering agent to maintain a controlled pH throughout the polymerization reaction. The pH is controlled within the range of from about 4 to about 8 to minimize undesirable color development in the product. Buffering agents may include organic or inorganic acids or alkali metal salts thereof, or bases or salts of such organic or inorganic acids, that have at least one pKa value in the range of from about 4 to about 10, for example from about 4.5 to about 9.5. Buffering agents include, for example, phosphate buffers, acetate buffers, citrate and lactate buffers. A "phosphate buffer" is a salt or a mixture of salts of phosphoric acid. An "acetate buffer" is a salt of acetic acid.

The optional addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount that serves to minimize the formation of polymer adhesions on the reactor components. The amount is generally proportional to the interior surface area of the reactor and may vary from about 0.5 to about 50 mg per square centimeter of reactor interior surface area.

The temperature used for the first polymerization reaction may vary depending on the initiator system chosen. The polymerization temperature, in an embodiment, is from about 20° C. to about 130° C., for example from about 60° C. to about 100° C. The pressure used for copolymerization may vary from about 200 kPa to about 20,000 kPa, depending on the capabilities of the reaction equipment, the initiator system chosen, and the comonomer selection. For example, the polymerization pressure is from about 2,000 kPa to about 10,000 kPa.

The polymerization occurs under stirring, for example. The stirring may be constant, or may be varied to optimize process conditions during the course of the polymerization. In one embodiment, both multiple stirring speeds and multiple temperatures are used for controlling the reaction. The reaction vessel used to prepare the composition described herein is one that is capable of being pressurized and agitated. Conventional commercial autoclaves that may be sealed and pressurized to the required reaction pressures (for example in excess of 3.36 MPa (500 psig)) are suitable. Horizontally inclined autoclaves and vertically inclined autoclaves may both be used.

According to one embodiment of the present disclosure, a pressurized polymerization reactor equipped with a stirrer and heat controller is charged with water and/or other solvent, for example deionized water, one or more functional hydrocarbon monomer and at least one fluoromonomer. The mixture may contain one or more of a surfactant, a buffering agent, an antifoulant or a chain-transfer agent for molecular weight regulation of the copolymer product.

Prior to introduction of the functional monomer, air is removed from the reactor in order to obtain an oxygen-free environment for the first polymerization reaction. The order in which the polymerization components are assembled may be varied. In one embodiment, water, initiator, fluoromonomer(s), and optionally surfactant, antifoulant, chain transfer agent, and/or buffer are charged to the reactor, and the reactor heated to the desired reaction temperature. The fluoromonomer is then fed into the reactor at a rate which provides an essentially constant pressure. Alternatively the fluoromonomer and initiator may be fed to the reactor, along with one or more of the optional ingredients. Other variations for polymerization processes are contemplated, as known in the art. The feed is terminated when the desired weight has been fed to the reactor. An additional radical initiator is optionally added, and the reaction is allowed to react out for a suitable amount of time. The reactor pressure drops as the fluoromonomer within the reactor is consumed.

The polymerization is conducted under agitation to ensure proper mixing. An adjustment of the agitation rate during the polymerization may be desirable to prevent premature coagulation of the particles. Although the agitation rate and reaction time will typically depend upon the amount of macro-initiator product desired, one of ordinary skill in the art can readily optimize the conditions of the reaction without undue experimentation to obtain the results described herein. The agitation rate will generally be in the range of from about 5 to about 800 rpm and, for example from about 25 to about 700 rpm, depending on the geometry of the agitator and the size of the vessel. The reaction time will generally range from about 1 to about 30 hours, for example from about 4 to about 20 hours.

Upon completion of the first polymerization reaction, the reactor is brought to ambient temperature and any residual unreacted components are vented to atmospheric pressure. The aqueous reaction medium containing the fluoropolymer is then recovered from the reactor. The recovered material includes a stable mixture of the reaction components, i.e., water, initiator (and/or decomposition products of the initiator) and fluoropolymer solids. The product mixture containing the macro-initiator is filtered, washed with deionized water and dried to constant weight to give a solid macro-initiator compound. Alternatively, the product mixture containing the macro-initiator is filtered off to remove the solvents and the resulting crude product is solubilized in an organic solvent and then precipitated out using a different solvent (regarded as a non-solvent for the targeted macroinitiator). The precipitated product is dried to constant weight to give a solid-phase macro-initiator compound.

In particular embodiments, using the above-noted exemplary monomers and chain transfer agents, the macro-initiator formed as a result of the above-described first polymerization reaction may be one or more of: $C_6F_{13}$-poly(CTFE-co-VDC)-I, $C_6F_{13}$-poly(VDF)-I, I-poly(CTFE-co-VDC)-

$C_6F_{12}$-poly(CTFE-co-VDC)-I, I-poly(CTFE-co-VDC)-$C_4F_8$-poly(CTFE-co-VDC)-I, and I-poly(VDF)-$C_4F_8$-poly(VDF)-I. The macro-initiator is used in a subsequent reaction step to produce the CTFE-based block copolymers of the present disclosure.

As indicated above, subsequent to the completion of the first polymerization step to produce the macro initiator, a second polymerization step is performed that includes reacting the macro-initiator with chlorotrifluoroethylene (CTFE) in the presence of a radical initiator to form a diblock or a triblock CTFE-based block copolymer. The temperature used for the second polymerization reaction may vary depending on the initiator system chosen. The block polymerization temperature, in an embodiment, is from about 30° C. to about 130° C., for example from about 60° C. to about 100° C. The pressure used for block copolymerization may vary from about 200 kPa to about 20,000 kPa, depending on the capabilities of the reaction equipment, the initiator system chosen, and the comonomer selection. For example, the block polymerization pressure is from about 2,000 kPa to about 10,000 kPa.

The block polymerization occurs under stirring, for example. The stirring may be constant, or may be varied to optimize process conditions during the course of the block polymerization. In one embodiment, both multiple stirring speeds and multiple temperatures are used for controlling the reaction. The reaction vessel used to prepare the composition described herein is one that is capable of being pressurized and agitated. Conventional commercial autoclaves which may be sealed and pressurized to the required reaction pressures (for example in excess of 10 MPa (1500 psig)) are suitable. Both horizontally inclined autoclaves and vertically inclined autoclaves may be used.

According to one embodiment of the present disclosure, a pressurized polymerization reactor equipped with a stirrer and heat controller is charged with water and/or other solvent, for example deionized water, one or more macro-initiators, and CTFE. The mixture may optionally (though it is not required) contain one or more surfactant(s), a buffering agent, an antifoulant or a chain-transfer agent, or mixtures thereof, for molecular weight regulation of the block copolymer product.

Prior to introduction of the macro-initiator, air is removed from the reactor in order to obtain an oxygen-free environment for the second polymerization reaction. The order in which the block polymerization components are assembled may be varied. In one embodiment, water, initiator, macro-initiator(s), and optionally surfactant, antifoulant, chain transfer agent, and/or buffer are charged to the reactor, and the reactor heated to the desired reaction temperature. The CTFE is then fed into the reactor at a rate which provides an essentially constant pressure. Alternatively, the CTFE and initiator may be fed to the reactor, along with one or more of the optional ingredients. Other variations for block polymerization processes are contemplated, as known in the art. The feed is terminated when the desired weight has been fed to the reactor. An additional radical initiator is optionally added, and the reaction is allowed to react out for a suitable amount of time. The reactor pressure drops as the CTFE within the reactor is consumed.

Again, the polymerization is conducted under agitation to ensure proper mixing. An adjustment of the agitation rate during the block polymerization may be desirable to prevent premature coagulation of the particles. Although the agitation rate and reaction time will typically depend upon the amount of CTFE-based block copolymer product desired, one of ordinary skill in the art can readily optimize the conditions of the reaction without undue experimentation to obtain the results described herein. The agitation rate will generally be in the range of from about 5 to about 800 rpm and, for example from about 25 to about 700 rpm, depending on the geometry of the agitator and the size of the vessel. The reaction time will generally range from about 1 to about 30 hours, for example from about 4 to about 20 hours.

Upon completion of the second polymerization reaction, the reactor is brought to ambient temperature and any residual unreacted components are vented to atmospheric pressure. The aqueous reaction medium containing the CTFE is then recovered from the reactor. The recovered material includes a stable mixture of the reaction components, i.e., water, initiator (and/or decomposition products of the initiator) and CTFE solids. The product mixture containing the block copolymer is filtered, washed with deionized water and dried to constant weight to give a solid block copolymer compound. Alternatively, the product mixture containing the block copolymer is filtered to remove the solvents and the resulting crude product is solubilized in an organic solvent and then precipitated out using a different solvent. The precipitated product is dried to constant weight to give a solid-phase block copolymer compound.

In certain embodiments, the diblock or a triblock CTFE-based block copolymer produced in the above-described second polymerization reaction may be represented by the following formula: X-poly(M)-block-poly(CTFE) or poly(CTFE)-block-poly(M)-block-poly(CTFE). More particularly, using the macro-initiators described above, the product produced may be one of: $C_6F_{13}$-poly(CTFE-co-VDC)-block-PCTFE and $C_6F_{13}$-poly(VDF)-block-PCTFE diblock copolymers, and PCTFE-block-poly(CTFE-co-VDC)-$C_6F_{12}$-poly(CTFE-co-VDC)-block-PCTFE, PCTFE-block-poly(CTFE-co-VDC)-$C_4F_8$-poly(CTFE-co-VDC)-block-PCTFE, and PCTFE-block-poly(VDF)-$C_4F_8$-poly(VDF)-block-PCTFE triblock copolymers. Both diblock and triblock copolymers are polymers with predictable molecular weights and low dispersities. For example, molecular weight may be from about 1,000 Da to about 100,000 Da, such as from about 2,000 Da to about 50,000 Da. As noted above, the disclosed diblock or a triblock CTFE-based block copolymers are optically transparent, chemically inert, nonflammable, and plasticizer and stabilizer-free. Further, the disclosed diblock or a triblock CTFE-based block copolymers are suitable for use as barrier films for pharmaceutical and medical packaging, linings for chemical processing equipment, gas separation membranes, wire insulation, cable jackets, hoses, tubing, seals, gaskets, O-rings, and the like.

ILLUSTRATIVE EXAMPLES

The present disclosure is now illustrated by the following non-limiting examples. It should be noted that various changes and modifications can be applied to the following examples and processes without departing from the scope of this invention, which is defined in the appended claims. Therefore, it should be noted that the following examples should be interpreted as illustrative only and not limiting in any sense.

TABLE 1

Summary of the different examples of macro-initiators synthesized by Iodine Transfer Polymerization (ITP)

| Monomer 1 | Monomer 2 | Initiator | T° (°C.) | Chain Transfer Agent (CTA) | Yield (wt. %) | $M_n$ g/mol (targeted) | $M_n$ g/mol (NMR) | $M_n$ g/mol (SEC) PDI | eg # |
|---|---|---|---|---|---|---|---|---|---|
| VDF | — | $(NH_4)_2S_2O_8$ | 80 | $C_6F_{13}I$ | 70 | 4700 | 62000 | — | #1 |
| VDF | — | $Mn_2(CO)_{10}$ | 100 | $C_6F_{13}I$ | 65 | 7000 | 8500 | 10000 1.44 | #2 |
| CTFE | — | $Mn_2(CO)_{10}$ | 100 | $C_6F_{13}I$ | 14 | 5600 | 4600 | — | #3 |
| VDF | — | TBPPi | 74 | $IC_4F_8I$ | 46 | 780 | 700 | 2100 1.38 | #4 |
| VDF | — | TBPPi | 74 | $IC_6F_{12}I$ | 62 | 1200 | 1100 | 1200 1.01 | #5 |
| CTFE | VDC | TBPPi | 74 | $C_6F_{13}I$ | 38 | 6500 | 8300 | — | #6 |
| CTFE | VDC | TBPPi | 74 | $IC_4F_8I$ | 40 | 10200 | 10600 | — | #7 |

Example #1

Synthesis of $C_6F_{13}$-PVDF-I Macro-Initiator, $M_n$ 62000 g/mol

A $C_6F_{13}$-PVDF-I macro-initiator was prepared in accordance with the present disclosure. The macro-initiator was prepared in a 100 mL Hastelloy Parr autoclave equipped with a manometer, a rupture disk, and inner and outlet valves. The autoclave was purged with 30 bars of nitrogen pressure to prevent any leakage. A 20 mm Hg vacuum was then operated for 15 minutes. The reactants including ammonium persulfate $((NH_4)_2S_2O_8)$ as the initiator (0.07 g, 0.30 mmol, 0.1 eq.), perfluorohexyl iodide $(C_6F_{13}I)$ as the chain transfer agent (1.40 g, 3.20 mmol, 1 eq.), and deionized water (50 mL) as the solvent were inserted into the autoclave through a funnel. After cooling in a liquid nitrogen/acetone mixture, vinylidene fluoride (VDF) monomer (23 g, 360 mmol, 100 eq.) was transferred by double weighing (i.e., the difference of weight before and after feeding the autoclave with VDF). The reactor was gradually heated up to 80° C. and the pressure in the autoclave reached a maximum of 65 bar. The reaction was stopped after 16 hours (ΔP=0 bar) and the autoclave was cooled down to room temperature. After purging the non-reacted VDF, VDF conversion was assessed to be 60%. The reaction mixture was filtered off and the resulting total product mixture was suspended in chloroform and then precipitated from cold pentane. After filtration, the macro-initiator was dried under high vacuum at 80° C. until constant weight to produce 16 g of $C_6F_{13}$-PVDF-I (70 wt. % yield) as a white powder. The product was analyzed by $^{19}F$ (FIG. 1) and $^1H$ (FIG. 2) NMR spectroscopy that revealed an experimental number-average molecular weight ($M_n$) value of 62000 g/mol according to the following equation $3/\int_{-83}CF_{3(CTA)})*$ $(\int_{-92}CF_{2(VDF)}+\int_{-39}CF_{2(VDF)}+\int_{-113}CF_{2(VDF)}+(\int_{-116}CF_{2(VDF)}/2)]*M_{F-monomer})+M_{CTA}$, where $\int_{-x}$ stands for the integral of the signal centered at δ-x ppm assigned either to a $CF_3$ or a $CF_2$ group of the chain transfer agent (CTA), or to the $CF_2$ groups of a given F-monomer (VDF at δ-92 ppm or CTFE at δ-108 ppm) and where $M_y$ stands for the molecular weight in g/mol of a given compound y (e.g. $M_{VDF}$=64, $M_{CTFE}$=116.5, $M_{C6F13I}$=446) (see FIG. 1 for details). The theoretical number average molecular weight ($M_n$) was determined to be 4700 g/mol according to the following equation $M_{n(th)}=\alpha_M*(([F-monomer]_0/([CTA]_0)*M_{F-monomer})+M_{CTA}$, where $[x]_0$ stands for the initial molar concentration of compound x and $\alpha_M$ represents the conversion of a given F-monomer (see FIG. 1 for details). Further, differential scanning calorimetry (DSC) of the macro-initiator showed two melting temperatures ($T_m$) values of 160 and 170° C. corresponding to α and β phases ($T_m$ values are measured at the top of the endothermic peaks) (FIG. 21). The thermogravimetric (TGA) analysis revealed a decomposition temperature at 10% weight loss ($T_d^{10\%}$) value of 387° C., under air (FIG. 20).

Example #2

Synthesis of $CF_{13}$-PVDF-I Macro-Initiator, $M_n$ 8500 g/Mol

A $C_6F_{13}$-PVDF-I macro-initiator was prepared in accordance with example 1. The reactants including dimanganese decacarbonyl $(Mn_2(CO)_{10})$ as the initiator (0.12 g, 0.30 mmol, 0.1 eq.), perfluorohexyl iodide $(C_6F_{13}I)$ as the chain transfer agent (1.40 g, 3.20 mmol, 1 eq.), and dimethylcarbonate (60 mL) as the solvent were inserted into the autoclave through a funnel. After cooling, VDF (20 g, 320 mmol, 100 eq.) was transferred by double weighing. The reactor was gradually heated up to 100° C. and the pressure in the autoclave reached a maximum of 36 bar. The reaction was stopped after 16 hours (ΔP=36 bar) and the autoclave was cooled down to room temperature. After purging no gas was vented out which demonstrates a complete conversion of VDF. The reaction mixture was filtered off and the resulting total product mixture was suspended in chloroform and then precipitated from cold pentane. After filtration, the macro-initiator was dried under high vacuum at 80° C. until constant weight to produce 14 g of $C_6F_{13}$-PVDF-I (65 wt. % yield) as a white powder. The product was analyzed by $^{19}F$ (FIG. 3) and $^1H$ (FIG. 4) NMR spectroscopy that revealed an experimental number-average molecular weight ($M_n$) value of 8500 g/mol according to the equation supplied in example #1 (see FIG. 3 for details). The theoretical number average molecular weight ($M_n$) was determined to be 7000 g/mol according to the equation supplied in example #1 (see FIG. 3 for details). Further, size exclusion chromatography (SEC) in DMF (with PMMA standards) revealed an experimental number average molecular weight ($M_n$) value of 10000 g/mol (PDI 1.44). Differential scanning calorimetry (DSC) of the macro-initiator revealed a glass transition temperature ($T_g$) value of −34° C. and showed two melting temperatures ($T_m$) values of 160 and 170° C. corresponding to a and 1 phases (FIG. 23). The thermogravimetric (TGA) analysis revealed a decomposition temperature at 10% weight loss ($T_d^{10\%}$) value of 395° C., under air (FIG. 22).

Example #3

Synthesis of $C_6F_{13}$-PCTFE-I Macro-Initiator, $M_n$ 4600 g/Mol

A $C_6F_{13}$-PCTFE-I macro-initiator was prepared in accordance with example 1. The reactants including dimanganese decacarbonyl ($Mn_2(CO)_{10}$) as the initiator (0.07 g, 0.17 mmol, 0.1 eq.), perfluorohexyl iodide ($C_6F_{13}I$) as the chain transfer agent (0.77 g, 1.72 mmol, 1 eq.), and dimethylcarbonate (60 mL) as the solvent were inserted into the autoclave through a funnel. After cooling, chlorotrifluoroethylene (CTFE) monomer (20 g, 172 mmol, 100 eq.) was transferred by double weighing. The reactor was gradually heated up to 100° C. and the pressure in the autoclave reached a maximum of 10 bar. The reaction was stopped after 16 hours (ΔP=2 bar) and the autoclave was cooled down to room temperature. After purging the non-reacted CTFE, CTFE conversion was assessed to be ca. 47%. The reaction mixture was filtered off and the resulting total product mixture was suspended in chloroform and then precipitated from cold pentane. After filtration, the macro-initiator was dried under high vacuum at 80° C. until constant weight to produce 3 g of $C_6F_{13}$-PCTFE-I (14 wt. % yield) as a white powder. The product was analyzed by $^{19}F$ NMR spectroscopy (FIG. 5) that revealed an experimental number-average molecular weight ($M_n$) value of 4600 g/mol according to the equation supplied in example #1 (see FIG. 5 for details). The theoretical number average molecular weight ($M_n$) was determined to be 5600 g/mol according to the equation supplied in example #1 (see FIG. 5 for details). Differential scanning calorimetry (DSC) of the macro-initiator revealed a glass transition temperature ($T_g$) value of 40° C. and showed a melting temperature ($T_m$) value of 162° C. (FIG. 25). The thermogravimetric (TGA) analysis revealed a decomposition temperature at 10% weight loss ($T_d^{10\%}$) value of 377° C., under air (FIG. 24).

Example #4

Synthesis of I-PVDF-$C_4F_8$-PVDF-I Macro-Initiator, $M_n$ 700 g/Mol

A I-PVDF-$C_4F_8$-PVDF-I macro-initiator was prepared in accordance with the present disclosure. The macro-initiator was prepared in a 600 mL Hastelloy Parr autoclave equipped with a manometer, a rupture disk, and inner and outlet valves. The autoclave was purged with 30 bars of nitrogen pressure to prevent any leakage. A 20 mm Hg vacuum was then operated for 15 minutes. The reactants including tert-butylperoxypivalate (TBPPi) as the initiator (2.10 g, 9.10 mmol, 1.1 eq.), 1,4-diiodoperfluorobutane ($IC_4F_8I$) as the chain transfer agent (39 g, 86 mmol, 11 eq.), and $C_4H_5F_5$ (400 mL) as the solvent were inserted into the autoclave through a funnel. After cooling, VDF (50 g, 781 mmol, 100 eq.) was transferred by double weighing. The reactor was gradually heated up to 74° C. and the pressure in the autoclave reached a maximum of 12 bar. The reaction was stopped after 16 hours (ΔP=3 bar) and the autoclave was cooled down to room temperature. After purging the non-reacted VDF, VDF conversion was assessed to be ca. 78%. The reaction mixture was filtered off and the resulting total product mixture was dissolved in DMF and then precipitated from cold water then from cold pentane. After filtration, the macro-initiator was dried under high vacuum at 80° C. until constant weight to produce 12 g of I-PVDF-$C_4F_8$-PVDF-I (46 wt. % yield) as a yellow solid. The product was analyzed by $^{19}F$ (FIG. 6) and $^1H$ (FIG. 7) NMR spectroscopy that revealed an experimental number-average molecular weight ($M_n$) value of 700 g/mol according to the equation supplied in example #1 (see FIG. 6 for details). The theoretical number average molecular weight ($M_n$) was determined to be 780 g/mol according to the equation supplied in example #1 (see FIG. 6 for details). Further, size exclusion chromatography (SEC) in DMF (with PMMA standards) revealed an experimental number average molecular weight ($M_n$) value of 2100 g/mol (PDI 1.38) (FIG. 16). Differential scanning calorimetry (DSC) of the macro-initiator revealed two melting temperatures ($T_m$) values of 50 and 60° C. corresponding to a and 3 phases (FIG. 27). The thermogravimetric (TGA) analysis revealed a decomposition temperature at 10% weight loss ($T_d^{10\%}$) value of 224° C., under air (FIG. 26).

Example #5

Synthesis of I-PVDF-$C_6F_{12}$-PVDF-I Macro-Initiator, $M_n$ 1100 g/Mol

A I-PVDF-$C_6F_{12}$-PVDF-I macro-initiator was prepared in accordance with example 4. The reactants including tert-butylperoxypivalate (TBPPi) as the initiator (0.40 g, 1.60 mmol, 0.1 eq.), 1,6-diiodoperfluorohexane ($IC_6F_{12}I$) as the chain transfer agent (8.90 g, 16 mmol, 1 eq.), and dimethylcarbonate (60 mL) as the solvent were inserted into the 160 mL autoclave through a funnel. After cooling, VDF (20 g, 320 mmol, 20 eq.) was transferred by double weighing. The reactor was gradually heated up to 74° C. and the pressure in the autoclave reached a maximum of 31 bar. The reaction was stopped after 6 hours (ΔP=16 bar) and the autoclave was cooled down to room temperature. After purging the non-reacted VDF, VDF conversion was assessed to be ca. 65%. The reaction mixture was filtered off and the resulting total product mixture was dissolved in THF and then precipitated from cold pentane. After filtration, the macro-initiator was dried under high vacuum at 80° C. until constant weight to produce 18 g of I-PVDF-$C_6F_{12}$-PVDF-I (62 wt. % yield) as a yellow solid. The product was analyzed by $^{19}F$ (FIG. 8) and $^1H$ (FIG. 9) NMR spectroscopy that revealed an experimental number-average molecular weight ($M_n$) value of 1100 g/mol according to the equation supplied in example #1 (see FIG. 8 for details). The theoretical number average molecular weight ($M_n$) was determined to be 1200 g/mol according to the equation supplied in example #1 (see FIG. 8 for details). Further, size exclusion chromatography (SEC) in DMF (with PMMA standards) revealed an experimental number average molecular weight ($M_n$) value of 1200 g/mol (PDI 1.01). Differential scanning calorimetry (DSC) of the macro-initiator revealed two melting temperatures ($T_m$) values of 100 and 120° C. corresponding to a and 3 phases (FIG. 29). The thermogravimetric (TGA) analysis revealed a decomposition temperature at 10% weight loss ($T_d^{10\%}$) value of 305° C., under air (FIG. 28).

Example #6

Synthesis of $C_6F_{13}$-Poly(CTFE-Co-VDC-I Macro-Initiator, $M_n$ 8300 g/Mol A $C_6F_{13}$-poly(CTFE-co-VDC)-I macro-initiator was prepared in accordance with example 4. The reactants including tert-butylperoxypivalate (TBPPi) as the initiator (2.10 g, 9.1 mmol, 2 mol %), perfluorohexyl iodide ($C_6F_{13}I$) as the chain transfer agent (5.00 g, 9.1 mmol, 2 mol %), vinylidene chloride (VDC) comonomer (2.50 g, 26 mmol, 6 mol % in the feed), and $C_4H_5F_5$:$H_2O$ (200 mL:200 mL) as the solvent mixture were inserted into the 600 mL autoclave through a funnel. After cooling, CTFE (50 g, 429 mmol, 94 mol %) was transferred by double weighing. The reactor was gradually heated up to 74° C. and the pressure in the autoclave reached a maximum of 6 bar. The reaction was stopped after 16 hours ($\Delta P$=0 bar) and the autoclave was cooled down to room temperature. After purging the non-reacted CTFE, CTFE conversion was assessed to be ca. 70%. The reaction mixture was filtered off and the resulting total product mixture was dissolved in chloroform and then precipitated from cold water. After filtration, the macro-initiator was dried under high vacuum at 80° C. until constant weight to produce 22 g of $C_6F_{13}$-(CTFE-co-VDC)-I (38 wt. % yield) as a white powder. The product was analyzed by $^{19}F$ (FIG. 10) and $^1H$ (FIG. 11) NMR spectroscopy that revealed an experimental number-average molecular weight ($M_n$) value of 8300 g/mol according to the equation supplied in example #1 (see FIG. 10 for details). The theoretical number average molecular weight ($M_n$) was determined to be 6500 g/mol according to the equation supplied in example #1 (see FIG. 10 for details). The molar percentage of VDC in the copolymer (22 mol %) was determined by means of $^1H$ NMR spectroscopy using 2,5-dichlorobenzotrifluoride as the external standard (see FIG. 11 for details). Differential scanning calorimetry (DSC) of the macro-initiator revealed a glass transition temperature ($T_g$) value of 29° C. and a melting temperature ($T_m$) value of 180° C. (FIG. 31). The thermogravimetric (TGA) analysis revealed a decomposition temperature at 10% weight loss ($T_d^{10\%}$) value of 375° C., under air (FIG. 30).

Example #7

Synthesis of I-Poly(CTFE-Co-VDC)-$C_4F_8$-Poly(CTFE-Co-VDC)-I Macro-Initiator, $M_n$ 10600 g/Mol A I-poly(CTFE-co-VDC)-$C_4F_8$-poly(CTFE-co-VDC)-I macro-initiator was prepared in accordance with example 4. The reactants including tert-butylperoxypivalate (TBPPi) as the initiator (2.10 g, 9.1 mmol, 2 mol %), 1,4-diiodoperfluorobutane ($IC_4F_8I$) as the chain transfer agent (4.13 g, 9.1 mmol, 2 mol % in the feed), vinylidene chloride (VDC) comonomer (2.5 g, 26 mmol, 6 mol % in the feed), and $C_4H_5F_5:H_2O$ (200 mL:200 mL) as the solvent mixture were inserted into the 600 mL autoclave through a funnel. After cooling, CTFE (51 g, 438 mmol, 94 mol %) was transferred by double weighing. The reactor was gradually heated up to 74° C. and the pressure in the autoclave reached a maximum of 6 bar. The reaction was stopped after 16 hours ($\Delta P$=2 bar) and the autoclave was cooled down to room temperature. After purging the non-reacted CTFE, CTFE conversion was assessed to be ca. 93%. The reaction mixture was filtered off and the resulting total product mixture was dissolved in chloroform and then precipitated from cold pentane. After filtration, the macro-initiator was dried under high vacuum at 80° C. until constant weight to produce 21 g of I-poly(CTFE-co-VDC)-$C_4F_8$-poly(CTFE-co-VDC)-I (40 wt. % yield) as a white powder. The product was analyzed by $^{19}F$ (FIG. 12) and $^1H$ (FIG. 13) NMR spectroscopy that revealed an experimental number-average molecular weight ($M_n$) value of 10600 g/mol according to the equation supplied in example #1 (see FIG. 12 for details). The theoretical number average molecular weight ($M_n$) was determined to be 10200 g/mol according to the equation supplied in example #1 (see FIG. 12 for details). The molar percentage of VDC in the copolymer (20 mol %) was determined by means of $^{19}F$ and $^1H$ NMR spectroscopy using 2,5-dichlorobenzotrifluoride as the external standard (see FIG. 13 for details). Differential scanning calorimetry (DSC) of the macro-initiator revealed a glass transition temperature ($T_g$) value of 29° C. and a melting temperature ($T_m$) value of 178° C. (FIG. 33). The thermogravimetric (TGA) analysis revealed a decomposition temperature at 10% weight loss ($T_d^{10\%}$) value of 382° C., under air (FIG. 32).

TABLE 2

Summary of the different examples of CTFE-containing block copolymers, wherein "SEC" stands for Size Exclusion Chromatography with PMMA standards

| Monomer | Initiator | Macro-initiator from example # | T° (° C.) | $M_n$ g/mol (targeted) | $M_n$ g/mol (NMR) | $M_n$ g/mol (SEC)$^a$ PDI | Yield (wt. %) | eg # |
|---|---|---|---|---|---|---|---|---|
| CTFE | $(Mn)_2CO_{10}$ | I-PVDF-I from example #4 | 100 | 7500 | 6800 | 7200 2.05 | 32 | #8 |
| CTFE | TBPPi | I-PVDF-I from example #4 | 74 | 3200 | 2500 | 4200 1.06 | 32 | #9 |
| CTFE | TBPPi | $C_6F_{13}$-poly(CTFE-co-VDC)-I from example #6 | 74 | 23500 | 39000 | — | 45 | #10 |
| CTFE | TBPPi | I-poly(CTFE-co-VDC)-I from example #7 | 74 | 33000 | 28000 | — | 44 | #11 |

Example #8

Synthesis of PCTFE-Block-PVDF-Block-PCTFE Triblock Copolymer, $M_n$ 6800 g/Mol

A PCTFE-block-PVDF-block-PCTFE triblock copolymer was prepared in accordance with example 1. The reactants including dimanganese decacarbonyl ($Mn_2(CO)_{10}$) as the initiator (67 mg, 0.172 mmol, 0.1 eq.), I-PVDF-I macrochain transfer agent from example #4 (1.55 g, 2.21 mmol, 1 eq.), and dimethylcarbonate (60 mL) as the solvent were inserted into the 160 mL autoclave through a funnel. After cooling, CTFE (20 g, 172 mmol, 100 eq.) was transferred by double weighing. The reactor was gradually heated up to 100° C. and the pressure in the autoclave reached a maximum of 9 bar. The reaction was stopped after 16 hours ($\Delta P$=2 bar) and the autoclave was cooled down to room temperature. After purging the non-reacted CTFE, CTFE conversion was assessed to be ca. 60%. The reaction mixture was filtered off and the resulting total product mixture was suspended in THF and then precipitated from cold pentane then from cold acetone. After filtration, the triblock copolymer was dried under high vacuum at 80° C. until constant weight to produce 7 g of PCTFE-block-PVDF-block-PCTFE (32 wt. % yield) as a white powder. The product was analyzed by $^{19}F$ (FIG. 14) and $^1H$ (FIG. 15) NMR spectroscopy that revealed an experimental number-average molecular weight ($M_n$) value of 6800 g/mol according to the following equation [($\int_{-108}CF_{2(CTFE)}/\int_{-92}CF_{2(VDF)}$)*nb of VDF units in macroCTA*$M_{CTFE}$]+ $M_{macroCTA}$ (see FIG. 14 for details). The theoretical number average molecular weight ($M_n$) was determined to be 7500 g/mol according to the equation supplied in example #1 (see FIG. 14 for details). Further, size exclusion chromatography (SEC, FIG. 16) in DMF (with PMMA standards) revealed an experimental number average molecular weight ($M_n$) value of 7200 g/mol (PDI 2.05). Differential scanning calorimetry (DSC) of the macro-initiator revealed a melting temperature ($T_m$) value of 180° C. (FIG. 35). The thermogravimetric (TGA) analysis revealed a decomposition temperature at 10% weight loss ($T_d^{10\%}$) value of 388° C., under air (FIG. 34).

Example #9

Synthesis of PCTFE-Block-PVDF-Block-PCTFE Triblock Copolymer, $M_n$ 2500 g/Mol

A PCTFE-block-PVDF-block-PCTFE triblock copolymer was prepared in accordance with example 8. The reactants including tert-butylperoxypivalate (TBPPi) as the initiator (210 mg, 0.9 mmol, 0.1 eq.), I-PVDF-I macrochain transfer agent from example #4 (7.74 g, 11.1 mmol, 1 eq.), and dimethylcarbonate (60 mL) as the solvent were inserted into the 160 mL autoclave through a funnel. After cooling, CTFE (20 g, 172 mmol, 20 eq.) was transferred by double weighing. The reactor was gradually heated up to 74° C. and the pressure in the autoclave reached a maximum of 9 bar. The reaction was stopped after 16 hours ($\Delta$P=2 bar) and the autoclave was cooled down to room temperature. After purging the non-reacted CTFE, CTFE conversion was assessed to be ca. 65%. The reaction mixture was filtered off and the resulting total product mixture was suspended in THF and then precipitated from cold pentane then from cold acetone. After filtration, the triblock copolymer was dried under high vacuum at 80° C. until constant weight to produce 9 g of PCTFE-block-PVDF-block-PCTFE (32 wt. % yield) as a white powder. The product was analyzed by $^{19}$F (FIG. 17) and $^1$H (FIG. 18) NMR spectroscopy that revealed an experimental number-average molecular weight ($M_n$) value of 2500 g/mol according to the equation supplied in example #8 (see FIG. 17 for details). The theoretical number average molecular weight ($M_n$) was determined to be 3200 g/mol according to the equation supplied in example #1 (see FIG. 17 for details). Further, size exclusion chromatography (SEC, FIG. 16) in DMF (with PMMA standards) revealed an experimental number average molecular weight ($M_n$) value of 4200 g/mol (PDI 1.06). Differential scanning calorimetry (DSC) of the macro-initiator revealed a melting temperature ($T_m$) value of 175° C. (FIG. 37). The thermogravimetric (TGA) analysis revealed a decomposition temperature at 10% weight loss ($T_d^{10\%}$) value of 378° C., under air (FIG. 36).

Example #10

Synthesis of $C_6F_{13}$-Poly(CTFE-Co-VDC)-Block-PCTFE Diblock Copolymer, $M_n$ 39000 g/Mol A $C_6F_{13}$-(CTFE-co-VDC)-block-PCTFE diblock copolymer was prepared in accordance with example 4. The reactants including tert-butylperoxypivalate (TBPPi) as the initiator (1.2 g, 9.2 mmol, 8 eq.), $C_6F_{13}$-(CTFE-co-VDC)-I macrochain transfer agent from example #6 (10 g, 1.18 mmol, 1 eq.), and $C_4H_5F_5$:$H_2O$ (200 mL:200 mL) as the solvent mixture were inserted into the autoclave through a funnel. After cooling, CTFE (29 g, 249 mmol, 200 eq.) was transferred by double weighing. The reactor was gradually heated up to 74° C. and the pressure in the 600 mL autoclave reached a maximum of 5 bar. The reaction was stopped after 16 hours ($\Delta$P=0 bar) and the autoclave was cooled down to room temperature. After purging the non-reacted CTFE, CTFE conversion was assessed to be ca. 71%. The reaction mixture was filtered off and the resulting total product mixture was suspended in chloroform and then precipitated from cold water. After filtration, the diblock copolymer was dried under high vacuum at 80° C. until constant weight to produce 17 g of $C_6F_{13}$-poly(CTFE-co-VDC)-block-PCTFE (45 wt. % yield) as a white powder. The product was analyzed by $^{19}$F NMR spectroscopy (FIG. 19) that revealed an experimental number-average molecular weight ($M_n$) value of 39000 g/mol according to the following equation [(8/$\int_{-122}CF_{2(CTA)}$)* ($\int_{-108}CF_{2(F-monomer)}/2$)]–nb of CTFE units in macroCTA*$M_{CTFE}$+$M_{macroCTA}$ (see FIG. 19 for details). The theoretical number average molecular weight ($M_n$) was determined to be 23500 g/mol according to the equation supplied in example #1 (see FIG. 19 for details). Further, differential scanning calorimetry (DSC) of the diblock copolymer revealed a glass transition temperature ($T_g$) value of 35° C. and a melting temperature ($T_m$) value of 160° C. (FIG. 39). The thermogravimetric (TGA) analysis revealed a decomposition temperature at 10% weight loss ($T_d^{10\%}$) value of 364° C., under air (FIG. 38).

Example #11

Synthesis of PCTFE-Block-Poly(CTFE-Co-VDC)-$C_4F_8$-Poly(CTFE-Co-VDC)-Block-PCTFE Triblock Copolymer, $M_n$ 28000 g/Mol A PCTFE-block-poly(CTFE-co-VDC)-$C_4F_8$-poly(CTFE-co-VDC)-block-PCTFE triblock copolymer was prepared in accordance with example 4. The reactants including tert-butylperoxypivalate (TBPPi) as the initiator (1.0 g, 4.3 mmol, 5 eq.), I-(CTFE-co-VDC)-$C_4F_8$-(CTFE-co-VDC)-I macrochain transfer agent from example #7 (10 g, 0.91 mmol, 1 eq.), and $C_4H_5F_5$:$H_2O$ (200 mL:200 mL) as the solvent mixture were inserted into the autoclave through a funnel. After cooling, CTFE (29 g, 249 mmol, 300 eq.) was transferred by double weighing. The reactor was gradually heated up to 74° C. and the pressure in the autoclave reached a maximum of 10 bar. The reaction was stopped after 16 hours ($\Delta$P=2 bar) and the autoclave was cooled down to room temperature. After purging the non-reacted CTFE, CTFE conversion was assessed to be ca. 78%. The reaction mixture was filtered off and the resulting total product mixture was suspended in chloroform and then precipitated from cold water. After filtration, the triblock copolymer was dried under high vacuum at 80° C. until constant weight to produce 17 g of PCTFE-block-poly(CTFE-co-VDC)-$C_4F_8$-poly(CTFE-co-VDC)-block-PCTFE (44 wt. % yield) as a white powder. The product was analyzed by $^{19}$F NMR spectroscopy (FIG. 20) that revealed an experimental number-average molecular weight ($M_n$) value of 28000 g/mol according to the equation supplied in example #10 (see FIG. 20 for details). The theoretical number average molecular weight ($M_n$) was determined to be 33000 g/mol according to the equation supplied in example #1 (see FIG. 20 for details). Further, differential scanning calorimetry (DSC) of the triblock copolymer revealed a glass transition temperature ($T_g$) value of 35° C. and a melting temperature ($T_m$) value of 170° C. (FIG. 41). The thermogravimetric (TGA) analysis revealed a decomposition temperature at 10% weight loss ($T_d^{10\%}$) value of 375° C., under air (FIG. 40).

As such, described herein are embodiments of CTFE-based block copolymers suitable for use in a wide variety of applications. The CTFE-based block copolymers are optically transparent, chemically inert, nonflammable, and plasticizer and stabilizer-free. The CTFE-based block copolymers exhibit superior moisture barrier properties. Further, the disclosed CTFE-based block copolymers thermoform easily using existing processing equipment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in some exemplary embodiments without departing from the scope as set forth in the appended claims and their legal equivalents.

What is claimed is:

1. A method for the synthesis of CTFE-based block copolymers through iodine transfer polymerization, comprising:

reacting, in the presence of a radical initiator, a monomer "M" selected from the group consisting of: vinyl fluoride (VF), and vinylidene chloride (VDC) with a chain transfer agent of the formula:

X—Y or Y—X—Y, wherein X represents a $C_1$-$C_3$ hydrocarbon, a $C_1$-$C_6$ hydrofluorocarbon, a $C_1$-$C_6$ hydrochlorofluorocarbon, or a $C_1$-$C_6$ fluorocarbon and Y represents iodine or bromine, thereby forming a macro-initiator of the formula:

X-poly(M)-Y or Y-poly(M)-X-poly(M)-Y, wherein poly(M) represents a polymer of the monomer; and reacting, in the presence of a radical initiator, the macro-initiator with chlorotrifluoroethylene (CTFE), thereby forming a diblock or a triblock CTFE-based block copolymer of the formula:

X-poly(M)-block-PCTFE or PCTFE-block-poly(M)-X-poly(M)-block-PCTFE.

2. The method of claim 1, wherein reacting the monomer with the chain transfer agent comprises reacting the monomer with a chain transfer agent selected from the group consisting of: $CF_3(CF_2)_n$—Y and Y—$(CF_2)_n$—Y, wherein n equals 0, 1, 2, 3, 4, 5, or 6.

3. The method of claim 1, wherein reacting the monomer with the chain transfer agent in the presence of the radical initiator comprises reacting the monomer with a chain transfer agent in the presence of a radical initiator selected from the group consisting of: $(NH_4)_2S_2O_8$, $K_2S_2O_8$, $Na_2S_2O_8$, $Mn_2(CO)_{10}$, tertbutyl peroxypivalate, dibenzoyl peroxide, and ditert-butyl peroxide.

4. The method of claim 1, wherein reacting the monomer with the chain transfer agent comprises reacting the monomer with the chain transfer agent at a temperature of about 20° C. to about 130° C.

5. The method of claim 4, wherein reacting the monomer with the chain transfer agent comprises reacting the monomer with the chain transfer agent at a temperature of about 60° C. to about 100° C.

6. The method of claim 1, wherein reacting the monomer with the chain transfer agent comprises reacting the monomer with the chain transfer agent at a pressure of about 200 kPa to about 20,000 kPa.

7. The method of claim 6, wherein reacting the monomer with the chain transfer agent comprises reacting the monomer with the chain transfer agent at a pressure of about 2,000 kPa to about 10,000 kPa.

8. The method of claim 1, wherein reacting the monomer with the chain transfer agent comprises reacting the monomer with the chain transfer agent for a time period of about 1 to about 30 hours.

9. The method of claim 8, wherein reacting the monomer with the chain transfer agent comprises reacting the monomer with the chain transfer agent for a time period of about 4 to about 20 hours.

10. The method of claim 1, wherein reacting the macro-initiator with the CTFE in the presence of a radical initiator comprises reacting the macro-initiator with the CTFE in the presence of a radical initiator selected from the group consisting of: $Mn_2(CO)_{10}$ and tert-butyl peroxy pivalate (TBPPi).

11. The method of claim 1, wherein reacting the macro-initiator with the CTFE comprises reacting the macro-initiator with the CTFE at a temperature of about 20° C. to about 130° C.

12. The method of claim 11, wherein reacting the macro-initiator with the CTFE comprises reacting the macro-initiator with the CTFE at a temperature of about 60° C. to about 100° C.

13. The method of claim 1, wherein reacting the macro-initiator with the CTFE comprises reacting the macro-initiator with the CTFE at a pressure of about 200 kPa to about 20,000 kPa.

14. The method of claim 1, wherein reacting the macro-initiator with the CTFE comprises reacting the macro-initiator with the CTFE for a time period of about 1 to about 30 hours.

15. The method of claim 1, wherein reacting the monomer or the macro-initiator comprises reacting in a solvent selected from the group consisting of: esters of formula R—COOR' where R and R' are independently $C_{1-5}$ alkyl groups, ester OR" where R" is an alkyl containing 1 to 5 carbon atoms, and where R may also hydrogen, fluorinated solvents, 1,2-dichloroethane, isopropanol, tertiary butanol, acetonitrile, dimethyl carbonate, butyronitrile, and mixtures thereof.

16. The method of claim 15, wherein reacting the monomer or the macro-initiator comprises reacting in a co-solvent selected from the group consisting of: acetonitrile, butyronitrile, alkyl ketones, cyclohexanone, and water.

17. The method of claim 1, wherein the monomer "M" comprises vinyl fluoride (VF).

18. The method of claim 1, wherein the monomer "M" comprises vinylidene chloride (VDC).

* * * * *